(12) United States Patent
Matsui et al.

(10) Patent No.: US 12,223,861 B2
(45) Date of Patent: *Feb. 11, 2025

(54) GRADIENT CHANGE DETECTION SYSTEM, DISPLAY SYSTEM USING SAME, AND STORAGE MEDIUM THAT STORES PROGRAM FOR MOVING BODY

(71) Applicant: Panasonic Intellectual Property Management Co., Ltd., Osaka (JP)

(72) Inventors: Satoshi Matsui, Kyoto (JP); Norikazu Katsuyama, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 115 days.

This patent is subject to a terminal disclaimer.

(21) Appl. No.: 17/495,038

(22) Filed: Oct. 6, 2021

(65) Prior Publication Data

US 2022/0028307 A1     Jan. 27, 2022

Related U.S. Application Data

(63) Continuation of application No. PCT/JP2020/015849, filed on Apr. 8, 2020.

(30) Foreign Application Priority Data

Apr. 11, 2019 (JP) ................................. 2019-075555
May 24, 2019 (JP) ................................. 2019-097881

(51) Int. Cl.
 *G09G 3/00* (2006.01)
 *B60K 35/00* (2024.01)
 (Continued)

(52) U.S. Cl.
 CPC ............. *G09G 3/002* (2013.01); *B60K 35/00* (2013.01); *B60K 35/10* (2024.01); *B60K 35/23* (2024.01);
 (Continued)

(58) Field of Classification Search
 None
 See application file for complete search history.

(56) References Cited

U.S. PATENT DOCUMENTS

| 6,084,594 A | * | 7/2000 | Goto ....................... G06T 19/00 |
| | | | 345/9 |
| 2010/0164702 A1 | * | 7/2010 | Sasaki .................... G01B 21/22 |
| | | | 345/7 |

(Continued)

FOREIGN PATENT DOCUMENTS

| JP | 2015-101311 | 6/2015 |
| JP | 2018-150010 | 9/2018 |

(Continued)

OTHER PUBLICATIONS

Extended European Search Report issued Apr. 20, 2022 in European Patent Application No. 20788611.0.

(Continued)

*Primary Examiner* — Jason A Pringle-Parker
(74) *Attorney, Agent, or Firm* — Wenderoth, Lind & Ponack, L.L.P.

(57) ABSTRACT

A gradient change detection system for a moving body for detecting a change in a gradient of a traveling path, the gradient change detection system includes a posture detection unit that detects a posture change amount in a rotation direction about a left-right direction with respect to a traveling direction of a moving body, and a gradient change detector that detects a change in a gradient of the traveling path based on the posture change amount or a variation (Continued)

amount in predetermined unit time of the posture change amount.

12 Claims, 39 Drawing Sheets

(51) Int. Cl.
    *B60K 35/10*     (2024.01)
    *B60K 35/23*     (2024.01)

(52) U.S. Cl.
    CPC . *G09G 2340/0464* (2013.01); *G09G 2380/10* (2013.01)

(56) References Cited

U.S. PATENT DOCUMENTS

| | | | |
|---|---|---|---|
| 2012/0224062 A1* | 9/2012 | Lacoste | G09G 5/14 |
| | | | 348/148 |
| 2016/0114727 A1 | 4/2016 | Watanabe | |
| 2016/0216521 A1* | 7/2016 | Yachida | G01C 21/3602 |
| 2018/0143431 A1* | 5/2018 | Matsuura | B60K 37/06 |
| 2019/0025580 A1 | 1/2019 | Nagano et al. | |
| 2019/0235241 A1* | 8/2019 | Suzuki | G06F 3/013 |
| 2020/0031281 A1 | 1/2020 | Watanabe et al. | |
| 2020/0064640 A1 | 2/2020 | Nagano et al. | |
| 2020/0269696 A1* | 8/2020 | Banno | G02B 27/0101 |

FOREIGN PATENT DOCUMENTS

| | | |
|---|---|---|
| WO | 2017/134865 | 8/2017 |
| WO | 2017/134866 | 8/2017 |
| WO | 2018/061256 | 4/2018 |

OTHER PUBLICATIONS

International Search Report issued Jun. 30, 2020 in International (PCT) Application No. PCT/JP2020/015849 with English translation.

* cited by examiner

GRADIENT CHANGE DETECTION SYSTEM, DISPLAY SYSTEM USING SAME, AND STORAGE MEDIUM THAT STORES PROGRAM FOR MOVING BODY

CROSS-REFERENCE TO RELATED APPLICATIONS

This is a continuation application of International Application No. PCT/JP2020/015849, with an international filing date of Apr. 8, 2020, which claims priority of Japanese Patent Application No. 2019-075555 filed on Apr. 11, 2019, and Japanese Patent Application No. 2019-097881 filed on May 24, 2019, the content of which is incorporated herein by reference.

BACKGROUND OF THE INVENTION

1. Technical Field

The present disclosure relates to a gradient change detection system of a traveling path on which a moving body travels, a display system that uses the gradient change detection system to control a display position of an image in accordance with movement of the moving body, and the storage medium that stores a program for a moving body mounted on the moving body.

2. Description of Related Art

JP 2015-101311 A discloses a vehicle information projection system that performs augmented reality (AR) display using a head-up display (HUD) device. The HUD device projects light representing a virtual image on the windshield of a vehicle so that a viewer who is an occupant of the vehicle visually recognizes the virtual image together with an actual view of the outside world of the vehicle. For example, a virtual image representing a guide route of the vehicle is displayed in association with a display target (for example, road) in the actual view. In this manner, the occupant can confirm the guide route while visually recognizing the actual view. The vehicle information projection system of JP 2015-101311 A includes a vehicle speed sensor and corrects a display position of the virtual image according to acceleration. This restricts generation of position displacement of the virtual image when the vehicle is suddenly decelerated and suddenly accelerated.

SUMMARY

In a case where, for example, a gyro sensor is used to detect a posture state of a vehicle, when the vehicle enters an inclined traveling path such as a slope, the gyro sensor detects a posture change of the vehicle due to a gradient change of the traveling path. In the case of a posture change of a vehicle due to a gradient change of a traveling path, when the vehicle is in a state of traveling along a gradient, position displacement of a virtual image does not occur. However, since whether or not a posture change of a vehicle is caused by a gradient change is not determined, in a case of a posture change due to a gradient change, a display position of a virtual image in which no position displacement occurs is corrected, and there is a case where the virtual image is not appropriately displayed.

The present disclosure provides a gradient change detection system that detects a gradient change of a traveling path, a display system that displays an image according to a change in gradient of a traveling path, and a storage medium that stores a program for a moving body that detects a change in gradient of a traveling path.

A gradient change detection system of the present disclosure is a gradient change detection system for a moving body for detecting a change in a gradient of a traveling path. The gradient change detection system includes
a posture detection unit that detects a posture change amount in a rotation direction about a left-right direction with respect to a traveling direction of a moving body, and
a gradient change detector that detects a change in a gradient of a traveling path based on the posture change amount or a variation amount in predetermined unit time of the posture change amount.

Further, a display system of the present disclosure includes
a display processing device that controls display of an image,
a posture detection unit that detects a posture change amount in a rotation direction about a left-right direction with respect to a traveling direction of a moving body,
a correction processing device including a correction amount calculator that calculates a correction amount of a display position of the image based on the posture change amount, and
a gradient change detector that detects a change in a gradient of a traveling path based on the posture change amount or a variation amount in predetermined unit time of the posture change amount.

The correction processing device adjusts the correction amount based on a detection result of the gradient change detector.

Further, a storage medium stores a program for a moving body of the present disclosure, which is a program for a moving body for an arithmetic device to detect a change in a gradient of a traveling path.

The program causes the arithmetic device to execute
a gradient change detection step of detecting a change in a gradient of a traveling path based on a posture change amount in a rotation direction about a left-right direction with respect to a traveling direction of the moving body, the posture change amount being input from a posture detection unit, or a variation amount in predetermined unit time of the posture change amount.

These general and specific aspects may be realized by a system, a method, and a computer program, and a combination of these.

According to the gradient change detection system, the display system, and the storage medium that stores the program for a moving body of the present disclosure, it is possible to provide a gradient change detection system that detects a gradient change of a traveling path, a display system that displays an image according to a change in a gradient of a traveling path, and a storage medium that stores a program for a moving body that detects a change in a gradient of a traveling path.

Figure 1:
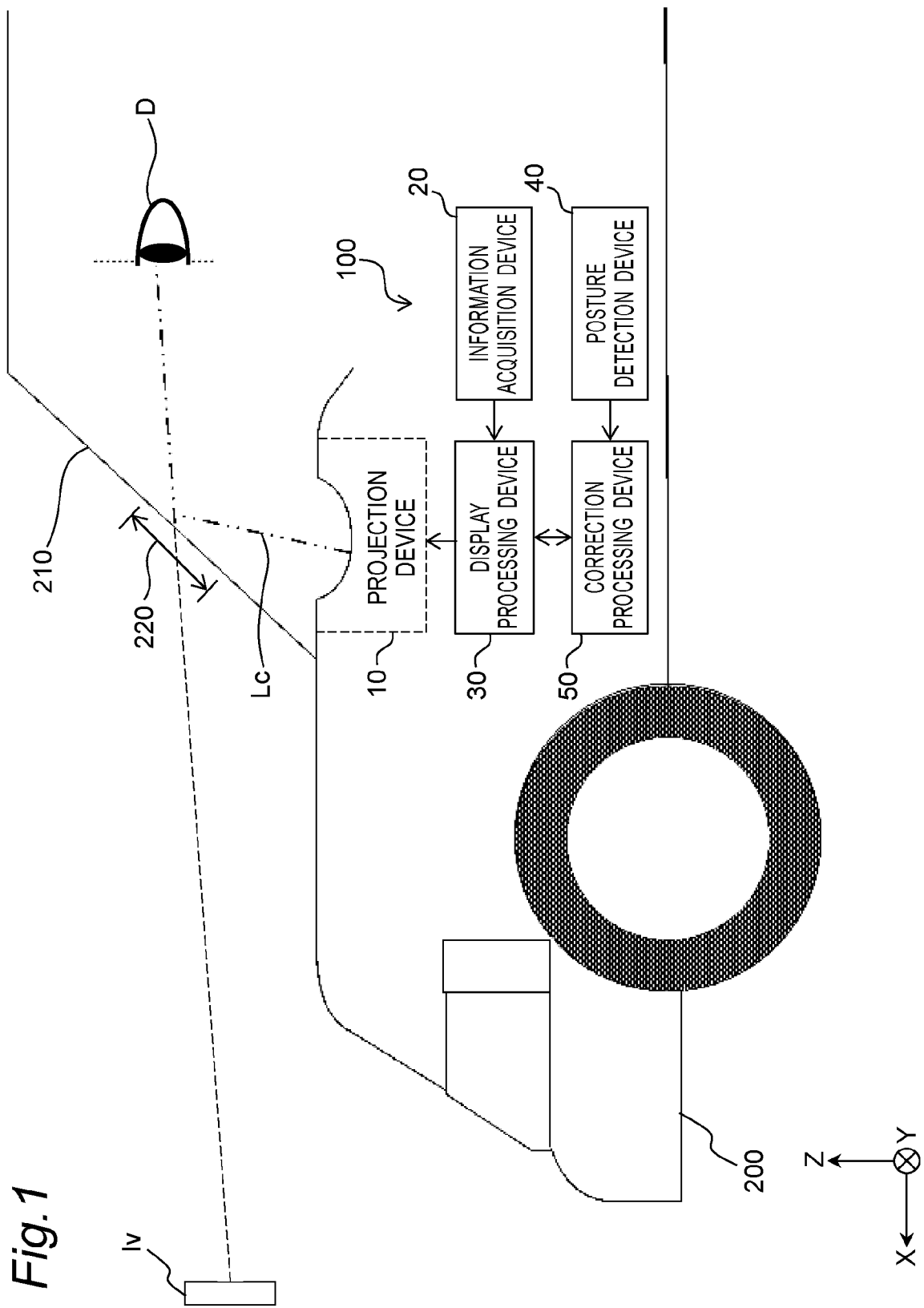
FIG. 1 is a diagram for explaining a head-up display (HUD).

DETAILED EMBODIMENTS (Findings that Form the Basis of the Present Disclosure)

A posture change amount of a moving body is detected by a posture detection unit. The posture change amount indicates a change amount by which the posture changes from a posture state serving as a reference of a moving body. The posture state serving as a reference of a moving body is, for example, a horizontal state. In a case where a display position of an image is corrected according to a posture state of a moving body detected on the basis of a detection result of the posture detection unit, the posture state of the moving body includes a posture change due to vibration due to unevenness of a traveling path and a posture change due to a traveling path gradient (slope) change. Therefore, even a change in gradient of the traveling path that does not require correction is corrected, and erroneous correction occurs.

For example, it is conceivable to use a gyro sensor in order to detect, with high accuracy, vibration of a moving body due to a shape such as unevenness of a road surface of a traveling path. Angles (roll angle, pitch angle, and yaw angle) in three axial directions of a moving body are obtained by integrating angular velocities around the three axial directions detected by the gyro sensor. In a case where a pitch angle is used as a posture change amount of a moving body, for example, the pitch angle is 0° when the moving body is in the horizontal state, and thus, the posture change amount of a moving body is a rotation amount in a pitch direction based on the horizontal state of the moving body. In a case where an inclination of a road surface (gradient of a traveling path) changes, a variation in the pitch angle of a moving body due to the inclination of the road surface is detected, and a display position of an image is corrected according to the variation in the pitch angle. Since display displacement occurs due to a posture change of the moving body with respect to the road surface, not all components of the variation in the pitch angle of the moving body due to a change in the inclination of the road surface become the display displacement, and thus, correction of a display position of an image according to the variation in the pitch angle becomes erroneous correction. Note that, since frequency components of both vibration due to unevenness of a road surface and variation of the pitch angle due to an inclination of the road surface have a common portion, it has been found to be difficult to separate them by filter processing. Note that the pitch direction refers to a rotation direction around a left-right direction perpendicular to a traveling direction of a moving body.

In a case where the gradient of a traveling path changes, the display system of the present disclosure detects the posture change amount of a moving body, determines that the gradient of the traveling path changes based on the posture change amount or a variation amount per unit time of the posture change amount, and returns a display position of an image to a reference position. In this manner, it is possible to reduce erroneous correction caused by the gradient of the traveling path on which the moving body travels.

First Embodiment

Hereinafter, the first embodiment will be described with reference to the drawings. In the first embodiment, a case where the moving body is a vehicle such as an automobile and the display system is a head-up display (HUD) system that displays a virtual image as an image in front of the windshield of the vehicle will be described as an example.

1. Configuration of Display System

FIG. 1 is a diagram for explaining the HUD system. In FIG. 1, a roll axis of a vehicle 200 is the X axis, a pitch axis of the vehicle 200 is the Y axis, and a yaw axis of the vehicle 200 is the Z axis. That is, the X axis is an axis that is orthogonal to the Y axis and the Z axis and is along a line-of-sight direction of an occupant D who visually recognizes a virtual image Iv. The Y axis is an axis along the left-right direction when viewed from the occupant D who visually recognizes the virtual image Iv, and is an axis in the left-right direction with respect to the traveling direction of the vehicle 200. The Z axis is an axis along the height direction of the vehicle 200.

A display system 100 of the present embodiment is an HUD system that performs what is called augmented reality (AR) display in which the virtual image Iv is superimposed on an actual view in front of a windshield 210 of the vehicle 200. The virtual image Iv indicates predetermined information. For example, the virtual image Iv is a figure and a character indicating a route for guiding to a destination, an estimated time of arrival at the destination, a traveling direction, a speed, various warnings, and the like. The display system 100 is installed in the vehicle 200 and projects display light Lc representing the virtual image Iv into a display area 220 of the windshield 210 of the vehicle 200. In the present embodiment, the display area 220 is a partial area of the windshield 210. Note that the display area 220 may be the entire area of the windshield 210. The display light Lc is reflected by the windshield 210 toward the inside of the vehicle. In this manner, the occupant (viewer) D in the vehicle 200 visually recognizes the reflected display light Lc as the virtual image Iv in front of the vehicle 200.

The display system 100 includes a projection device 10, an information acquisition device 20, a display processing device 30, a posture detection device 40, and a correction processing device 50.

The projection device 10 projects the display light Lc representing the virtual image Iv into the display area 220. The projection device 10 includes, for example, a liquid crystal display element that displays an image of the virtual image Iv, a light source such as an LED that illuminates the liquid crystal display element, a mirror and a lens that reflect the display light Lc of the image displayed by the liquid crystal display element onto the display area 220, and the like. The projection device 10 is installed, for example, in the dashboard of the vehicle 200.

The information acquisition device 20 acquires position information of a vehicle. Specifically, the information acquisition device 20 measures a position of the vehicle 200 and generates position information indicating the position. The information acquisition device 20 outputs vehicle-related information including at least the position information of the vehicle 200. Note that the information acquisition device 20 may acquire outside-vehicle information indicating an object, a distance to the object, and the like. The vehicle-related information may include the acquired outside-vehicle information.

The display processing device 30 controls the display of the virtual image Iv based on the vehicle-related information and the like obtained from the information acquisition device 20 and outputs image data of the virtual image Iv to the projection device 10. The display processing device 30 may control the display of the virtual image Iv based on a display timing (display time) of the virtual image Iv or a combination of the vehicle-related information and the display timing. The display timing is, for example, repetition of display for ten seconds and non-display for one second.

The posture detection device 40 acquires posture change information of the vehicle 200. In the present embodiment, the posture detection device 40 includes, for example, a gyro sensor 41 that detects an angular velocity of the vehicle 200. The gyro sensor 41 outputs the detected angular velocity to the correction processing device 50 as posture change information indicating the posture of the vehicle 200.

The correction processing device 50 calculates a correction amount of the display position of the virtual image Iv based on the posture change information of the vehicle 200 detected by the posture detection device 40.

Figure 2:
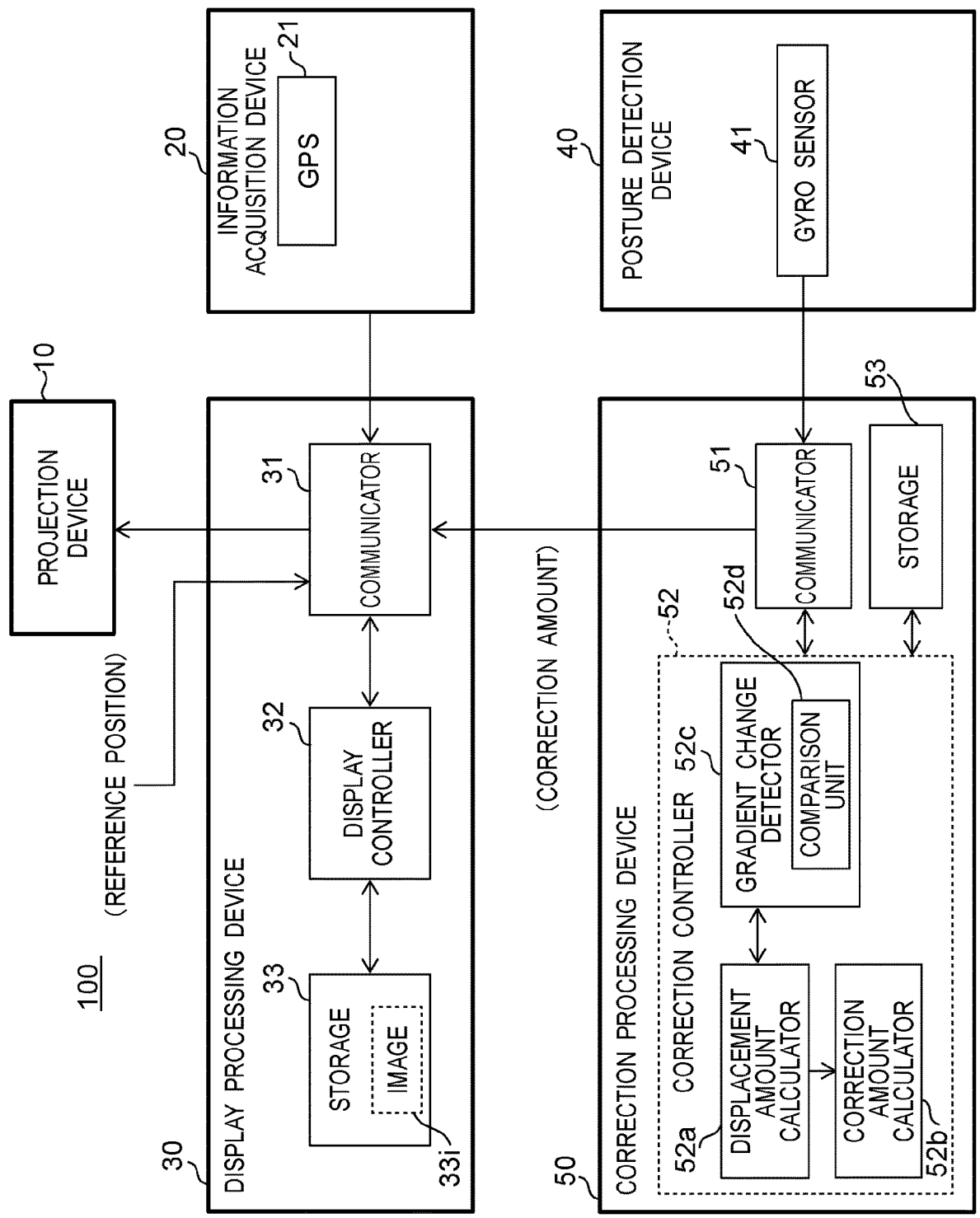
FIG. 2 is a block diagram showing an internal configuration of a display system according to a first embodiment.

FIG. 2 is a block diagram showing an internal configuration of the display system 100.

In the present embodiment, the information acquisition device 20 includes a global positioning system (GPS) module 21 that detects a position indicating the current position of the vehicle 200 in the geographical coordinate system. Specifically, the GPS module 21 receives radio waves from GPS satellites and measures the latitude and longitude of the receiving point. The GPS module 21 generates position information indicating the measured latitude and longitude. The information acquisition device 20 may further include a camera that captures an outside view and generates captured image data. The information acquisition device 20 may, for example, identify an object from the captured image data by image processing and measure a distance to the object. In this case, the information acquisition device 20 may generate, as the outside-vehicle information, information indicating an object, a distance to the object, and the like. The information acquisition device 20 outputs the vehicle-related information including the position information to the display processing device 30. Note that the captured image data generated by the camera may be output to the display processing device 30.

The display processing device 30 includes a communicator 31, a display controller 32, and a storage 33.

The communicator 31 includes a circuit that communicates with external devices in compliance with a predetermined communication standard (for example, LAN, Wi-Fi (registered trademark), Bluetooth (registered trademark), USB, HDMI (registered trademark), controller area network (CAN), and serial peripheral interface (SPI)).

The display controller 32 can be realized by a semiconductor element or the like. The display controller 32 can be composed of, for example, a microcomputer, a CPU, an MPU, a GPU, a DSP, an FPGA, or an ASIC. A function of the display controller 32 may be configured only by hardware, or may be realized by combining hardware and software. The display controller 32 realizes a predetermined function by reading data and a program stored in the storage 33 and performing various types of arithmetic processing.

The storage 33 is a storage medium that stores a program and data required to realize a function of the display processing device 30. The storage 33 can be realized by, for example, a hard disk (HDD), an SSD, a RAM, a DRAM, a ferroelectric memory, a flash memory, a magnetic disk, or a combination of these.

The storage 33 stores a plurality of pieces of image data 33$i$ representing the virtual image Iv. The display controller 32 determines the virtual image Iv to be displayed based on the vehicle-related information obtained from the information acquisition device 20. The display controller 32 reads out the image data 33$i$ of the determined virtual image Iv from the storage 33 and outputs the data to the projection device 10. Furthermore, the display controller 32 sets the display position of the virtual image Iv. The display controller 32 outputs display information indicating whether the virtual image Iv is to be displayed or not or is being displayed or not to the correction processing device 50.

The correction processing device 50 includes a communicator 51, a correction controller 52, and a storage 53.

The communicator 51 includes a circuit that communicates with external devices in compliance with a predetermined communication standard (for example, LAN, Wi-Fi (registered trademark), Bluetooth (registered trademark), USB, HDMI (registered trademark), controller area network (CAN), and serial peripheral interface (SPI)).

The correction controller 52 is an arithmetic device that can be realized by a semiconductor element or the like. The correction controller 52 can be composed of, for example, a microcomputer, a CPU, an MPU, a GPU, a DSP, an FPGA, or an ASIC. A function of the correction controller 52 may be configured only by hardware, or may be realized by combining hardware and software. The correction controller 52 realizes a predetermined function by reading data and a program stored in the storage 53 in the correction processing device 50 and performing various types of arithmetic processing.

The correction controller 52 includes a displacement amount calculator 52$a$, a correction amount calculator 52$b$, and a gradient change detector 52$c$ as a functional configuration.

The displacement amount calculator 52$a$ calculates the posture change amount (angle displacement amount) of the vehicle 200 based on the posture change information output by the posture detection device 40. For example, the displacement amount calculator 52$a$ calculates an angle (a pitch angle) around a pitch axis of the vehicle 200 by integrating the pitch angular velocity detected by the gyro sensor 41. In this manner, a displacement amount (angle) of the vehicle 200 in a rotation direction with the Y axis (pitch axis) shown in FIG. 1 as a central axis can be detected. Note that, in the present embodiment, a pitch angle is calculated. However, a yaw angle or a roll angle may be calculated. For example, all angles around the X axis, the Y axis, and the Z axis may be calculated. The posture detection unit includes, for example, the posture detection device 40 and the displacement amount calculator 52$a$.

The correction amount calculator 52$b$ calculates a correction amount of the display position of the virtual image Iv according to the posture change amount (angle displacement amount) of the vehicle 200. Specifically, the correction amount calculator 52$b$ converts the displacement amount of the angle (pitch angle) calculated by the displacement amount calculator 52$a$ into the number of pixels, and determines a correction amount by which the number of pixels corresponding to the displacement (hereinafter, also referred to as "the number of displacement pixels") is eliminated. For example, the displacement amount calculator 52$a$ determines a correction amount by which a displacement amount of the yaw angle is eliminated. The correction amount calculator 52$b$ outputs the calculated correction amount to the display processing device 30. Note that, in the present embodiment, a correction amount around the pitch axis is calculated. However, a correction amount around the yaw axis and around the roll axis may be calculated. As to a roll angle, a correction amount by which a displacement amount of the roll angle is eliminated without conversion of the angle is determined.

The gradient change detector 52$c$ obtains, in a comparison unit 52$d$ provided inside, a magnitude relationship between a result (hereinafter, referred to as the variation amount X) of the arithmetic processing of output of the displacement amount calculator 52$a$ or output of the displacement amount calculator 52$a$ and a first threshold value a1 as a third threshold value, and determines whether or not the gradient of the traveling path on which the vehicle 200 travels has changed.

The arithmetic processing of output of the displacement amount calculator 52$a$ may be performed by the posture detection device 40 or the displacement amount calculator 52$a$ or the gradient change detector 52$c$ of the correction processing device 50, or another configuration.

The variation amount X is, for example, an angle obtained by integrating the angular velocity detected by the gyro sensor 41. Alternatively, the variation amount X may be, for example, a variation amount in a certain period of time of an angle obtained by integrating the angular velocity detected by the gyro sensor 41. Further, the gradient change detector 52$c$ sets a gradient change determination flag to ON or OFF based on the comparison result between the variation amount X and the first threshold value a1. The gradient change detector 52$c$ outputs, for example, Boolean binary data as the gradient change determination flag. When the variation amount X is equal to or less than the first threshold value a1, the data is TRUE, and when the variation amount X is larger than the first threshold value a1, the data is FALSE. Data output by the gradient change detector 52$c$ is not limited to a Boolean type, and may be an integer type or may be other types.

The storage 53 is a storage medium that stores a program and data required to realize a function of the correction controller 52. Therefore, for example, a program and data necessary for causing an arithmetic device such as a processor to function as the gradient change detector 52$c$ are also stored in the storage 53. The storage 53 can be realized by, for example, a hard disk (HDD), an SSD, a RAM, a DRAM, a ferroelectric memory, a flash memory, a magnetic disk, or a combination of these.

The correction processing device 50 outputs the correction amount to the display processing device 30.

Figure 3A:
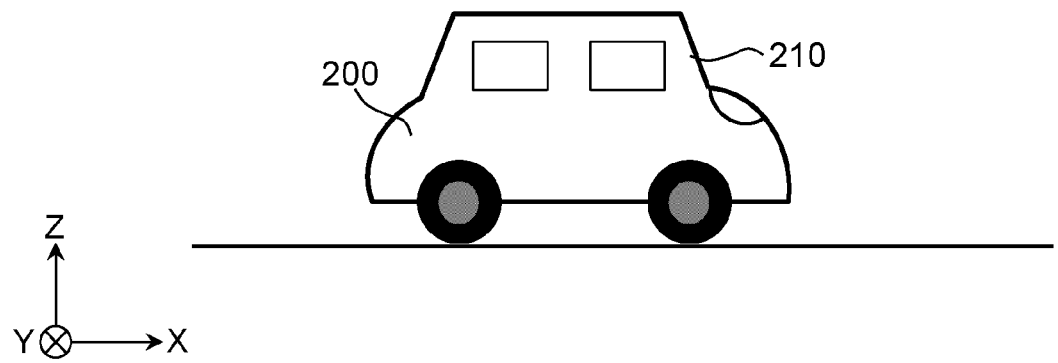
FIG. 3A is a diagram showing an example when a vehicle does not lean.
Figure 3B:
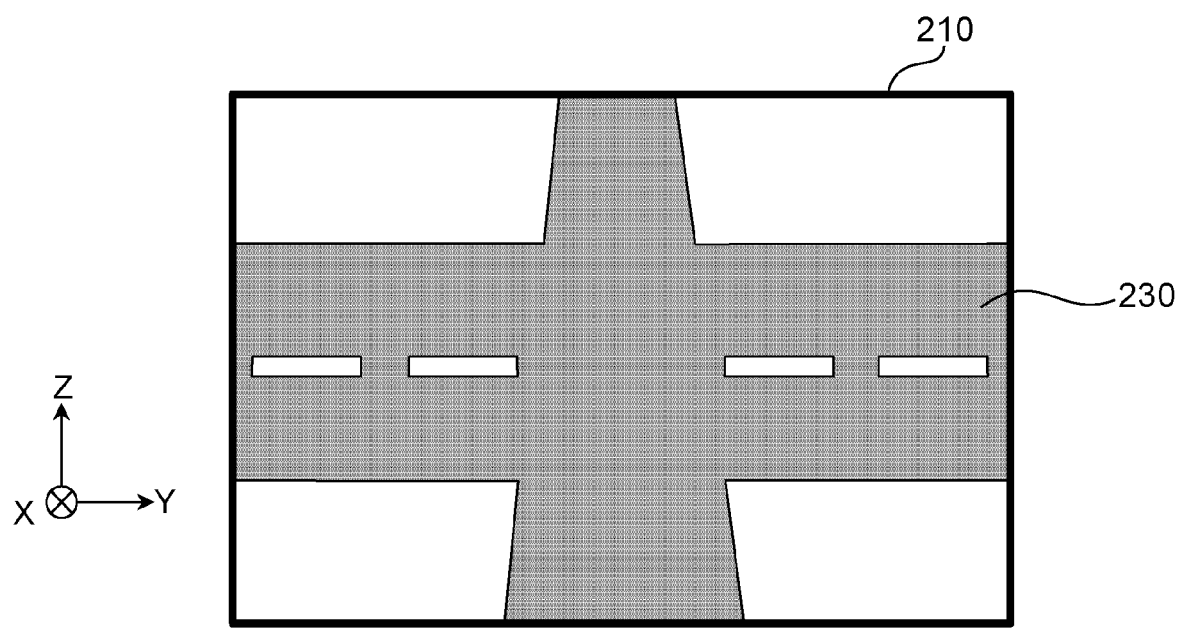
FIG. 3B is a diagram showing an example of an actual view as seen from a windshield.
Figure 3C:
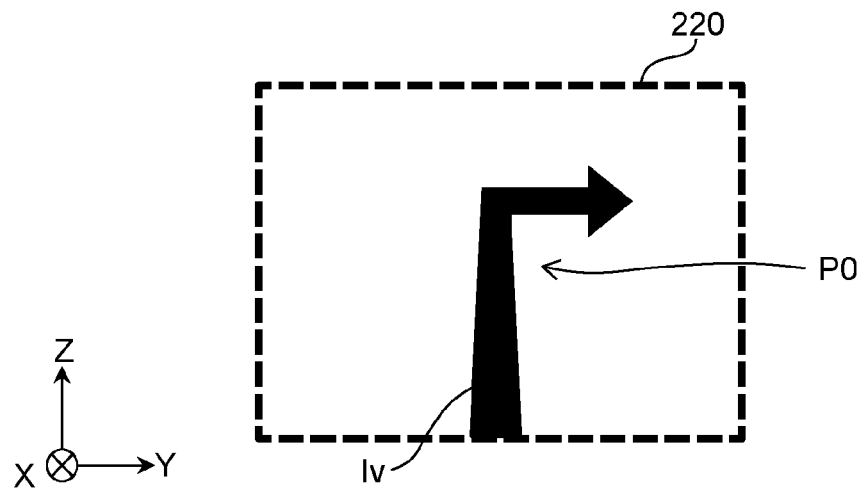
FIG. 3C is a diagram showing an example in which a virtual image is displayed at a reference position.
Figure 3D:
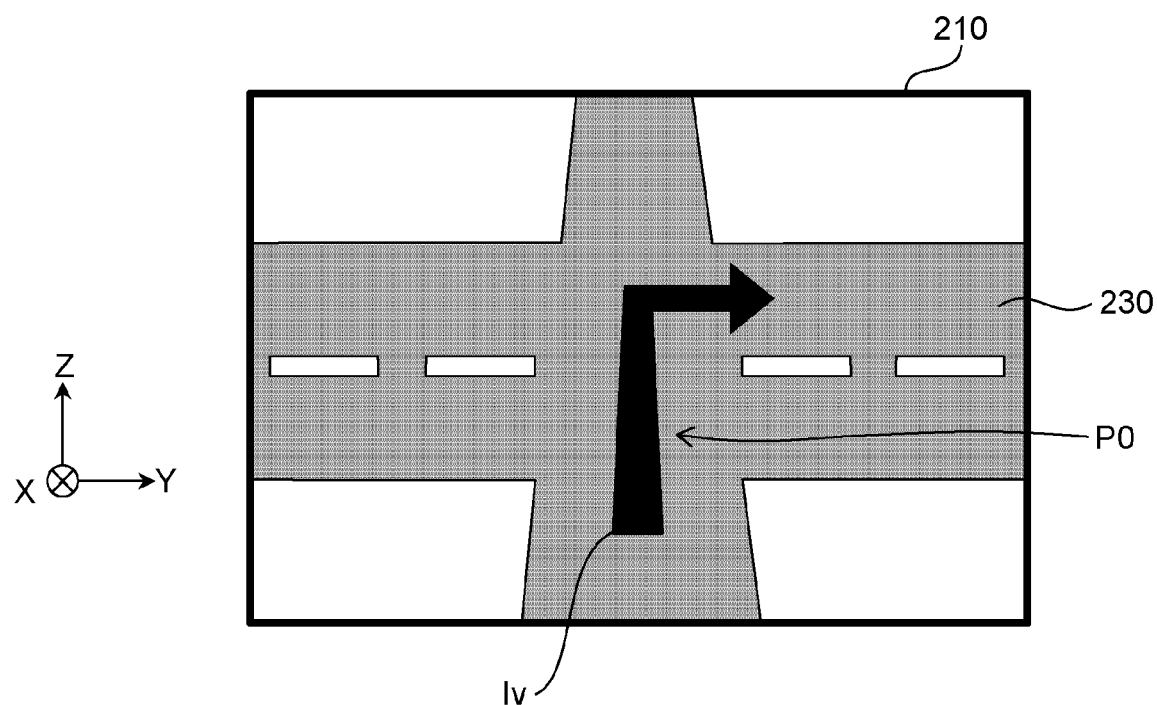
FIG. 3D is a diagram showing an example of augmented reality (AR) display.

Next, AR display will be described with reference to FIGS. 3A to 3D. FIG. 3A shows an example when the vehicle 200 does not lean. FIG. 3B shows an example of an actual view seen from the windshield 210 of the vehicle 200 shown in FIG. 3A. FIG. 3C shows an example of the virtual image Iv seen from the display area 220. FIG. 3D shows an example in which the virtual image Iv shown in FIG. 3C is displayed in a manner superimposed on the actual view shown in FIG. 3B.

The display system 100 superimposes the virtual image Iv shown in FIG. 3C on the actual view shown in FIG. 3B. A reference position (initial position) P0 of the virtual image Iv is a position determined based on the type of the virtual image Iv, the state of the vehicle 200 (position and posture), map data, and the like, and the reference position P0 is determined by an external device. For example, in a case where a display target 230 is a cruising lane and the virtual image Iv is an arrow indicating a traveling direction, the reference position P0 is a display position on liquid crystal display when a tip of an arrow indicates the center of the cruising lane. The reference position P0 is set, for example, at a position of a pixel on liquid crystal display corresponding to the values of the Y coordinate and the Z coordinate in the display area 220 in FIG. 3C. The reference position P0 is acquired from an external device.

The external device can be composed of, for example, a microcomputer, a CPU, an MPU, a GPU, a DSP, an FPGA, or an ASIC and the GPS module 21. A function of the external device may be configured only by hardware, or may be realized by combining hardware and software. The reference position P0 output from the external device may change based on the number of occupants, a change in the load, and a variation in the posture due to a decrease in gasoline and the like, and may be, for example, different from the reference position (initial position) acquired first. Therefore, the display processing device 30 may change the reference position P0 acquired from the external device based on the number of occupants, the change in the load, and the variation in the posture due to the decrease in gasoline and the like. Note that the display processing device 30 may set the reference position P0 based on the vehicle-related information, the map data, and the like. The display processing device 30 may set the size of the virtual image Iv based on the vehicle-related information.

Figure 4A:
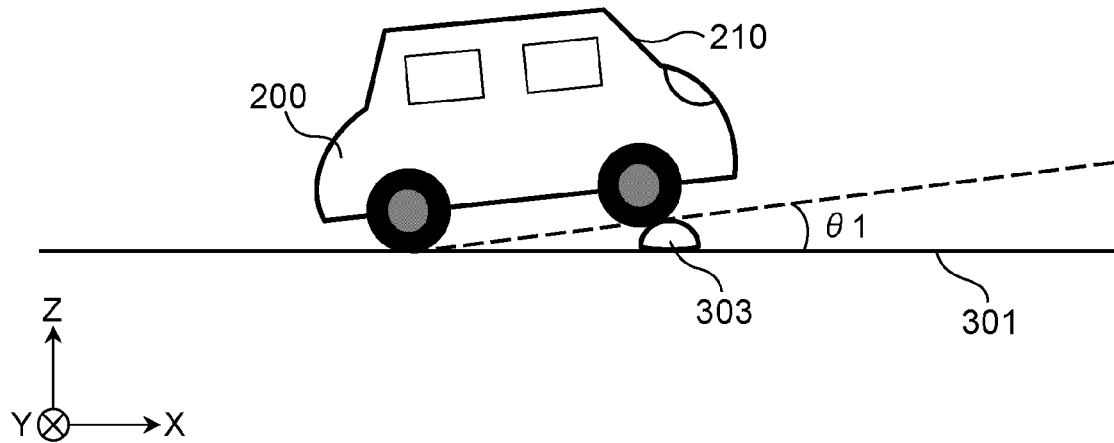
FIG. 4A is a diagram showing a rearward leaning posture of a vehicle.
Figure 4B:
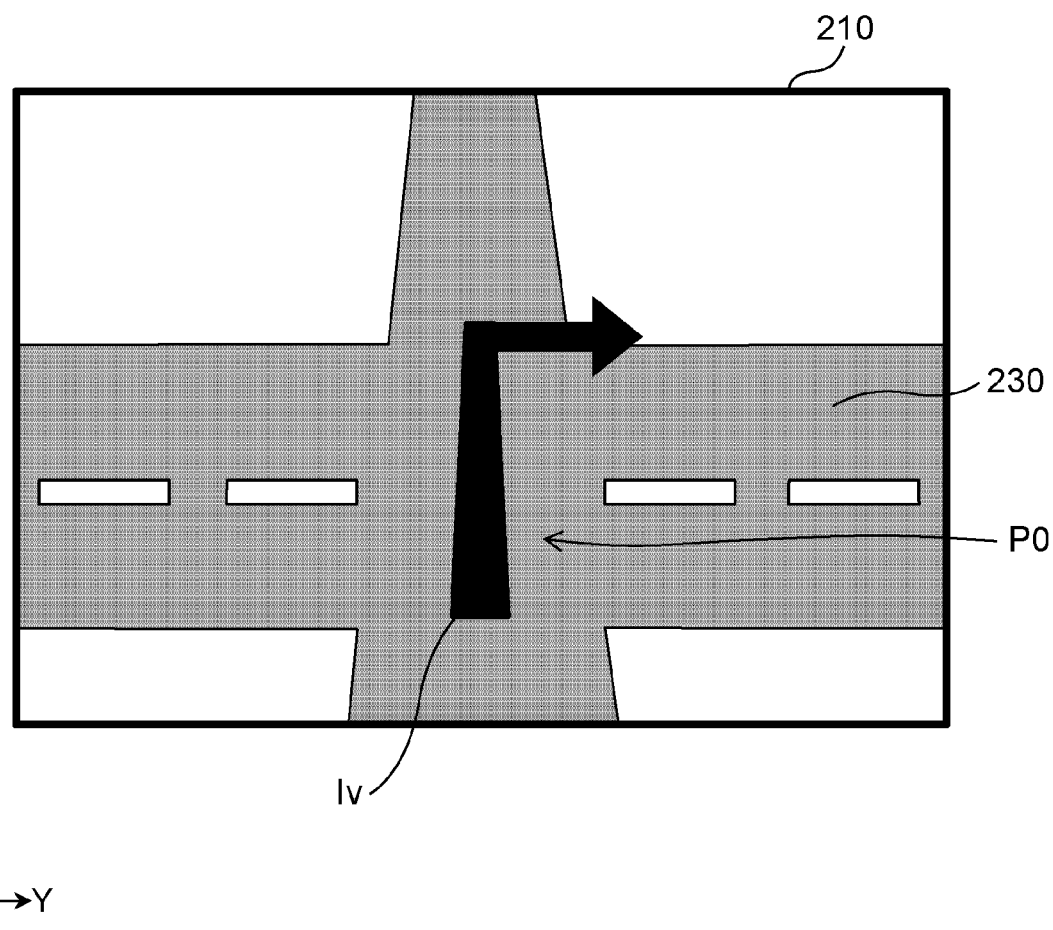
FIG. 4B is a diagram for explaining an example in which position displacement of a virtual image occurs when a vehicle is in a rearward leaning posture.
Figure 4C:
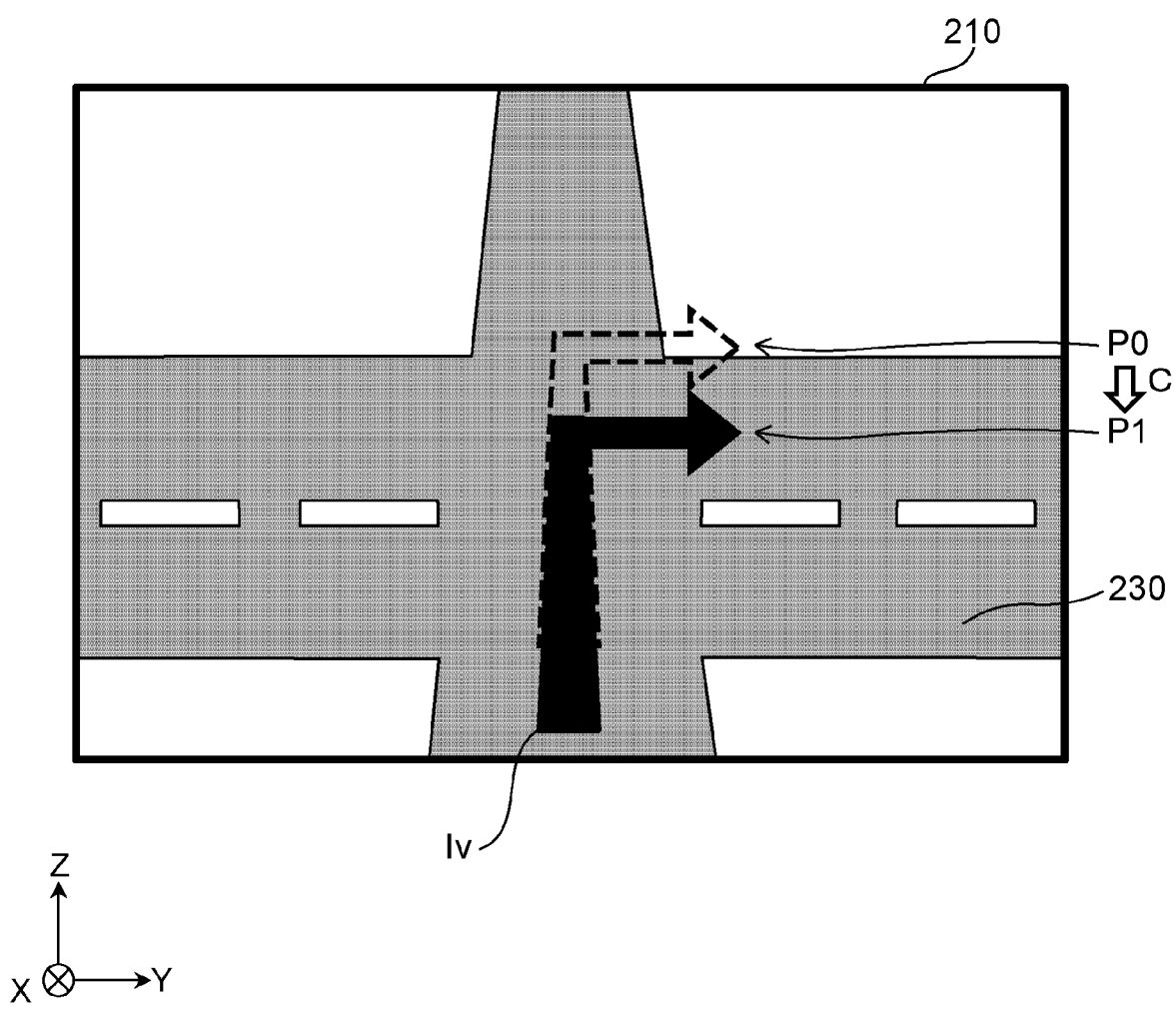
FIG. 4C is a diagram showing a display example of a virtual image after correction.

FIG. 4A shows an example of a state in which vehicle 200 is in a rearward leaning posture. FIG. 4B illustrates a case where the display position of the virtual image Iv is displaced from the display target 230 according to the posture change of the vehicle 200. FIG. 4C shows the display position of the virtual image Iv after correction.

The vehicle 200 may lean due to unevenness of the road surface, sudden acceleration or deceleration of the vehicle 200, or the like. For example, when the vehicle 200 runs on a projecting portion 303 of a road surface 301, the vehicle 200 is in a rearward leaning posture as illustrated in FIG. 4A. In this case, as shown in FIG. 4B, the position of the display target 230 seen from the windshield 210 changes according to an inclination θ1 with respect to a traveling path of the vehicle 200. For this reason, in a case where the virtual image Iv is displayed at the reference position P0, the virtual image Iv is displaced from the display target 230.

For example, as illustrated in FIG. 4B, when the vehicle 200 is in a rearward leaning posture due to the projecting portion 303 of the road surface 301, the position of the display target 230 changes downward from the position during the normal traveling. Therefore, the tip of the arrow of the displayed virtual image Iv displayed at the reference position P0 is displaced to the outside of the lane. Therefore, the display system 100 adjusts the display position of the virtual image Iv in the direction of eliminating the displacement according to the posture of the vehicle 200.

Specifically, as shown in FIG. 4C, the correction processing device 50 calculates a correction amount C so that the display position becomes a position P1 where there is no displacement in the display position due to the angle of the vehicle 200. That is, the display processing device 30 sets the display position of the virtual image Iv to "reference position P0+correction amount C". In this manner, the projection device 10 can display the virtual image Iv at the position P1 corresponding to the display target 230. As described above, even in a case where the vehicle 200 leans, the display position of the virtual image Iv is changed from the reference position P0 based on the correction amount C, so that the virtual image Iv can be displayed at the position P1 corresponding to the display target 230 in the actual view.

Figure 5A:
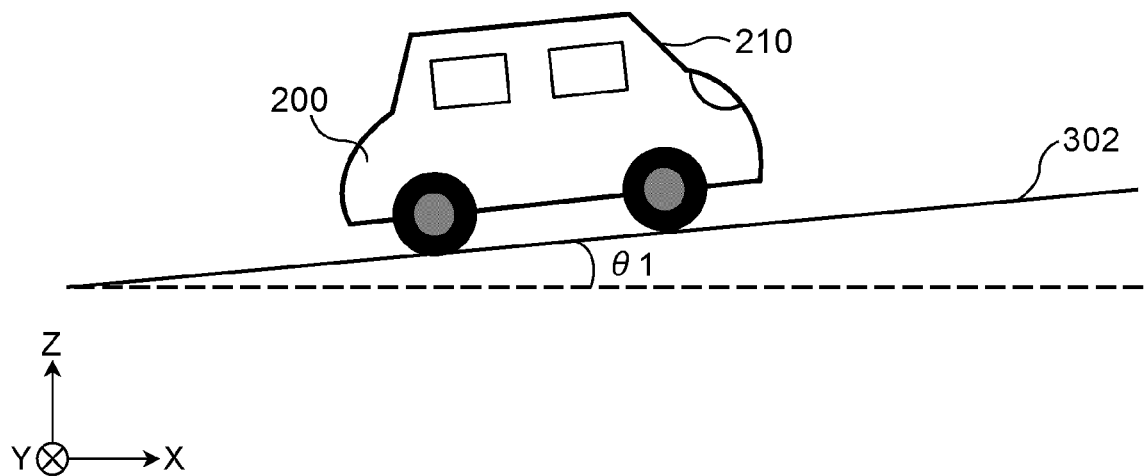
FIG. 5A is a diagram showing a rearward leaning posture of a vehicle traveling on an inclined traveling path.
Figure 5B:
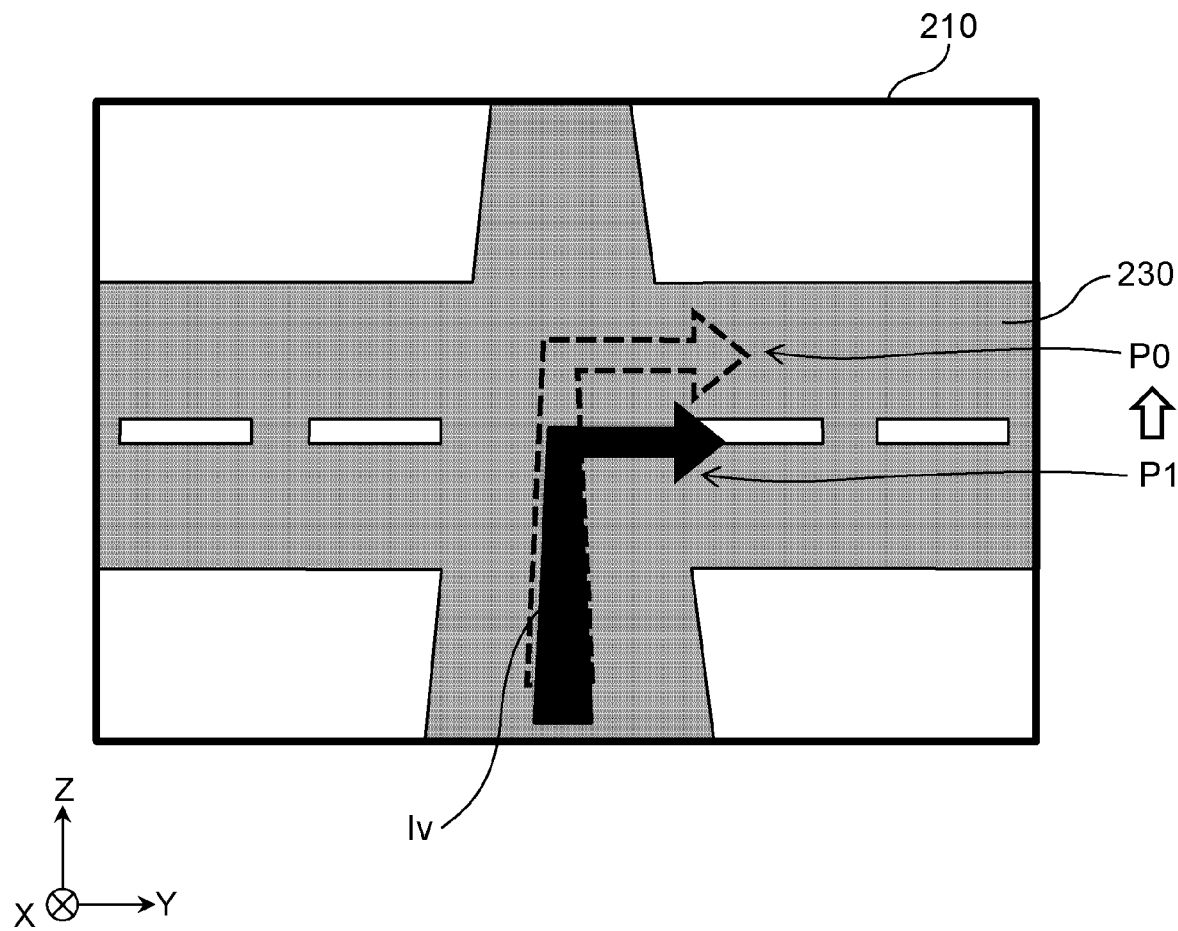
FIG. 5B is an explanatory diagram showing an example in which corrected position displacement of a virtual image occurs when a vehicle is in a rearward leaning posture.

However, if the display position of the virtual image Iv is corrected according to the posture change of the vehicle 200, a problem occurs when the vehicle 200 travels on an inclined surface. FIG. 5A shows an example of a state in which the vehicle 200 is climbing an inclined surface. FIG. 5B exemplifies a case where the display position of the virtual image Iv is corrected in accordance with the posture change of the vehicle 200, and as a result, the virtual image Iv is displaced from the display target 230.

In a case where the vehicle 200 climbs, for example, a slope 302 having an inclination θ1, the vehicle posture changes before and after the climbing due to the influence of the slope 302, and thus the display position of the virtual image Iv is set to "reference position P0+correction amount C". However, since the vehicle 200 travels in parallel along an inclined surface of the slope 302, it is not necessary to correct the display position of the virtual image Iv. However, the virtual image Iv is displayed at a position displaced downward from the display target 230 by unnecessary correction processing.

FIG. 5B illustrates a case where the display position of the virtual image Iv is displaced from the display target 230 due to gradient of a traveling path. As described above, for example, when the vehicle 200 travels parallel to an inclined surface even if the gradient of the traveling path changes, the angular velocity detected by the gyro sensor 41 includes a component of a gradient change of the traveling path even though the vehicle is not inclined with respect to the traveling path. Accordingly, the correction is performed based on an angle of the gradient change. In this case, although the vehicle 200 is not actually inclined with respect to the traveling path, a change in inclination of the vehicle 200 due to a gradient change of the traveling path is detected, and the correction amount C does not become zero. For this reason, the display position (=reference position P0+correction amount C) of the virtual image Iv is displaced significantly from the display target 230. For example, the actually displayed position P1 (=reference position P0+correction amount C) does not become the reference position P0 at which the virtual image Iv is to be displayed with respect to the display target 230. In the present embodiment, in order to reduce a position displacement caused by the gradient of the traveling path, the correction amount C is reset to zero when the gradient of the traveling path changes, as described later.

As will be described later, the display system 100 of the present embodiment reduces the correction amount C based on the output of the gradient change detector 52c, that is, a variation amount related to the posture change of the vehicle. Specifically, when the variation amount X is larger than the first threshold value a1, the correction amount C is reset to zero. In this manner, when the variation amount X is larger than the first threshold value a1, the display position of the virtual image Iv is returned to the reference position P0 at which the virtual image Iv is to be displayed.

2. Operation of Display Processing Device

Figure 6:
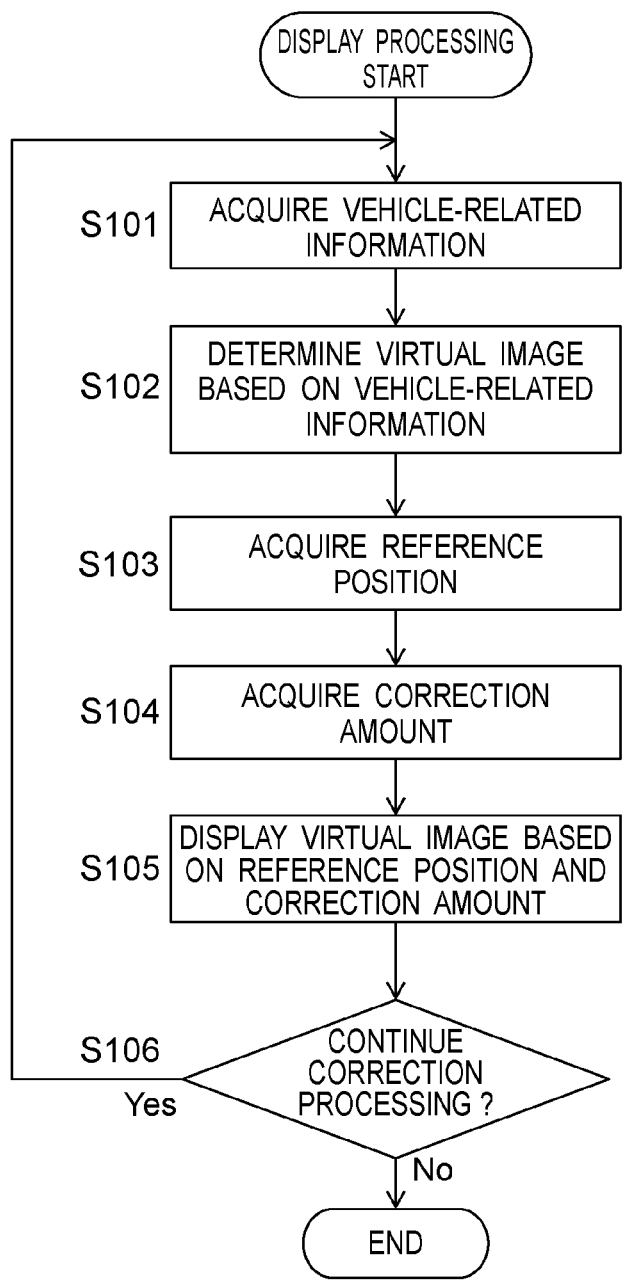
FIG. 6 is a flowchart showing display processing in the first embodiment.

FIG. 6 shows display processing performed by the display controller 32 of the display processing device 30. The display processing shown in FIG. 6 is started, for example, when the engine of the vehicle 200 is started or when a button for giving an instruction to start displaying the virtual image Iv is operated.

The display controller 32 acquires the vehicle-related information from the information acquisition device 20 (S101). The display controller 32 determines the virtual image Iv to be displayed based on the vehicle-related information (S102). The display controller 32 acquires the reference position P0 of the virtual image Iv from an external device (S103). The display controller 32 acquires the correction amount C of the display position output from the correction processing device 50 (S104).

The display controller 32 causes the projection device 10 to display the virtual image Iv based on the reference position P0 and the correction amount C (S105). For example, the display controller 32 reads the image data 33i of the virtual image Iv corresponding to the display target from the storage 33, sets the display position of the virtual image Iv to "reference position P0+correction amount C", and outputs the display position to the projection device 10.

The display controller 32 determines whether or not to continue the display processing (S106). For example, the display controller 32 ends the display processing when the engine of the vehicle 200 is stopped or when a button for giving an instruction to end the display of the virtual image Iv is operated. In a case where the display processing is continued, the processing returns to Step S101.

3. Operation of Correction Processing Device

Figure 7:
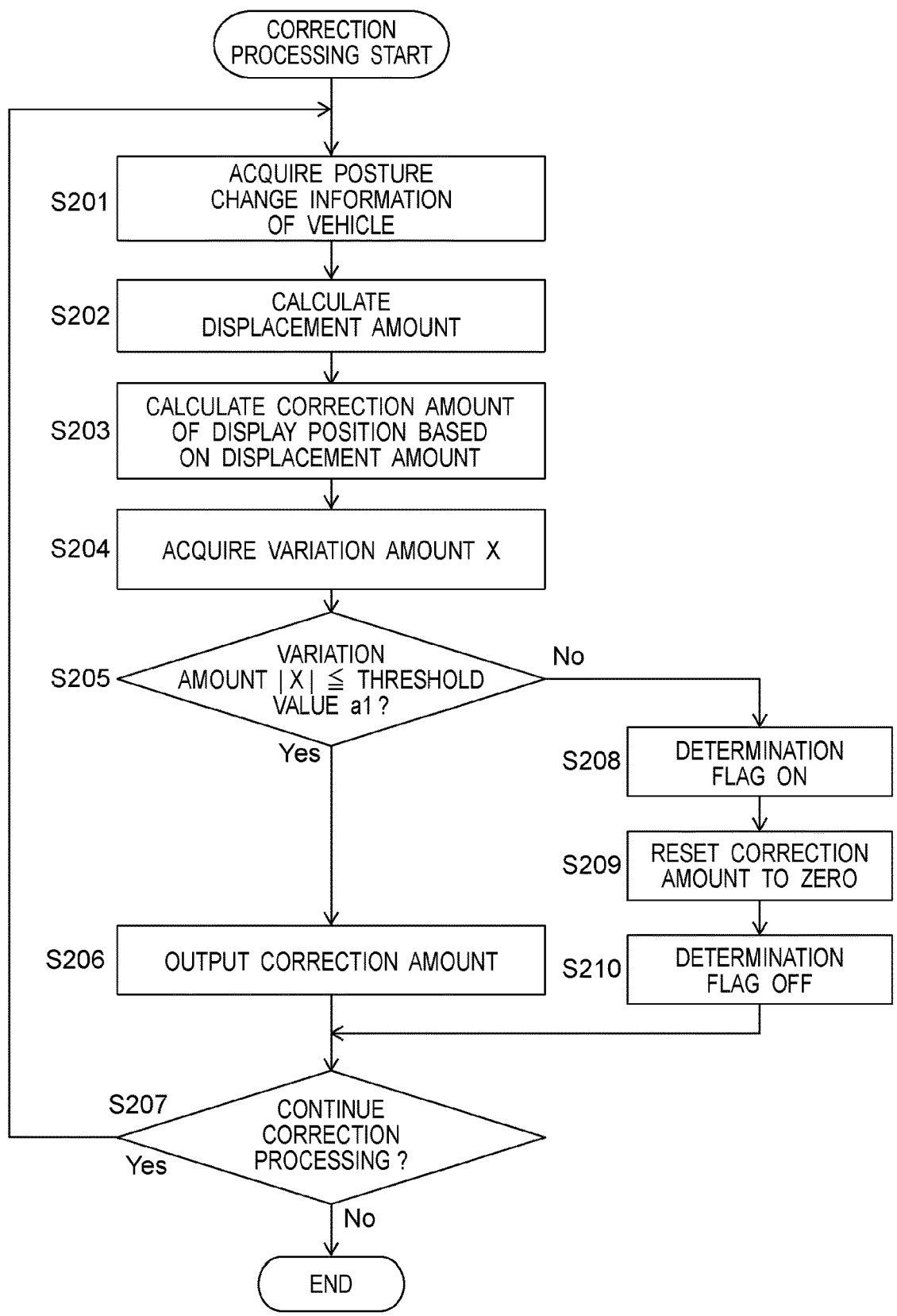
FIG. 7 is a flowchart showing correction processing in the first embodiment.

FIG. 7 shows correction processing performed by the correction controller 52 of the correction processing device 50. The correction processing shown in FIG. 7 is started, for example, when the engine of the vehicle 200 is started or when a button for giving an instruction to start displaying the virtual image Iv is operated. The correction processing of FIG. 7 is started, for example, together with the display processing of FIG. 6. Note that the correction processing shown in FIG. 7 may be started when the button for instructing the start of the position correction of the virtual image Iv is operated.

The displacement amount calculator 52a acquires the posture change information indicating the angular velocity output from the gyro sensor 41 (S201). The displacement amount calculator 52a calculates the posture of the vehicle 200, for example, a displacement amount (posture change amount) which is an angle with respect to the pitch direction, based on the acquired posture change information (S202). Specifically, the displacement amount calculator 52a calculates the pitch angle of the vehicle 200 by integrating the angular velocity. The correction amount calculator 52b calculates the correction amount C of the display position of the virtual image Iv based on a displacement amount with respect to the pitch directions (S203). Specifically, the correction amount calculator 52b converts the displacement amount of the vehicle 200 in the pitch direction into the number of pixels, and determines the correction amount C that cancels a displacement amount indicated by the number of pixels.

In the present embodiment, the correction amount C is defined as "correction amount C=−(current displacement amount)+(displacement amount at the time of zero reset)". Hereinafter, the displacement amount at the time of zero reset is also referred to as an offset value. The initial value of the offset value is, for example, zero. In the calculation of the correction amount in Step S203, the configuration may be such that the displacement amount calculator 52a calculates, in units of angle, "−current posture (angle)+offset value (angle)" and outputs the value to the correction amount calculator 52b, and the calculation unit 52b converts the input value into the number of pixels. Further, the configuration may be such that the displacement amount calculator 52a outputs the current posture (angle) to the correction amount calculator 52b, and the correction amount calculator 52b converts the posture (angle) into the number of pixels, and then calculates "−current displacement amount (number of pixels)+offset value (number of pixels)".

The comparison unit 52d acquires the variation amount X (output of the displacement amount calculator 52a or an arithmetic processing result based on output of the displacement amount calculator 52a) (S204). The variation amount X may be, for example, a pitch angle detected by the displacement amount calculator 52a or a variation amount in a predetermined unit time of the detected pitch angle. Then, the comparison unit 52d compares an absolute value of the variation amount X with the first threshold value a1 (S205).

If the variation amount X is equal to or less than the first threshold value a1 (Yes in S205), the correction amount calculator 52b outputs the calculated correction amount C to the display processing device 30 (S206). In this manner, the virtual image Iv is displayed at the position indicated by the "reference position P0+correction amount C".

Figure 8A:
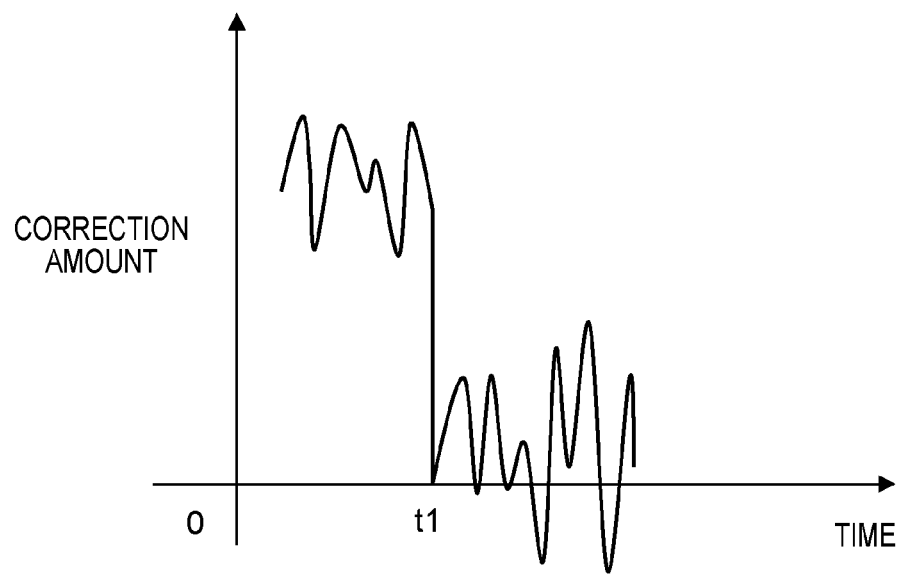
FIG. 8A is an explanatory diagram showing an example of resetting a correction amount to zero.

In a case where the variation amount X is larger than the first threshold value a1 (No in S205), the gradient change detector 52c determines that the posture change of the vehicle due to a gradient change of the traveling path is completed and sets the determination flag to ON (S208), and the correction controller 52 resets the correction amount C to zero at the timing of the determination flag ON (S209). The gradient change detector 52c sets the determination flag to OFF after completion of zero reset (S210). Specifically, for example, the displacement amount calculator 52a sets the offset value (angle) to "offset value (angle)=posture (angle)". In this manner, the angle indicated by "−posture (angle)+offset value (angle)", that is, zero degrees is output from the displacement amount calculator 52a to the correction amount calculator 52b. Alternatively, the correction amount calculator 52b converts the posture change amount (angle) calculated by the displacement amount calculator 52a into the number of pixels (the number of displacement pixels), and sets the offset value (the number of pixels) to "offset value (number of pixels)=number of displacement pixels". In this manner, the correction amount C calculated by "−displacement amount (number of pixels)+offset value (number of pixels)" becomes zero. FIG. 8A is an explanatory diagram explaining an example of resetting the correction amount C to zero. For example, the correction amount C is immediately reset to zero at time t1. As described above, when the variation amount X related to the posture change of the vehicle is larger than the first threshold value a1, the display position is returned to the reference position P0.

The correction controller 52 determines whether or not to continue the correction processing (S207). For example, the correction controller 52 ends the correction processing when the engine of the vehicle 200 is stopped or when a button for giving an instruction to end the display of the virtual image Iv is operated. In a case where the correction processing is continued, the processing returns to Step S201. After the processing returns to Step S201, the offset value set previously in Step S209 is used in the calculation of the correction amount in Step S203 next. Even after the correction amount C is reset to zero, the correction of the display position is continued based on the displacement amount.

As described above, in the present embodiment, "offset value=displacement amount" is set when the variation amount X is larger than the first threshold value a1, so that the correction amount C is set to zero. In other words, when the variation amount X is larger than the first threshold value a1, the display position is reset to the reference position P0. Since "correction amount C=−displacement amount+offset value", the "reference position P0+correction amount C" that is the display position when the virtual image Iv is displayed next time (Step S105 in FIG. 6) is equivalent to "reference position P0+offset value−displacement amount".

Figure 9:
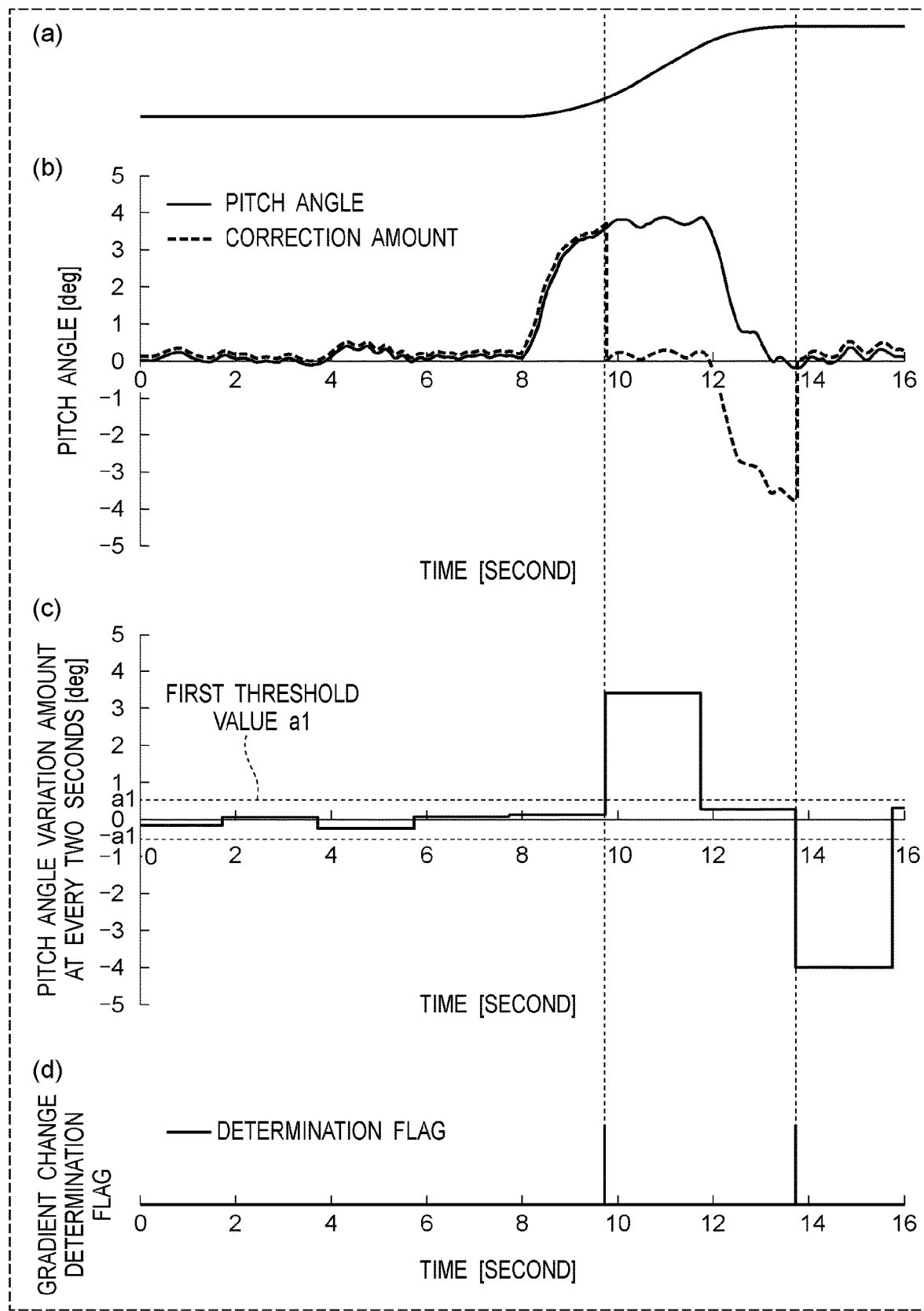
FIG. 9 is a diagram showing a relationship between an inclined traveling path, a variation amount of a pitch angle, a variation amount of a pitch angle per unit time, and a gradient change determination flag.

FIG. 9 is a diagram illustrating a relationship between an inclined traveling path on which the vehicle 200 of the present embodiment travels, a pitch angle of the vehicle 200, a variation amount of the pitch angle per unit time, and the gradient change determination flag. FIG. 9(a) illustrates an example of a slope on which vehicle 200 climbs. FIG. 9(b) is a graph showing the pitch angle detected by the gyro sensor 41. FIG. 9(c) is a graph showing a variation amount of the pitch angle every two seconds. FIG. 9(d) is a diagram showing ON and OFF of the gradient change determination flag.

While the vehicle 200 is traveling, the gyro sensor 41 detects vibration (angular velocity) in the pitch angle caused by unevenness of the traveling path. Further, when the vehicle 200 starts to climb a slope, the pitch angle changes significantly because the gradient of the traveling path changes. The variation amount X in the pitch angle is calculated every predetermined unit time T1. Note that, in FIG. 9, the unit time T1 is set to two seconds as an example. For example, when (time, pitch angle)=(t, p1), (t+T1, p2), the variation amount X is calculated as follows:

$$X=(p2-p1)/(t+T1-t)=(p2-p1)/T1 \tag{1}$$

When an absolute value |X| of the variation amount X is larger than the first threshold value a1 (X>a1 or X<−a1), the gradient change detector 52c determines that the gradient of the traveling path has changed and sets the determination flag to ON. Since the variation amount X>a1 is established after about ten seconds from the start of traveling, the gradient change detector 52c determines that the gradient of the traveling path has changed due to entry of the vehicle 200 to a slope, and sets the determination flag to ON. As illustrated in FIG. 9(b), the correction controller 52 resets the correction amount in the pitch angle to zero on the basis of the determination result. Further, since the variation amount X<−a1 is established after about 14 seconds from the start of traveling, the gradient change detector 52c determines that the gradient of the traveling path has changed due to exit of the vehicle 200 from the slope, and sets the determination flag to OFF. The correction controller 52 resets the correction amount in the pitch angle to zero on the basis of the determination result. Note that, when the correction amount in the pitch angle is reset to zero, the gradient change detector 52c sets the determination flag to OFF.

4. Effect, Supplement, and the Like

The gradient change detection system for a moving body for detecting a change in a gradient of a traveling path of the present invention includes the posture detection device 40 and the displacement amount calculator 52a that detect a pitch angle in a rotation direction about the left-right direction with respect to a traveling direction of the vehicle 200, and the gradient change detector 52c that detects a change in a gradient of a traveling path based on the pitch angle or a variation amount in predetermined unit time of the pitch angle. Further, the storage medium that stores the program for a moving body of the present disclosure is the storage medium that stores a program for the vehicle 200 for the arithmetic device (correction processing device 50) constituting the gradient change detector 52c to detect a change in a gradient of a traveling path, and causes the arithmetic device to execute a gradient change detection step of detecting a change in a gradient of a traveling path on the basis of the pitch angle input from the displacement amount calculator 52a or on the basis of the variation amount in the pitch direction of the vehicle 200 in unit time, for example, two seconds. The gradient change detection step corresponds to, for example, Step S205. Further, the program for a moving body of the present disclosure is a program for the vehicle 200 for detecting an posture change due to vibration of the moving body excluding a posture change of the moving body due to a change in a gradient, and executes a gradient change component removal step of removing a posture change component of the vehicle 200 due to a gradient change from an output result of the posture detection device 40 on the basis of an execution result of the gradient change detection step. The gradient change component removal step corresponds to, for example, Step S209.

In this manner, it is possible to detect a change in the gradient of the traveling path, and it is possible to detect that a posture change of the vehicle 200 is caused by a gradient change of the traveling path. Then, based on the detection result of the gradient change, the posture change of the vehicle 200 excluding the posture change caused by the gradient change can be detected. Therefore, it is also possible to detect the entry of the vehicle 200 from a flat ground to a slope and the exit from the slope to a flat ground, and it is possible to detect a posture change due to vibration of the vehicle 200 caused by a shape of a road surface after the entry to and the exit from the slope and the acceleration and deceleration of the vehicle 200.

Further, the display system 100 of the present disclosure includes the display processing device 30 that controls display of the virtual image Iv, the posture detection device 40 and the displacement amount calculator 52a that detect a pitch angle in a rotation direction around the left-right direction with respect to the traveling direction of the vehicle 200, the correction processing device 50 that includes the correction amount calculator 52b that calculates a correction amount of the display position of the virtual image Iv based on the pitch angle, and the gradient change detector 52c that detects a change in the gradient of the traveling path based on the pitch angle or based on a variation amount in predetermined unit time of the pitch angle. The display processing device 30 displays the virtual image Iv on the basis of the reference position and the correction amount, and the correction processing device 50 adjusts the correction amount on the basis of a detection result of the gradient change detector 52c.

In this manner, erroneous correction due to a change in the gradient of the traveling path can be suppressed, and the virtual image Iv can be appropriately displayed.

By resetting the correction amount C to zero, it is possible to reduce a displacement amount of the display position by a posture change due to traveling on a slope. In a case where the variation amount X is the pitch angle and an absolute value of the variation amount X is larger than the first threshold value a1, that is, in a case where the posture of the vehicle 200 changes by a certain amount or more, it is determined that a posture change of the vehicle 200 has occurred due to traveling on a slope, and the correction amount is reset. In a case where the variation amount X is a variation amount of the pitch angle in unit time, when an absolute value of the variation amount X in unit time is larger than the first threshold value a1, that is, in a case where the posture of the vehicle 200 changes continuously for a certain period of time, it is determined that a posture change of the vehicle 200 has occurred due to traveling on a slope, and the correction amount is reset. In this manner, it is possible to reduce influence of a posture change of the vehicle 200 due to a gradient change of the traveling path and accurately correct the posture change of the vehicle 200 due to unevenness of the traveling path. Note that, when an absolute value of the variation amount X in unit time is larger than the first threshold value a1, it may be recognized that the posture change due to traveling on a slope is completed. Further, when the gradient of the traveling path changes, an absolute value of the variation amount X becomes larger than the first threshold value a1. Since the correction amount is reset every time the above occurs, the correction amount can be reset even in a case where the gradient of the traveling path changes during traveling. Therefore, it is possible to suppress displacement of the display position by a posture change of the vehicle due to a change in the gradient. Further, when an absolute value of the variation amount X is equal to or less than the first threshold value a1, it is determined that vibration is vibration of the vehicle 200 according to unevenness of a road surface, and the display position is corrected by the correction amount C based on the vehicle posture.

Further, the display system 100 of the present embodiment further includes the projection device 10 that projects light representing a virtual image. In the present embodiment, the moving body is a vehicle, and the image is a virtual image displayed in front of the windshield of the vehicle. According to the present embodiment, it is possible to suppress erroneous correction of the display position of the virtual image due to a change in the gradient of the traveling path.

Note that the method of resetting the correction amount C to zero in Step S209 is optional. In the present embodiment, "correction amount C=−displacement amount+offset value" is used. However, the correction amount C may be "correction amount C=−displacement amount". In this case, the correction amount C is reset to zero by setting the displacement amount itself to zero. Specifically, in a case where the vehicle posture is calculated based on the output of the gyro sensor 41, the integration amount of the angular velocity calculated by the displacement amount calculator 52a is reset to zero.

Figure 8B:
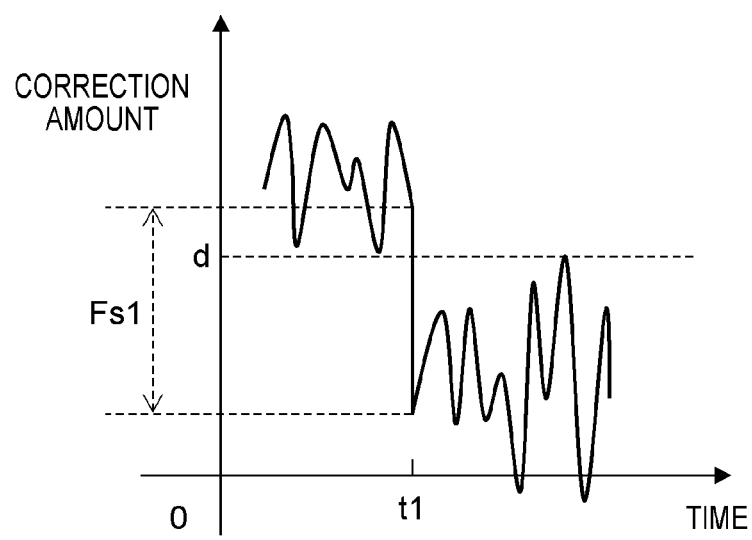
FIG. 8B is an explanatory diagram showing an example of reducing a correction amount by a certain amount.
Figure 8C:
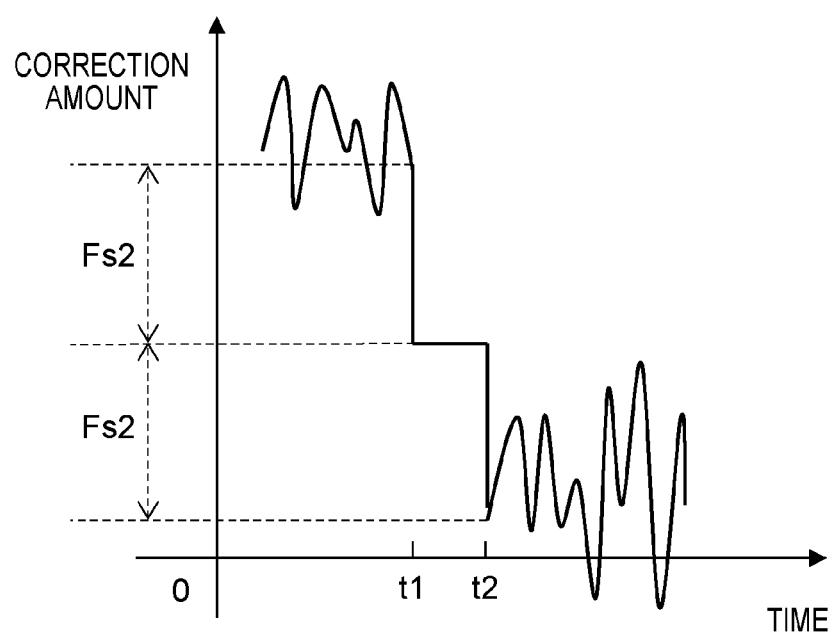
FIG. 8C is an explanatory diagram showing an example of reducing a correction amount by a certain amount.

Further, in Step S209, instead of resetting the correction amount C to zero, the size of the correction amount C may be reduced by a predetermined amount so as not to become zero. In this case, the correction processing device 50 reduces the size of the correction amount C by a predetermined amount (a value smaller than the correction amount C) in a manner that the size of the correction amount C does not become zero. Specifically, for example, the correction amount calculator 52b sets "offset value=predetermined amount" in "correction amount C=(displacement amount−offset value)". The predetermined amount may be set according to the display position in the display area 220 of the virtual image Iv. As shown in FIG. 8B, for example, at time t1, the size of the correction amount C is reduced by an offset value Fs1 of a certain amount. Further, the correction amount C may be reduced stepwise as shown in FIG. 8C. For example, the size of the correction amount C may be reduced by a fixed offset value Fs2 at time t1, and may be reduced by the offset value Fs2 again at time t2. Note that the number of times of reduction may be three or more, and the offset value may be changed depending on the number of times.

As described above, in a case where an absolute value of the variation amount X is larger than the first threshold value a1, the correction processing device 50 reduces the correction amount C by a predetermined amount, so that the position of the virtual image Iv approaches the reference position P0. Since the position of the virtual image Iv does not suddenly change significantly, it is possible to prevent the occupant D from feeling uncomfortable with the change in the display position of the virtual image Iv. That is, it is possible to suppress a feeling of uncomfortableness due to the shift of the display position.

Note that, instead of making the correction amount C smaller than the predetermined amount, the offset value may be set to a value smaller by a certain amount than a displacement amount when an absolute value of the variation amount X is larger than the first threshold value a1.

Second Embodiment

When an absolute value of the variation amount X is larger than the first threshold value a1, the correction amount C is reset to zero or the correction amount C is reduced by a predetermined amount in a manner that the size of the correction amount C does not become zero in the first embodiment. In the present embodiment, a change amount of the correction amount is changed according to the size of the correction amount C. Specifically, in a case where the correction amount C is equal to or more than a threshold value d, the correction amount C is reduced by a predetermined amount in a manner that the size of the correction amount C does not become zero, and in a case where the correction amount C is less than the threshold value d, the correction amount is reset to zero.

Figure 10:
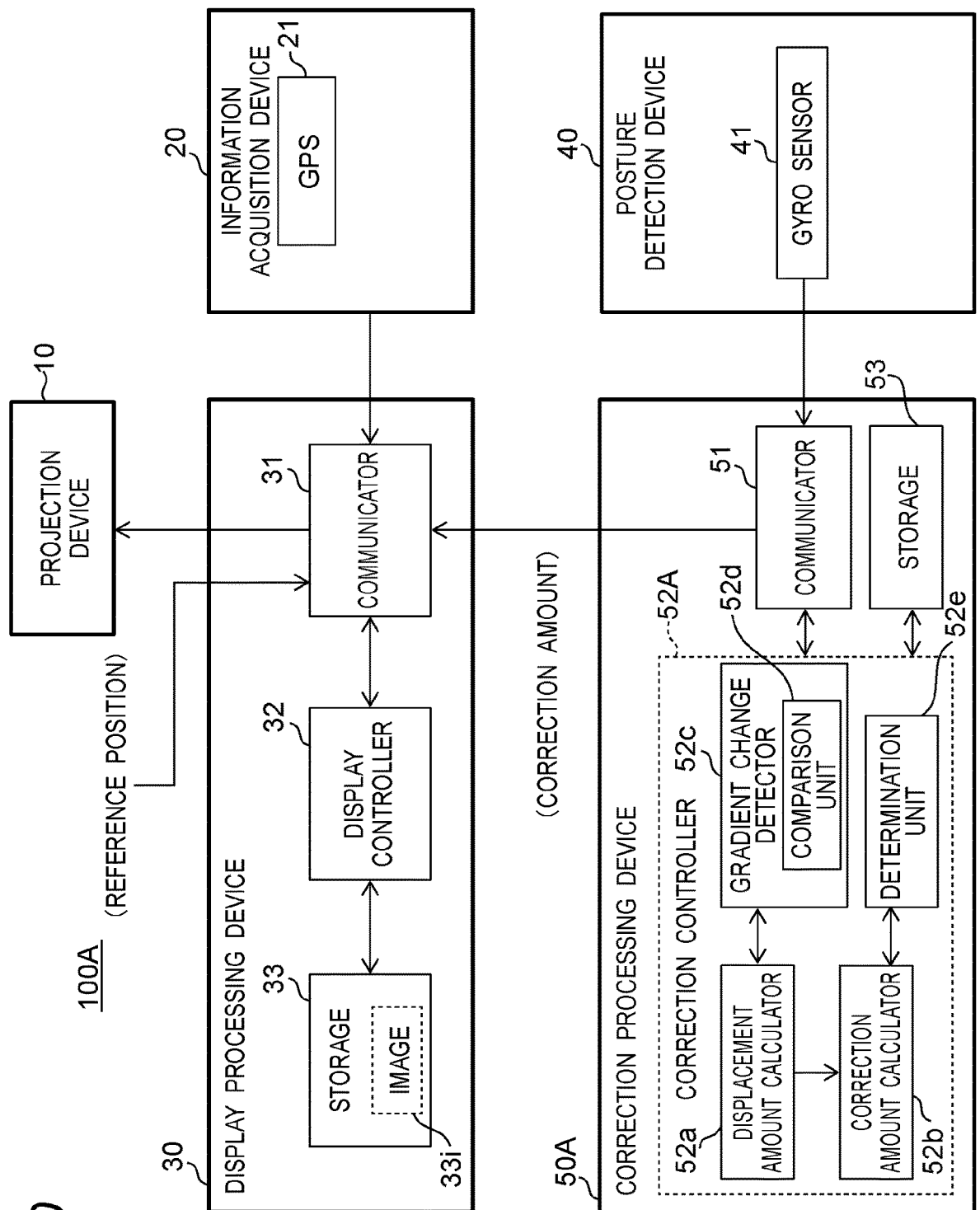
FIG. 10 is a block diagram showing an internal configuration of a display system according to second, fourth, and fifth to seventh embodiments.
Figure 11:
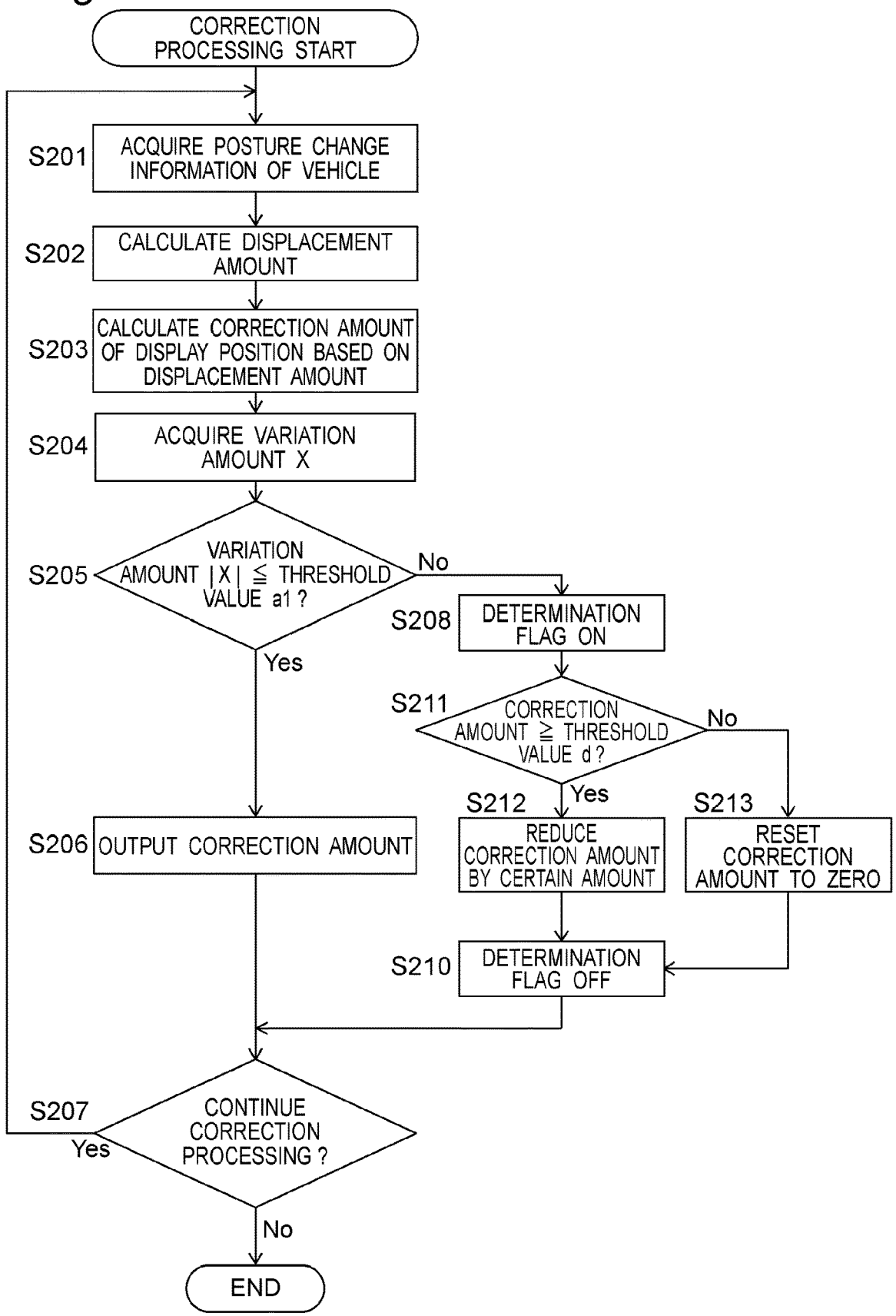
FIG. 11 is a flowchart showing the correction processing in the second embodiment.

FIG. 10 is a block diagram illustrating an internal configuration of a display system 100A according to a second embodiment. The display system 100A according to the second embodiment has a configuration in which a determination unit 52e is added to the correction controller 52 of the correction processing device 50 according to the first embodiment. FIG. 11 shows the correction processing in the second embodiment. Steps S201 to S208 and S210 in FIG. 11 of the second embodiment are the same as those of the first embodiment.

Figure 12:
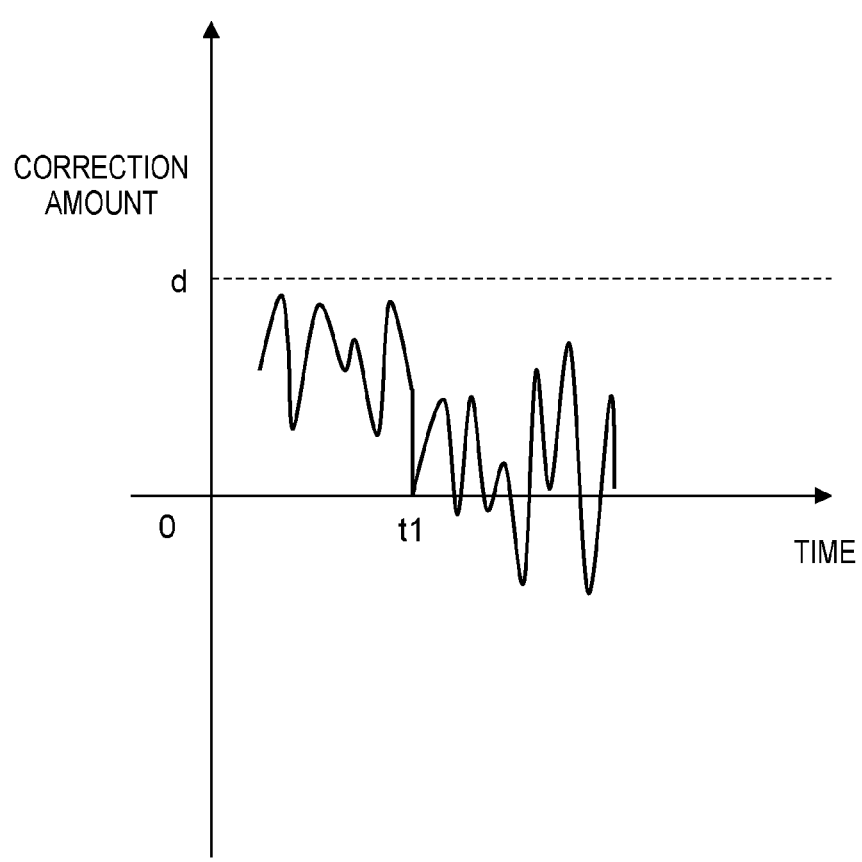
FIG. 12 is an explanatory diagram showing an example of resetting a correction amount to zero.

In the present embodiment, in a case where an absolute value of the variation amount X is larger than the first threshold value a1 (No in S205), the gradient change detector 52c sets the determination flag to ON (S208). In a state where the determination flag is ON, the determination unit 52e determines whether or not the correction amount C calculated in Step S203 is equal to or more than the threshold value d (S211). If the correction amount C is equal to or more than the threshold value d (Yes in S211), the correction amount C is reduced by a predetermined certain amount (a value smaller than the correction amount C) Fs1 in a manner that the size of the correction amount C does not become zero as illustrated in FIG. 8B (S212). Specifically, for example, the correction amount calculator 52b sets "offset value=predetermined amount" in "correction amount C=−(displacement amount−offset value)". If the correction amount C is smaller than the threshold value d (No in S211), the correction amount C is reset to zero as illustrated in FIG. 12 (S209). Specifically, "offset value=displacement amount" is set. After the correction amount C is reduced by a predetermined certain amount or the correction amount C is reset to zero, the gradient change detector 52c sets the determination flag to OFF (S210).

As described above, the correction processing device 50 reduces the correction amount by a certain amount in a case where the correction amount C is equal to or more than the threshold value d, and resets the correction amount to zero in a case where the correction amount C is smaller than the threshold value d. In this manner, the display position can be corrected according to the inclination of the traveling path without causing any visual discomfort.

Third Embodiment

In the second embodiment, in a case where the correction amount is not zero, the correction amount is reduced by a certain amount. In a third embodiment, the correction amount is reduced over time.

Figure 13:
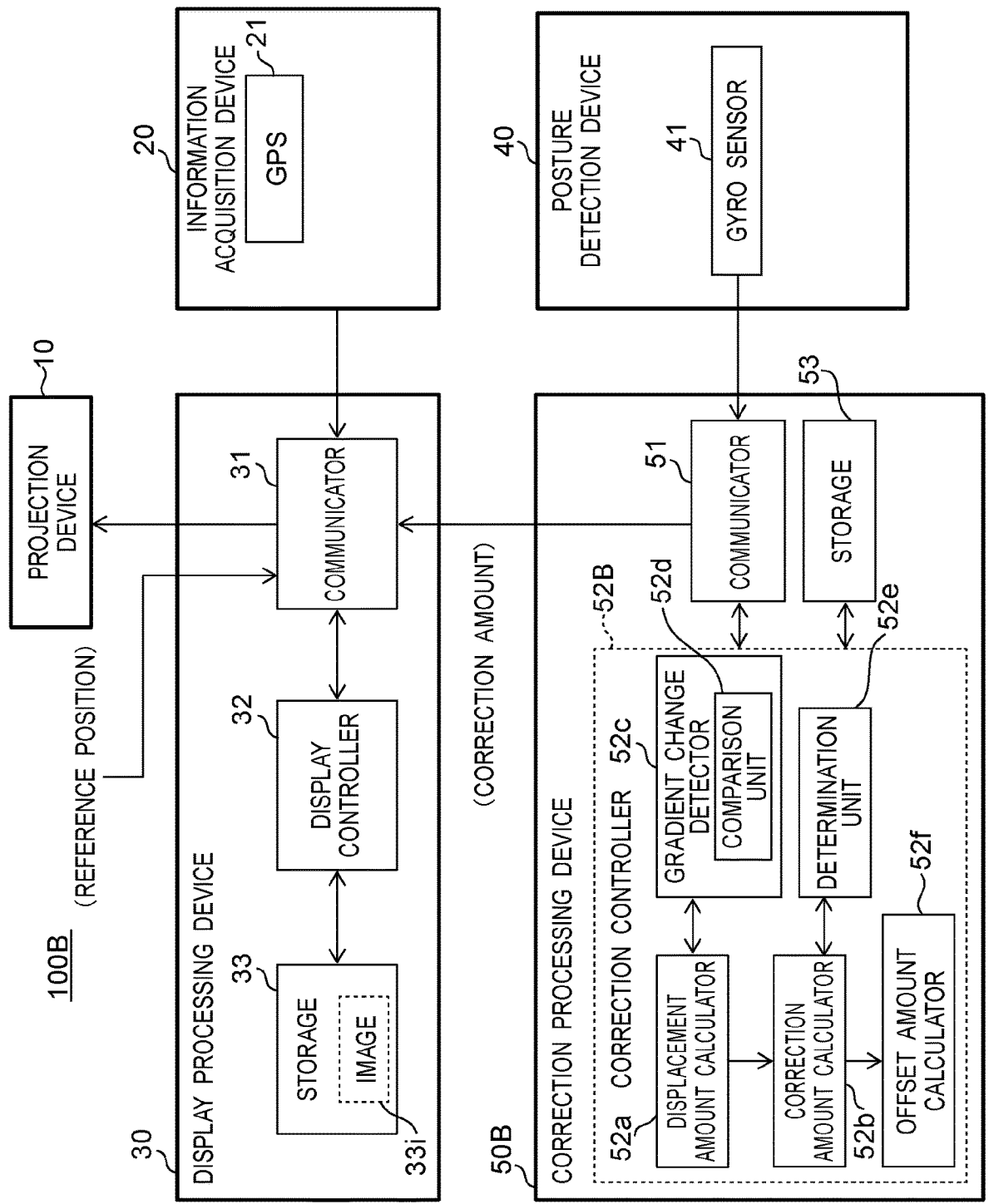
FIG. 13 is a block diagram showing an internal configuration of the display system according to third, fourth, and eight, and ninth embodiments.
Figure 14:
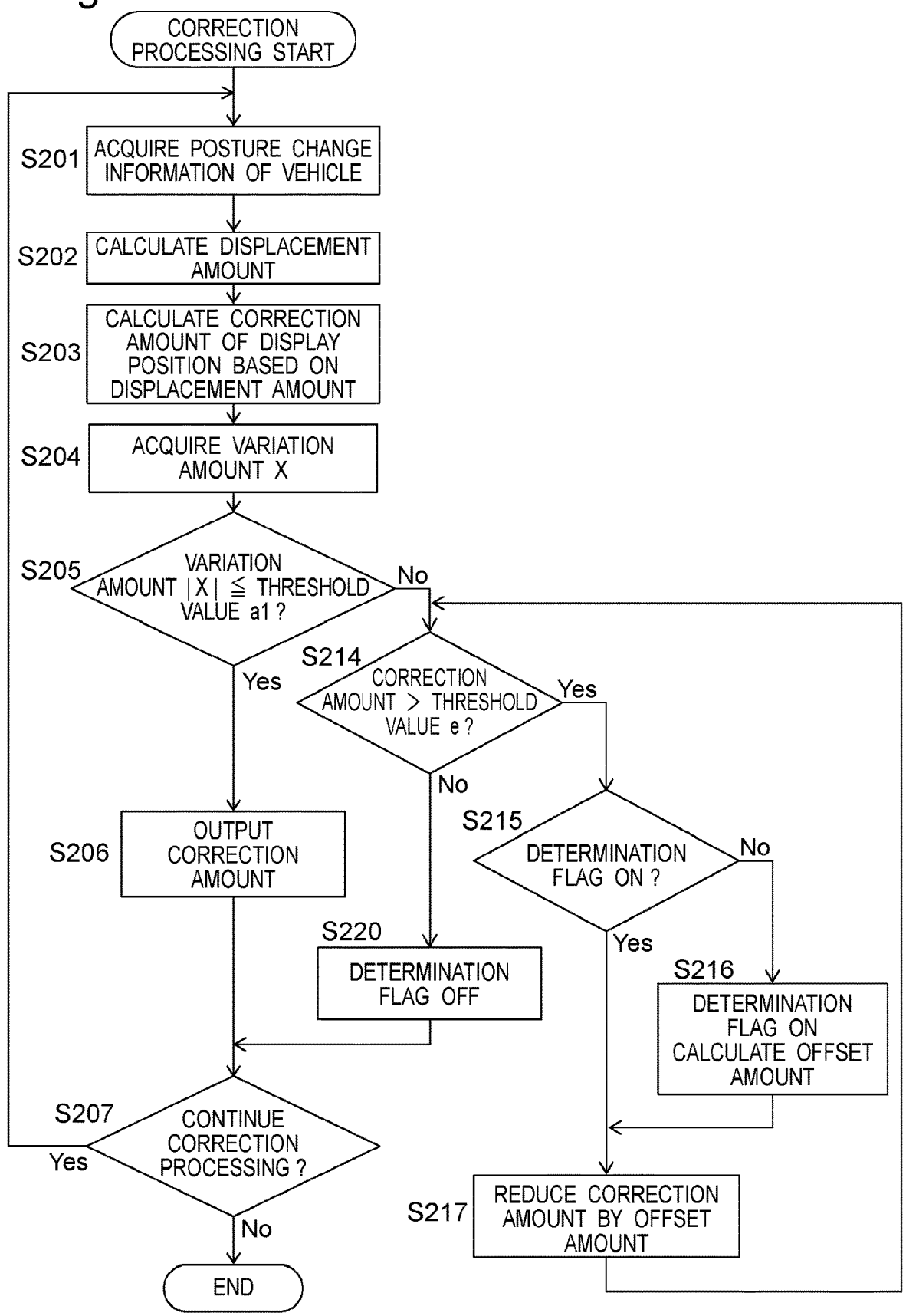
FIG. 14 is a flowchart showing the correction processing in the third embodiment.

FIG. 13 is a block diagram illustrating an internal configuration of a display system 100B according to the third embodiment. The display system 100B according to the third embodiment has a configuration in which an offset amount calculator 52f is added to a correction controller 52A of a correction processing device 50A in the display system 100A according to the second embodiment. The configuration other than a point described below is the same as the display system 100B in the third embodiment and the display system 100A in the second embodiment. FIG. 14 shows the correction processing in the third embodiment. Steps S201 to S207 of FIG. 14 of the third embodiment are the same as Steps S201 to S207 of FIG. 11 of the second embodiment.

In the present embodiment, in a case where an absolute value of the variation amount X is larger than the first threshold value a1 (No in S205), the determination unit 52e determines whether or not the correction amount C calculated in Step S203 is larger than a threshold value e (S214). If the correction amount C is larger than the threshold value e (Yes in S214), the determination unit 52e determines whether or not the determination flag is set to ON (S215). In a case where the determination flag is in an OFF state (No in S215), the determination unit 52e sets the determination flag to ON (S216). In a state where the determination flag is ON, the offset amount calculator 52f calculates an offset amount Df.

Figure 15:
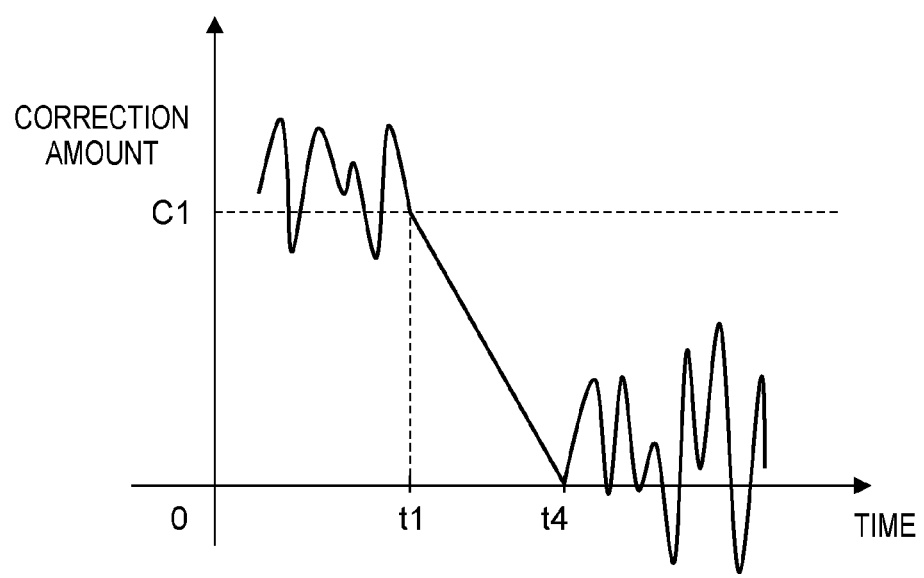
FIG. 15 is an explanatory diagram showing an example of reducing a correction amount over a certain period of time.

The calculation of the offset amount Df in the offset amount calculator 52f will be described with reference to FIG. 15. FIG. 15 is an explanatory diagram illustrating an example of reducing the size of the correction amount over a certain period of time. In FIG. 15, the threshold value e is zero. For example, the determination flag is set to ON at time t1. While the determination flag is set to ON, a correction amount C1 is gradually reduced, and the correction amount C1 becomes equal to or less than the threshold value e, zero in this case, at time t4 that is reset time Δt1 after time t1. The reset time Δt1 is set in advance, and the offset amount Df in one sampling (one cycle from S214 to S215, S216, and S217 in the flowchart) is calculated as Df=C1×ts/Δt1 from a sampling period ts and the correction amount C1 at the start of reset. A correction controller 52B reduces the correction amount C1 by C1×ts/Δt1 (S217). For example, assuming that the sampling period is 1/1000 [sec], the reset time Δt1 is 1 [sec], and the correction amount C1 is 100 pixels, the correction amount is reduced by 0.1 pixels per sampling period.

Next, the determination unit 52e again determines whether or not the correction amount C is larger than the threshold value e (S214). If the correction amount C is larger than the threshold value e (Yes in S214), the determination unit 52e determines whether the determination flag is set to ON (S215). If the determination flag is set to ON (Yes in S215), the correction controller 52B reduces the correction amount by an offset amount again (S217). In this manner, the correction amount is gradually reduced, and when the correction amount becomes equal to or less than the threshold value e, the determination unit 52e determines that the correction amount is equal to or less than the threshold value e in the determination in Step S214 (No in S214), and the determination unit 52e sets the determination flag to OFF (S220). After the determination flag is set to OFF, the processing of Step S207 is performed.

As described above, in the correction processing device 50B, since the correction amount C1 is gradually reduced while the determination flag is in the ON state, the position of the virtual image Iv gradually approaches the reference position P0. Since the position of the virtual image Iv does not suddenly change significantly, it is possible to prevent the occupant D from feeling uncomfortable with the change in the display position of the virtual image Iv.

Fourth Embodiment

In the third embodiment, in a case where the correction amount is larger than the threshold value e, the correction amount is reduced to the threshold value e or less over time. A fourth embodiment is a variation of the third embodiment, and the correction amount is reduced over time in a case where the correction amount is larger than the threshold value e, and is immediately reset to zero in a case where the correction amount is equal to or less than the threshold value e.

Figure 16:
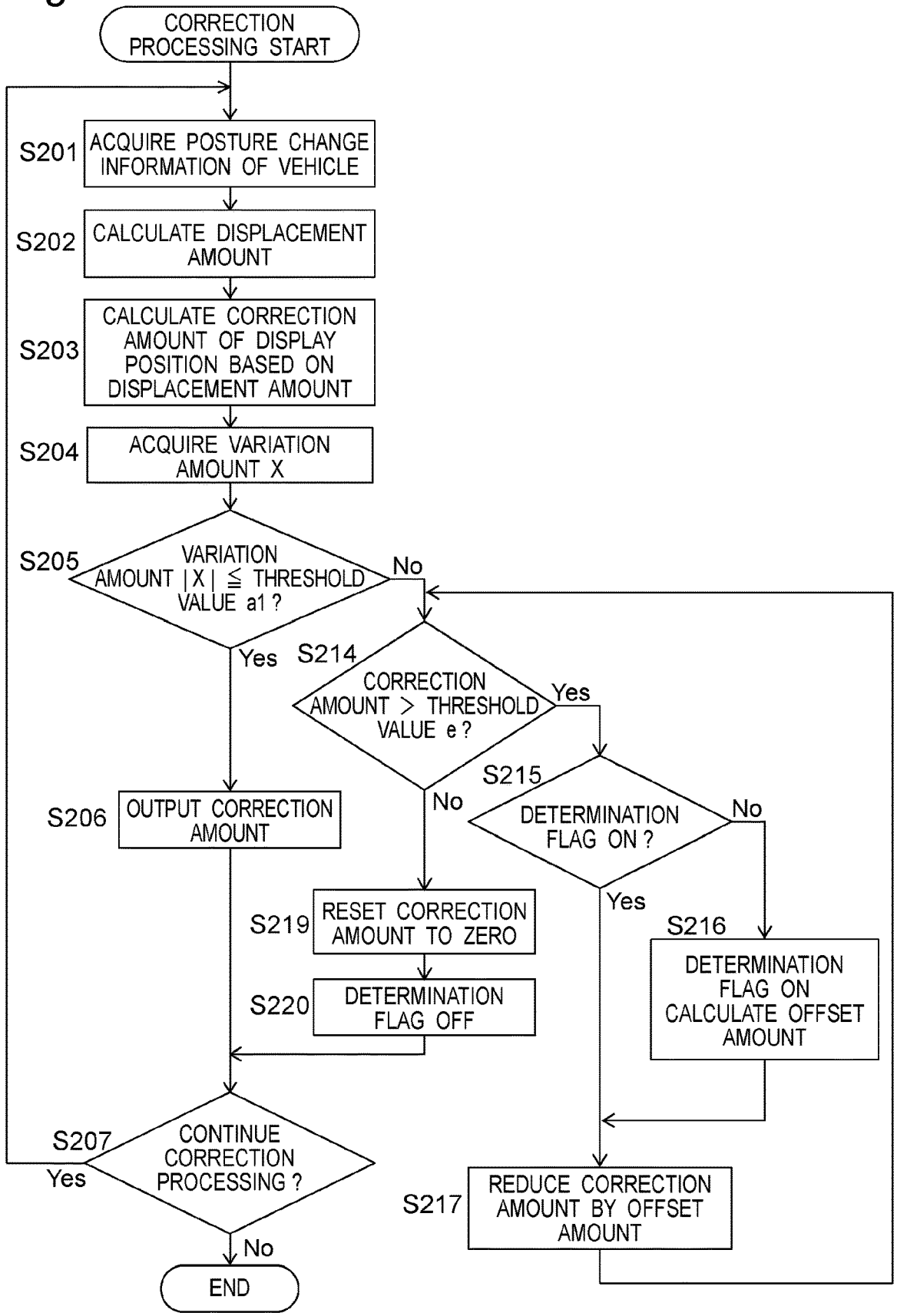
FIG. 16 is a flowchart showing the correction processing in the fourth embodiment.

FIG. 16 shows the correction processing in the fourth embodiment. Steps S201 to S207, S215 to S217, and S220 in FIG. 16 of the fourth embodiment are the same as those of the third embodiment.

In the present embodiment, in a case where the variation amount X is larger than a threshold value a (No in S205), the determination unit 52e determines whether or not the correction amount C calculated in Step S203 is larger than a threshold value e (S218). If the correction amount C is larger than the threshold value e (Yes in S218), the determination unit 52e determines whether the determination flag is set to ON (S215). When the determination flag is not set to ON (No in S215), the determination unit 52e sets the determination flag to ON, and the offset amount calculator 52f calculates an offset amount (S216). Next, the correction amount C is reduced by the offset amount (S217). Next, the determination unit 52e again determines whether or not the correction amount C is larger than the threshold value e (S218). If the correction amount C is larger than the threshold value e (Yes in S218), whether the determination flag is set to ON is determined (S215). If the determination flag is set to ON (Yes in S215), the correction amount C is reduced by an offset amount again (S217). In this manner, the correction amount C is gradually reduced, and when the correction amount C becomes equal to or less than the threshold value e, the determination unit 52e determines in Step S218 that the correction amount C is equal to or less than the threshold value e (No in Step S218), and resets the correction amount to zero (S219). After the above, the determination unit 52e sets the determination flag to OFF (S220).

Figure 17:
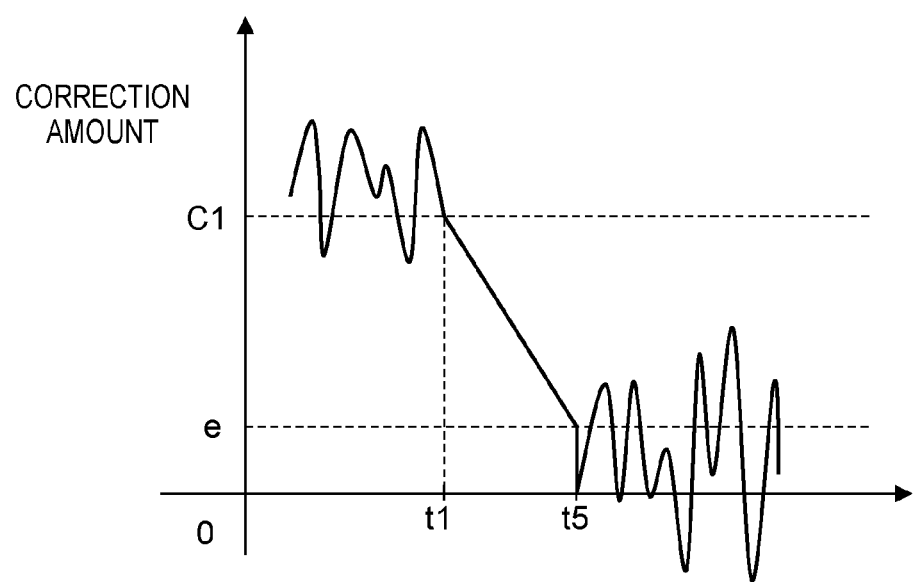
FIG. 17 is an explanatory diagram showing an example of reducing a correction amount over a certain period of time.

FIG. 17 is an explanatory diagram illustrating an example of reducing the correction amount over a certain period of time. For example, the determination flag is set to ON at time t1, and the correction amount is gradually reduced. While the determination flag is set to ON, the correction amount is gradually reduced, and the correction amount becomes equal to or less than the threshold value e at time t5 that is reset time Δt2 after time t1. Note that the configuration may be such that the reset time Δt2 is set in advance, an offset amount in one sampling (one cycle from S218 to S215, S217, and S218 in the flowchart) is set to (C1−e)×ts/Δt2 from the sampling period is and the correction amount C1 at the start of resetting, and the correction amount is reduced by (C1−e)×ts/Δt2 at a time. If the correction amount is equal to or less than the threshold value e, the correction amount is immediately reset to zero.

As described above, every time the variation amount X becomes larger than the threshold value a, the correction processing device 50B reduces the correction amount by a predetermined amount at a time in a case where the correction amount C is larger than the threshold value e, and resets the correction amount C to zero in a case where the correction amount C is equal to or less than the threshold value e, at which resetting of the correction amount C is inconspicuous. In this manner, the display position can be corrected according to the inclination of the vehicle 200 without causing any visual discomfort.

Fifth Embodiment

In the first embodiment, a change in a gradient of the traveling path is detected with reference to the first threshold value a1. In a fifth embodiment, with reference to a first threshold value a2, it is detected that a change in the posture of the vehicle 200 has started due to a change in a gradient of the traveling path. Furthermore, it is detected that the change in the posture of the vehicle 200 has ended with reference to a second threshold value b. FIG. 2 is referred to as a block diagram illustrating an internal configuration of the display system 100 in the fifth embodiment. In the fifth embodiment, the configuration other than a point described below is the same as the configuration of the first embodiment.

Figure 18:
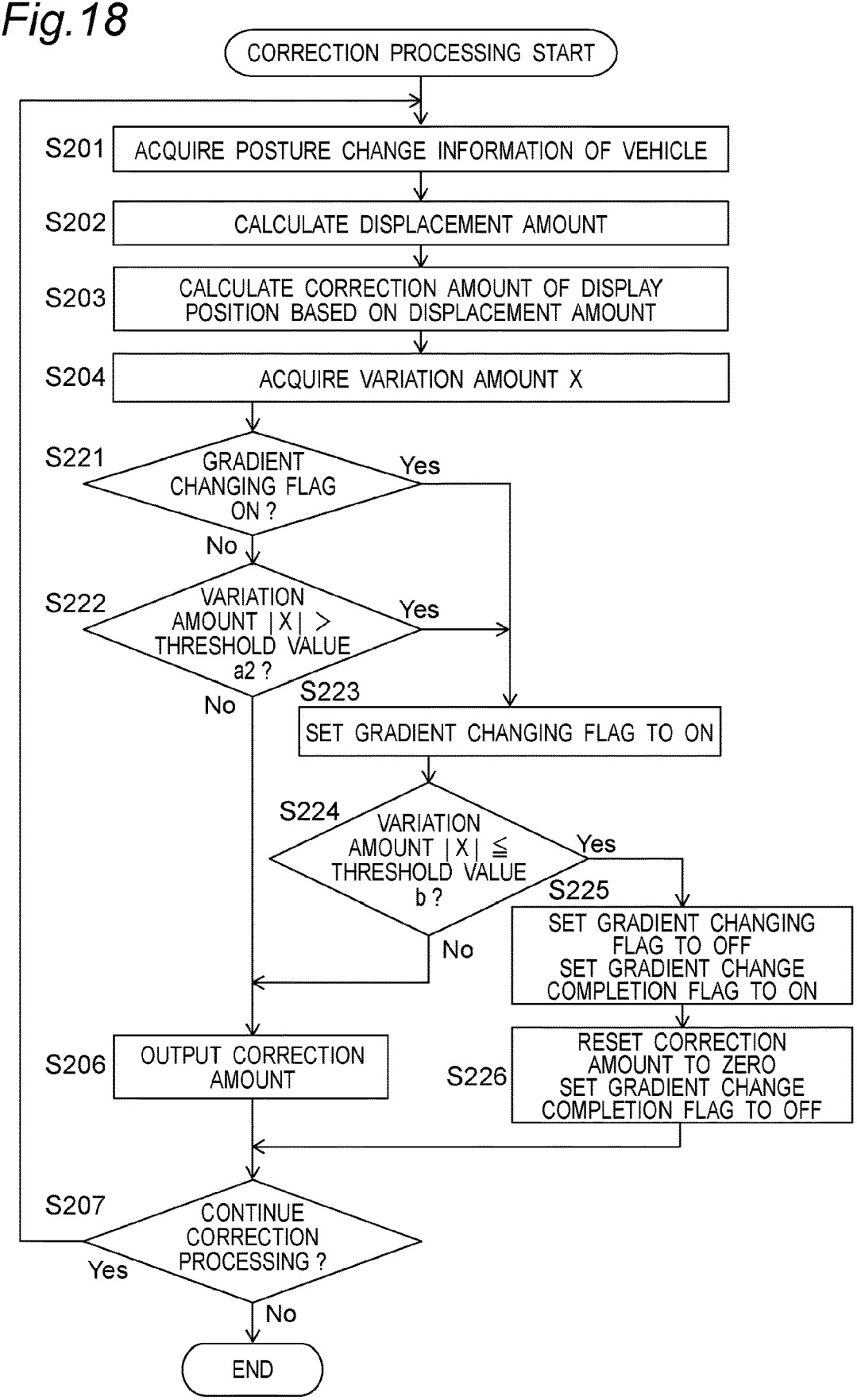
FIG. 18 is a flowchart showing the correction processing in the fifth embodiment.

FIG. 18 shows the correction processing in the fifth embodiment. Steps S201 to S204, S206, and S207 of the fifth embodiment are the same as those of the first embodiment, and omitted from description.

Figure 19:
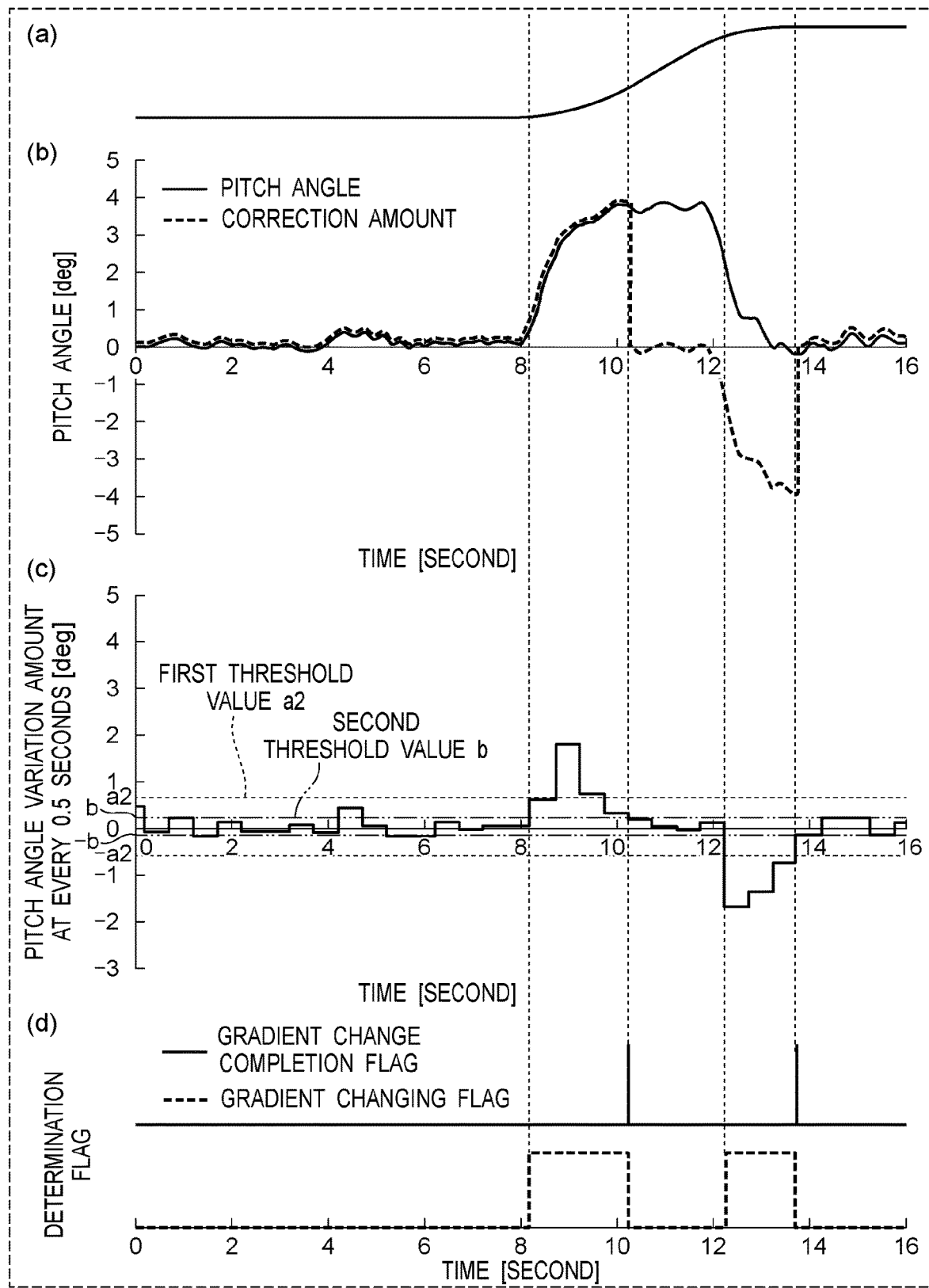
FIG. 19 is a diagram showing a relationship between an inclined traveling path, a variation amount of a pitch angle, a variation amount of a pitch angle per unit time, and a gradient change determination flag.

FIG. 19 is a diagram illustrating a relationship between an inclined traveling path on which the vehicle 200 of the present embodiment travels, a pitch angle of the vehicle 200, a variation amount of the pitch angle per unit time, and the gradient change determination flag. FIG. 19(a) illustrates an example of a slope on which vehicle 200 climbs. FIG. 19(b) is a graph showing a pitch angle obtained by integrating a pitch angular velocity detected by the gyro sensor 41. FIG. 19(c) is a graph showing a variation amount of the pitch angle every 0.5 seconds. FIG. 19(d) is a diagram illustrating ON and OFF of a gradient changing flag and ON and OFF of a gradient change completion flag.

The correction controller 52 determines whether or not the gradient changing flag is ON (S221). If the gradient changing flag is not set to ON (No in S221), the comparison unit 52d compares an absolute value of the variation amount X with the first threshold value a2 (S222). In a case where an absolute value of the variation amount X is equal to or less than the first threshold value a2 (No in S222), the correction amount calculator 52b outputs the calculated correction amount C to the display processing device 30 (S206), and the virtual image Iv is displayed at the position indicated by "reference position P0+correction amount C".

In a case where the variation amount X is larger than the first threshold value a2 (Yes in S222), the correction controller 52 sets the gradient changing flag to ON as illustrated in FIG. 19(d). That is, the correction controller 52 determines that a posture change of the vehicle 200 is started due to a change in the gradient of the traveling path. In a state where the gradient changing flag is ON, the comparison unit 52d compares an absolute value of the variation amount X with the second threshold value b (S224). When the absolute value of the variation amount X is larger than the second threshold value b (No in S224), the correction amount calculator 52b outputs the calculated correction amount C to the display processing device 30 (S206). Further, if the absolute value of the variation amount X is less than or equal to the second threshold value b in Step S224 (Yes in S224), the correction controller 52 sets the gradient changing flag to OFF and sets the gradient change completion flag to ON as illustrated in FIG. 19(d) (S225). This means that the posture of the vehicle 200 is inclined parallel to the gradient of the traveling path, and the vehicle 200 starts traveling along the gradient of the traveling path. In view of the above, since the gradient change completion flag is ON, the correction controller 52 resets the correction amount C to zero as illustrated in FIG. 19(b) (S226). In this manner, it is possible to eliminate displacement of correction due to the gradient change of the traveling path. Furthermore, the correction controller 52 sets the gradient change completion flag to OFF after resetting the correction amount C to zero. After the above, the processing of Step S207 is performed, and the correction processing is started again from Step S201. Also in a case of No in Step S224, the processing in Steps S206 and S207 is performed, and the correction processing is started again from Step S201. In this case, since the gradient changing flag is set to ON in Step S221, the gradient changing flag is continuously set to ON in Step S223, and the processing of Step S224 is performed.

Note that, instead of resetting the correction amount C to zero in Step S226, the correction amount C may be reduced by a predetermined certain amount.

According to the fifth embodiment, since the posture change of the vehicle 200 is determined using two types of threshold values, the vehicle 200 can accurately detect a start point and a completion point of the posture change due to a change in the gradient. Therefore, it is possible to suppress displacement of the display position by the posture change of the vehicle due to a change in an inclination angle of the traveling path. Further, in the case of the first embodiment, a predetermined detection period and the completion point of the posture change caused by the change in the inclination angle of the traveling path may not necessarily coincide with each other. In this case, it is not possible to reduce erroneous correction corresponding to the posture change caused by the change in the inclination angle of the traveling path after the detection period. In contrast, in the present embodiment, since the completion point of the posture change can be detected, the displacement of the display position can be suppressed.

Sixth Embodiment

In the fifth embodiment, the correction amount is reset to zero in Step S226. In a sixth embodiment, instead of resetting the correction amount to zero, the size of the correction amount is reduced by a predetermined amount in a manner that the correction amount does not become zero.

Figure 20:
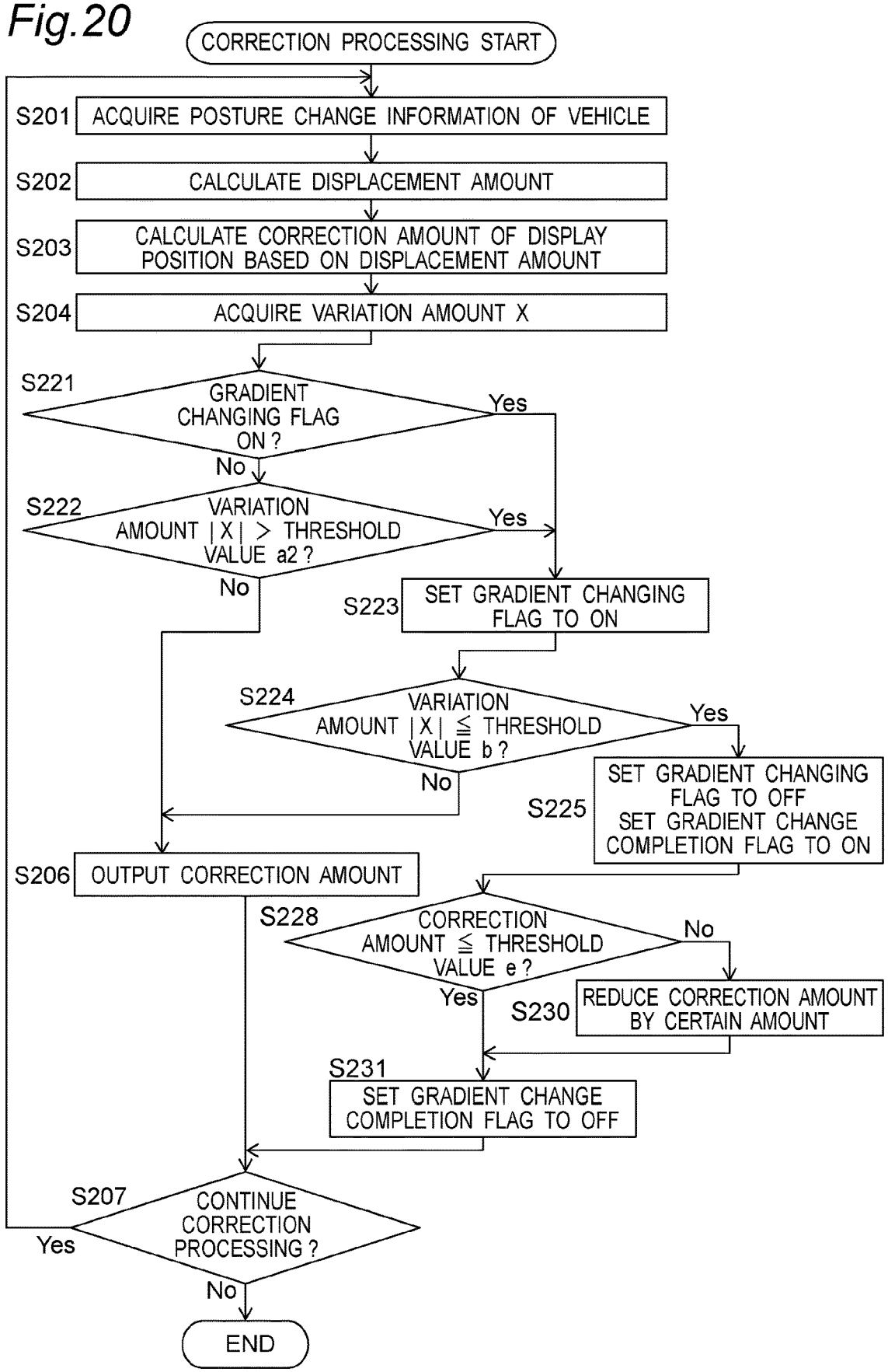
FIG. 20 is a flowchart showing the correction processing in the sixth embodiment.

FIG. 20 shows the correction processing in the sixth embodiment. Steps S201 to S204, S206, S207, and S221 to S224 of the sixth embodiment are the same as those of the fifth embodiment, and omitted from description.

In Step S224, in a state where the gradient changing flag is ON, the comparison unit 52*d* compares an absolute value of the variation amount X with the second threshold value b. If the absolute value of the variation amount X is less than or equal to the second threshold value b (Yes in S224), the correction controller 52 sets the gradient changing flag to OFF and sets the gradient change completion flag to ON (Step S225). Furthermore, the determination unit 52*e* determines whether or not the correction amount is equal to or less than the threshold value e (Step S228). In a case where the correction amount is not equal to or less than the threshold value e (No in S228), the correction processing device 50 reduces the size of the correction amount C by a predetermined amount (a value smaller than the correction amount C) in a manner that the size of the correction amount C does not become zero. Specifically, for example, the correction amount calculator 52*b* sets "offset value=predetermined amount" in "correction amount C=−(displacement amount−offset value)". The predetermined amount may be set according to the display position in the display area 220 of the virtual image Iv. As shown in FIG. 8B, for example, at time t1, the size of the correction amount C is reduced by an offset value Fs1 of a certain amount. Further, the correction amount C may be reduced stepwise as shown in FIG. 8C. For example, the size of the correction amount C may be reduced by a fixed offset value Fs2 at time t1, and may be reduced by the offset value Fs2 again at time t2. Note that the number of times of reduction may be three or more, and the offset value may be changed depending on the number of times.

After the correction amount is reduced by a certain amount, the correction controller 52 sets the gradient change completion flag to OFF. After the above, Step S207 is performed. Note that, in a case where the correction amount is less than or equal to the threshold value e in Step S228 (Yes in Step S228), the gradient change completion flag is set to OFF in Step S231. Next, the processing proceeds via Step S207, the processing from Step S201 is repeated again. Note that the threshold value e can be set to an optional value, and may be zero. As described above, the correction processing device 50 reduces the correction amount by a predetermined amount at a time when the correction amount C is larger than the threshold value e, and ends the adjustment of the correction amount in a case where the correction amount C is equal to or less than the threshold value e, at which immediate resetting of the correction amount C is inconspicuous. In this manner, the display position can be corrected according to the inclination of the vehicle 200 without Causing any visual discomfort.

As described above, in a case where an absolute value of the variation amount X is larger than the first threshold value a2 and less than or equal to the second threshold value b, the correction processing device 50 reduces the correction amount C by a predetermined amount, so that the position of the virtual image Iv approaches the reference position P0. Since the position of the virtual image Iv does not suddenly change significantly, it is possible to prevent the occupant D from feeling uncomfortable with the change in the display position of the virtual image Iv. That is, it is possible to suppress a feeling of uncomfortableness due to the shift of the display position.

Seventh Embodiment

In the fifth embodiment, the correction amount is reset to zero in Step S226. In the present embodiment, a change amount of the correction amount is changed according to the size of the correction amount C. Specifically, in a case where the correction amount C is larger than the threshold value d, the correction amount C is reduced by a predetermined certain amount in a manner that the size of the correction amount C does not become zero, and in a case where the correction amount C is equal to or less than the threshold value d, the correction amount is reset to zero. FIG. 10 is referred to as a block diagram illustrating an internal configuration of the display system 100A in a seventh embodiment.

Figure 21:
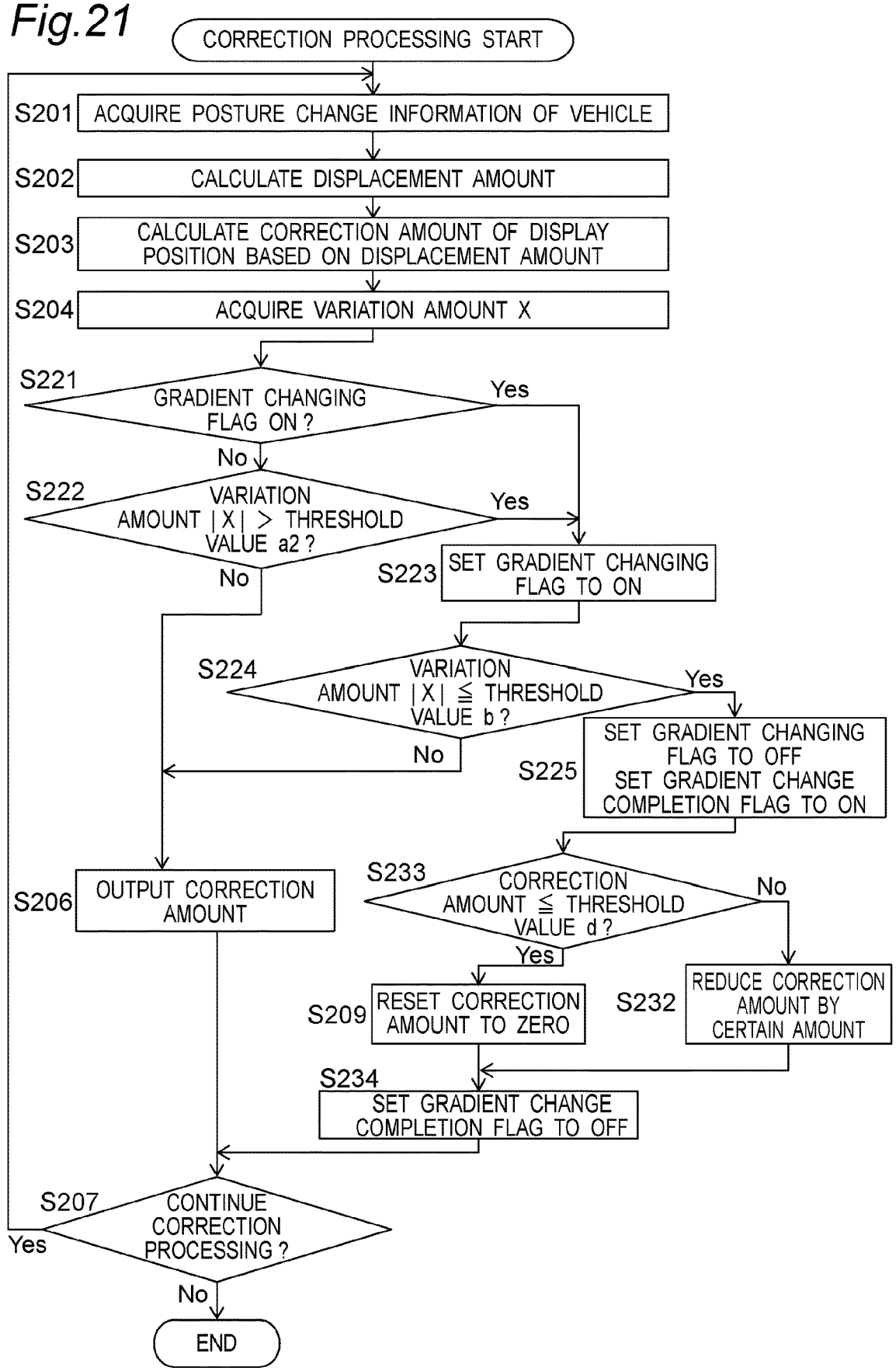
FIG. 21 is a flowchart showing the correction processing in the seventh embodiment.

FIG. 21 shows the correction processing in the seventh embodiment. Steps S201 to S204, S206, S207, and S221 to S225 of the seventh embodiment are the same as those of the fifth embodiment.

In Step S225, the gradient change completion flag is set to ON. In a state where the gradient change completion flag is ON, the determination unit 52*e* determines whether or not the correction amount C calculated in Step S203 is equal to or less than the threshold value d (S233). If the correction amount C is larger than the threshold value d (No in S233), the correction amount C is reduced by a predetermined certain amount (a value smaller than the correction amount C) in a manner that the size of the correction amount C does not become zero as illustrated in FIG. 8B (S232). If the correction amount C is equal to or less than the threshold value d (Yes in S233), the correction amount C is reset to zero as illustrated in FIG. 12 (S209). After the correction amount C is reduced by a predetermined certain amount or the correction amount C is reset to zero, the gradient change completion flag is set to OFF (S234).

As described above, the correction processing device 50A reduces the correction amount by a certain amount in a case where the correction amount C is larger than the threshold value d, and resets the correction amount to zero in a case where the correction amount C is less than or equal to the threshold value d. In this manner, the display position can be corrected according to the inclination of the traveling path without causing any visual discomfort.

Eighth Embodiment

In the fifth embodiment, in the correction due to a posture change accompanying a change in the gradient of the traveling path, resetting to zero or reduction by a certain amount is performed only one time of correction. In an eighth embodiment, resetting to zero or reduction to a certain value is gradually performed over time.

Figure 22:
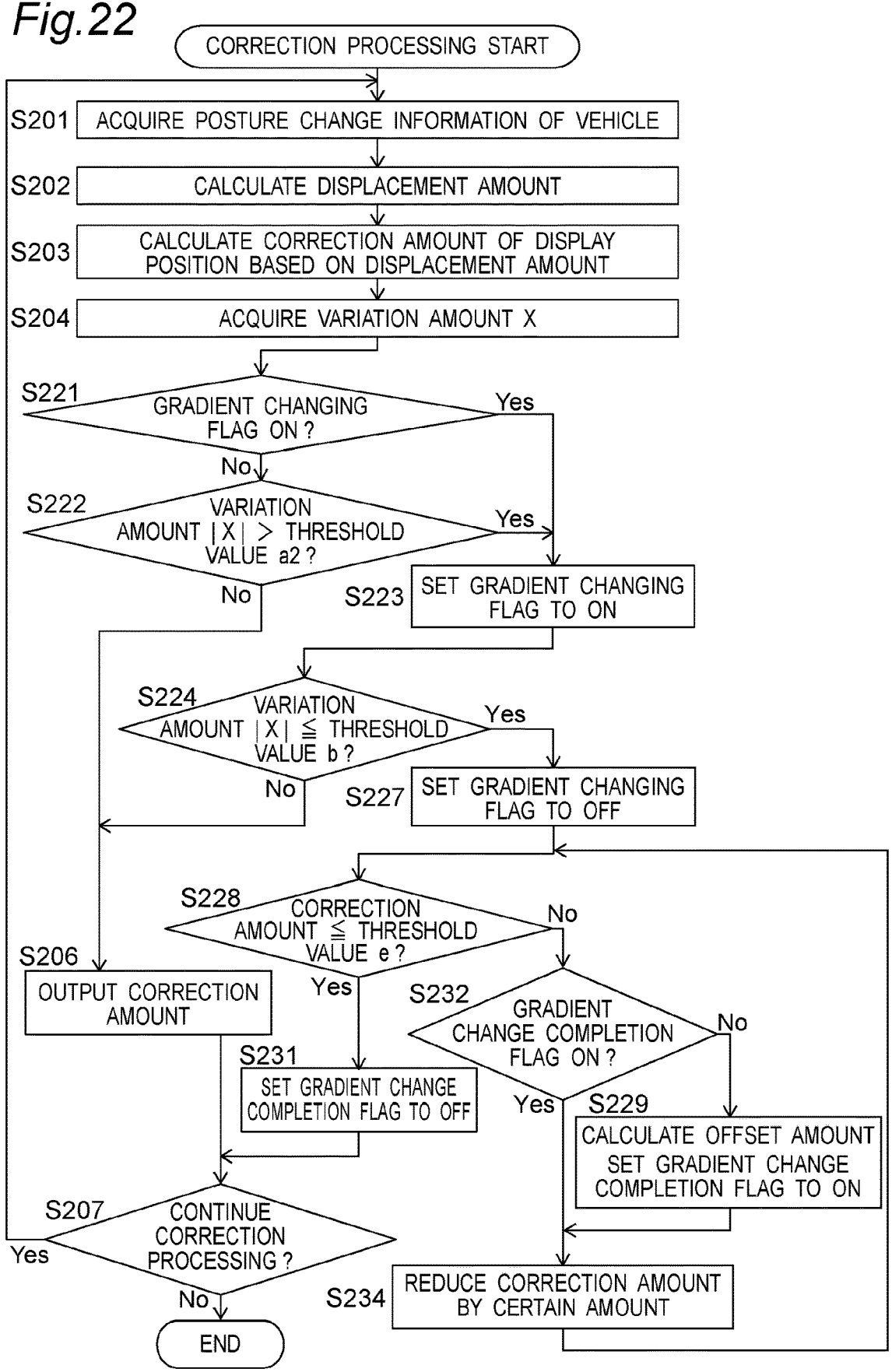
FIG. 22 is a flowchart showing the correction processing in the eighth embodiment.

FIG. 22 shows the correction processing in the eighth embodiment. Steps S201 to S204, S206, S207, and S221 to S224 of the eighth embodiment are the same as those of the fifth embodiment.

In a case where an absolute value of the variation amount X is less than or equal to the threshold value b in Step S224 (Yes in S224), the gradient changing flag is set to be in an OFF state in Step S227. The determination unit 52*e* determines whether the correction amount is equal to or less than the threshold value e. In a case where the correction amount is larger than the threshold value e (No in S228), it is determined whether or not the gradient change completion flag is ON (S232). In a case where the gradient change completion flag is not in an ON state (No in S232), the offset amount calculator 52f calculates the offset amount Df and sets the gradient change completion flag to be in the ON state (S229). Since the vehicle 200 starts traveling along the gradient of the traveling path, the correction amount C is reduced by the calculated offset amount (S234). Next, the determination unit 52e compares the reduced correction amount with the threshold value e again (S228). In a case where the correction amount is larger than the threshold value e (No in S228), since the gradient change completion flag is in the ON state in the determination in Step S232, the process directly proceeds to Step S234, and the correction amount is reduced by the offset amount.

In a case where the correction amount is equal to or less than the threshold value e (Yes in S233), the gradient change completion flag is set to OFF (S231). In this manner, correction of the virtual image Iv excessively corrected due to the change in the gradient of the traveling path ends. Note that the threshold value e can be set to an optional value, and may be zero.

As illustrated in FIG. 15, in a case where the threshold value e is zero, for example, the gradient change completion flag is set to ON at time t1, and the correction amount C is gradually reduced. While the gradient change completion flag is set to ON, the correction amount C is gradually reduced, and the correction amount becomes zero at time t4 that is reset time $\Delta t1$ after time t1. Note that the configuration may be such that the reset time $\Delta t1$ is set in advance, the offset amount in one sampling (one cycle from S228 to S232, S234, and S228 in the flowchart) is set to $c1 \times ts/\Delta t1$ from the sampling period is and the correction amount C1 at the start of resetting, and the correction amount is reduced by $C1 \times ts/\Delta t1$ at a time. For example, assuming that the sampling period is $1/1000$ [sec], the reset time $\Delta t1$ is 1 [sec], and the correction amount C1 is 100 pixels, the correction amount is reduced by 0.1 pixels per sampling period.

As described above, in the correction processing device 50B, since the correction amount C is gradually reduced while the gradient change completion flag is in the ON state, the position of the virtual image Iv gradually returns to the reference position P0. Since the position of the virtual image Iv does not suddenly change significantly, it is possible to prevent the occupant D from feeling uncomfortable with the change in the display position of the virtual image Iv. That is, it is possible to suppress a feeling of uncomfortableness due to the shift of the display position.

Ninth Embodiment

In the eighth embodiment, in a case where the correction amount is larger than the threshold value e, the correction amount is reduced by a certain amount at a time over time. In a ninth embodiment, in a case where the correction amount is larger than the threshold value e, the correction amount is reduced by a certain amount at a time over time, and in a case where the correction amount is equal to or less than the threshold value e, the correction amount is immediately reset to zero.

Figure 23:
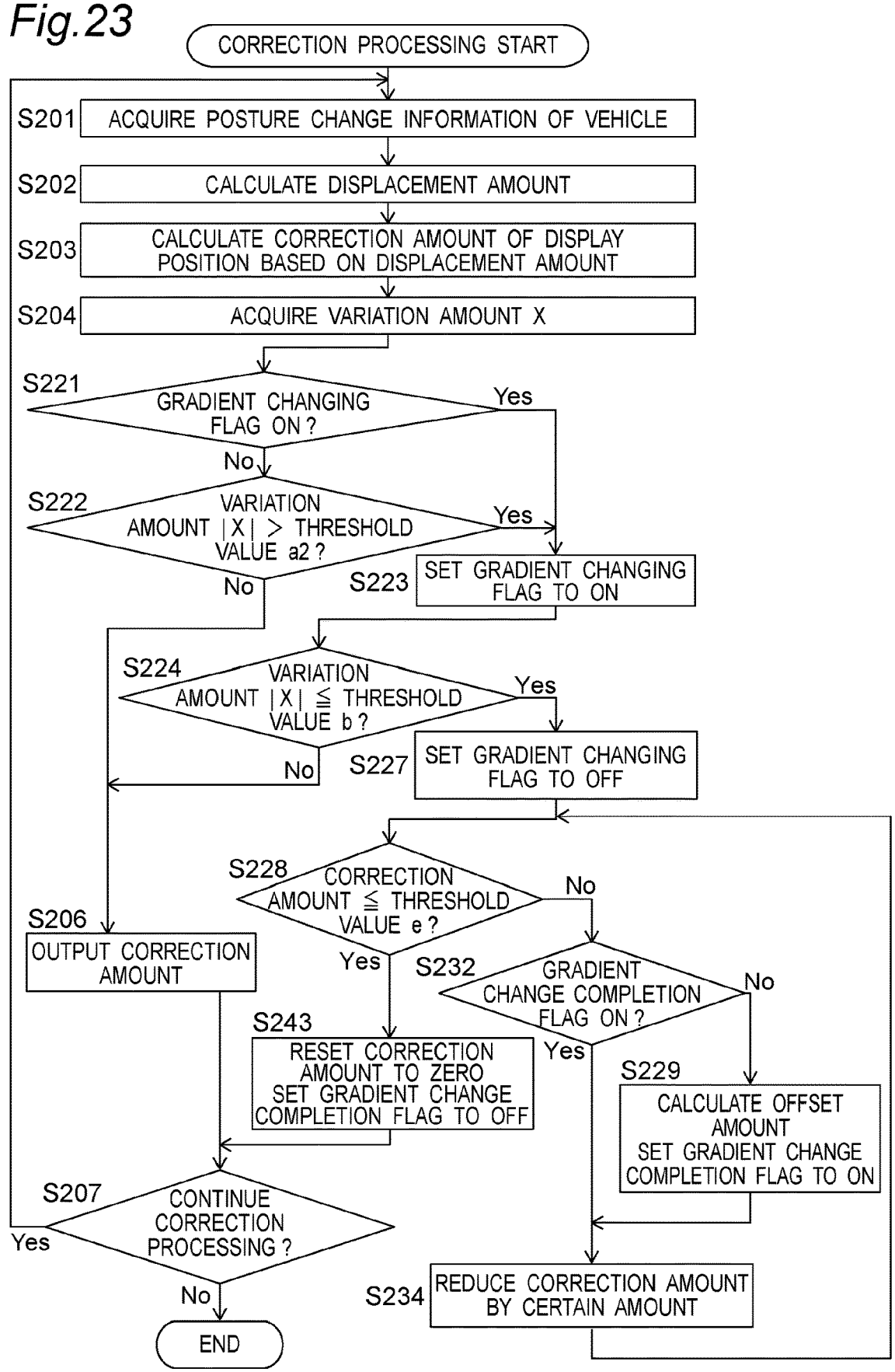
FIG. 23 is a flowchart showing the correction processing in the ninth embodiment.

FIG. 23 shows the correction processing in the ninth embodiment. Steps S201 to S204, S206, and S207 of the ninth embodiment are the same as those of the first embodiment. Further, Steps S221 to S224, and S227 of the ninth embodiment are the same as those of the eighth embodiment.

In the present embodiment, in a case where an absolute value of the variation amount X is less than or equal to the threshold value b in Step S224, the gradient changing flag is set to be in an OFF state in Step S227. The determination unit 52e compares the correction amount C with the threshold value e (S228). If the correction amount C is not equal to or less than the threshold value e (No in S228), in a case where the gradient change completion flag is not in an ON state (No in S232), the offset amount calculator 52f calculates the offset amount Df and sets the gradient change completion flag to be in the ON state (S229). Next, the correction amount is reduced by the offset amount (S234). Next, the processing of Steps S228, S232, and S234 is repeated. In Step S228, the determination unit 52e compares the correction amount C with the threshold value e. Here, in a case where the correction amount C is equal to or less than the threshold value e (No in S228), the correction controller 52 resets the correction amount to zero and sets the gradient change completion flag to OFF (S243).

As illustrated in FIG. 17, for example, the gradient change completion flag is set to ON at time t1. While the gradient change completion flag is set to ON, the correction amount is gradually reduced, and the correction amount becomes equal to or less than the threshold value e at time t5 that is reset time $\Delta t2$ after time t1. Note that the configuration may be such that the reset time $\Delta t2$ is set in advance, an offset amount in one sampling (one cycle from S228 to S232, S234, and S228 in the flowchart) is set to $(C1-e) \times ts/\Delta t2$ from the sampling period is and the correction amount C1 at the start of resetting, and the correction amount is reduced by $(C1-e) \times ts/\Delta t2$ at a time. If the correction amount is smaller than the threshold value e, the correction amount is immediately reset to zero.

As described above, the correction processing device 50 reduces the correction amount by a predetermined amount at a time when the correction amount C is larger than the threshold value e, and resets the correction amount C to zero in a case where the correction amount C is equal to or less than the threshold value e, at which immediate resetting of the correction amount C is inconspicuous. In this manner, the display position can be corrected according to the inclination of the vehicle 200 without causing any visual discomfort.

Tenth Embodiment

Figure 24A:
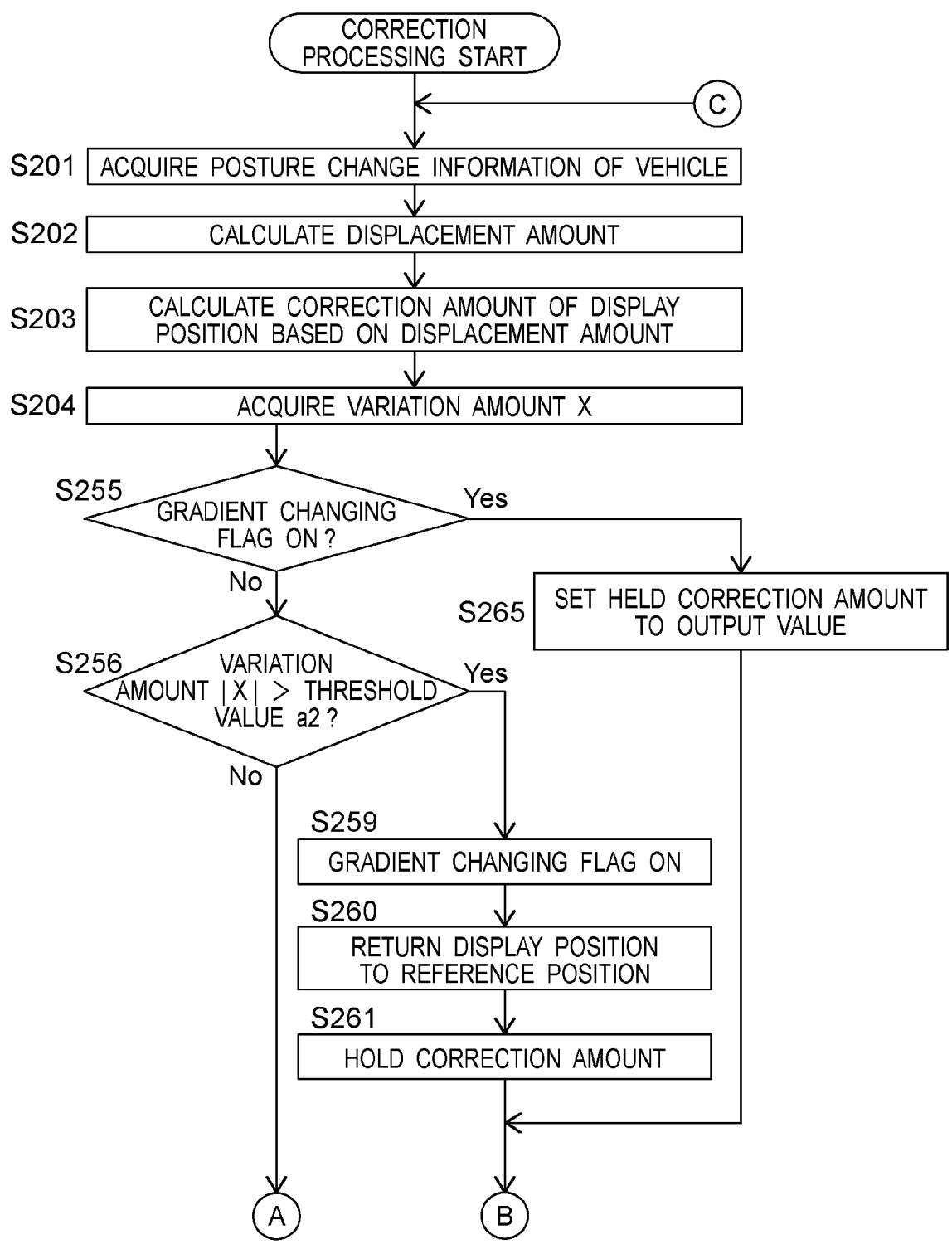
FIG. 24A is a flowchart showing the correction processing in a tenth embodiment.
Figure 24B:
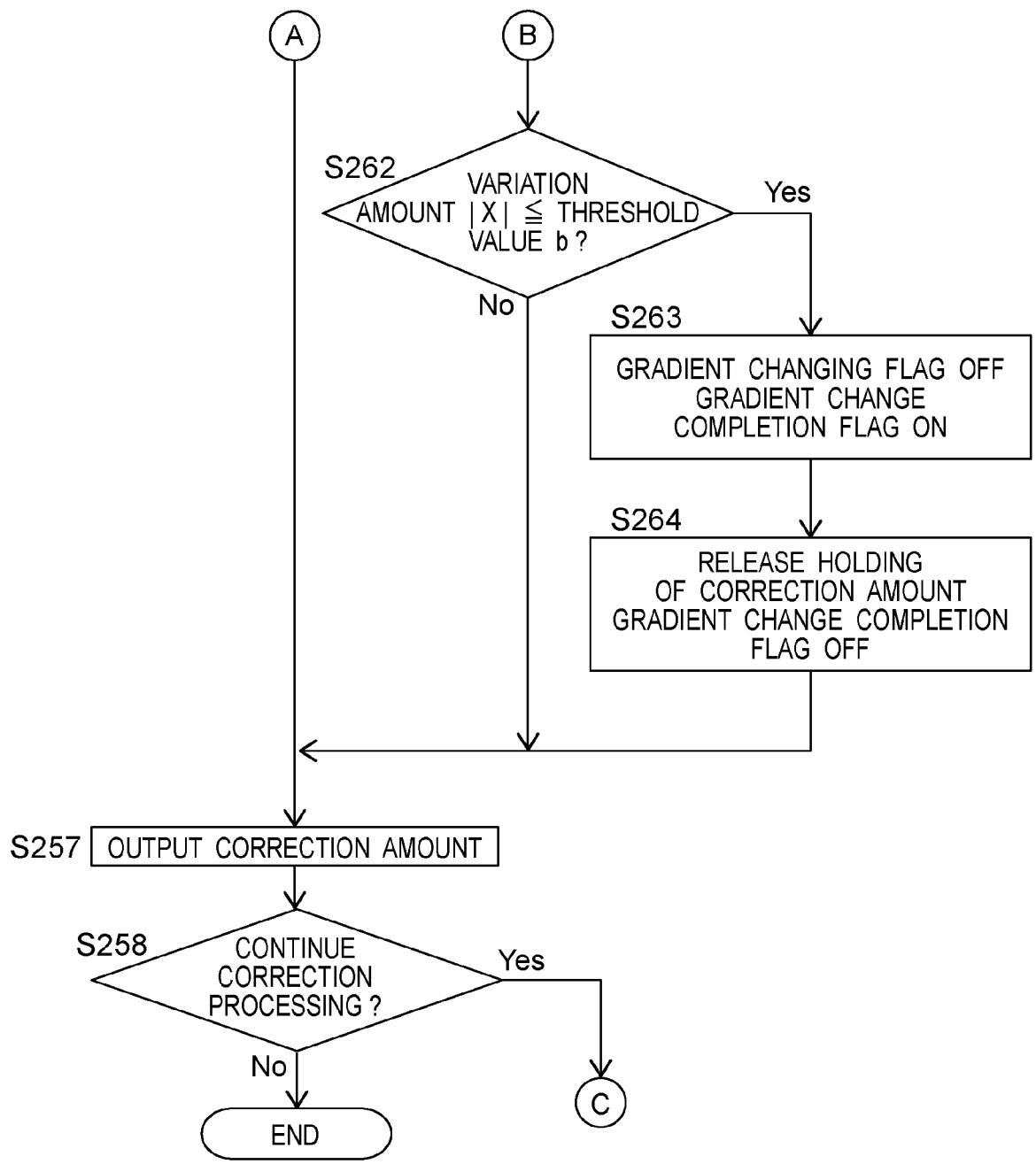
FIG. 24B is a flowchart showing the correction processing in the tenth embodiment.

The tenth embodiment is different from the fifth embodiment in the timing of resetting the correction amount. In the fifth embodiment, the correction amount is unchanged at the start of the gradient change, and the correction amount is reset at the completion of the gradient change. In contrast, in the tenth embodiment, the correction amount is reset at the start of the gradient change, the correction amount is maintained during the gradient change, and the correction is resumed at the completion of the gradient change. The configuration other than this point and a point described below is the same as that of the fifth embodiment. FIGS. 24A and 24B show the correction processing performed by the correction controller 52 of the correction processing device 50. The correction processing shown in FIGS. 24A and 24B is started, for example, when the engine of the vehicle 200 is started or when a button for giving an instruction to start displaying the virtual image Iv is operated. The correction processing of FIGS. 24A and 24B is started, for example, together with the display processing of FIG. 6. Note that the correction processing shown in FIGS. 24A and 24B may be started when the button for instructing the start of the position correction of the virtual image Iv is operated. Note that reference signs A, B, and C in FIGS. 24A and 24B indicate connection.

Steps S201 to S204 of the tenth embodiment are similar to those of the fifth embodiment, and omitted from description. The correction controller 52 determines whether or not a gradient changing flag Fa is ON (S255). If the gradient changing flag Fa is not set to ON (No in S255), the comparison unit 52d compares an absolute value of the variation amount X with the first threshold value a2 (S256).

If the variation amount X is equal to or less than the first threshold value a2, (the processing proceeds to No in S256, and proceeds via the reference sign A in FIGS. 24A and 25B), and the correction amount calculator 52b outputs a calculated correction amount Cm to the display processing device 30 (S257). In this manner, the virtual image Iv is displayed at the position indicated by the "reference position P0+correction amount Cm".

In a case where the variation amount X is larger than the first threshold value a2 (Yes in S256), the gradient change detector 52c sets the gradient changing flag Fa to ON as illustrated in FIG. 25(d) (S259). That is, it is determined that a posture change of the vehicle 200 is started due to a change in the gradient of the traveling path. The correction controller 52 resets the correction amount to zero at the timing at which the gradient changing flag Fa is set to ON, and returns the display position to the reference position (S260). The correction controller 52 holds a value of the correction amount (S261). For example, the correction controller 52 holds a value of the correction amount at zero.

In a method of resetting the correction amount to zero, for example, the displacement amount calculator 52a sets the offset value (angle) to "offset value (angle)=posture (angle)". In this manner, the angle indicated by "−posture (angle)+offset value (angle)", that is, zero degrees is output from the displacement amount calculator 52a to the correction amount calculator 52b. Alternatively, the correction amount calculator 52b converts the posture (angle) calculated by the displacement amount calculator 52a into the number of pixels (the number of displacement pixels), and sets the offset value (the number of pixels) to "offset value (number of pixels)=number of displacement pixels". In this manner, the correction amount calculated by "−displacement amount (number of pixels)+offset value (number of pixels)" becomes zero.

As illustrated in FIG. 8A, the correction amount may be reset to zero. For example, the correction amount is immediately reset to zero at time t1. As described above, when the variation amount X related to the posture change of the vehicle is determined to be larger than the first threshold value a2, the display position is returned to the reference position P0.

After the correction controller 52 holds the value of the correction amount, in a state where the gradient changing flag Fa is an ON state via the reference sign B in FIGS. 24A and 24B, the comparison unit 52d compares an absolute value of the variation amount X with the second threshold value b (S262). If the gradient changing flag Fa is in an ON state and an absolute value of the variation amount X is larger than the second threshold value b (No in S262), this means that the posture of the vehicle 200 is changing along with the gradient change of the traveling path. Accordingly, the correction controller 52 outputs the held correction amount to the display processing device 30 (S257).

The correction controller 52 determines whether or not to continue the correction processing (S258). For example, the correction controller 52 ends the correction processing when the engine of the vehicle 200 is stopped or when a button for giving an instruction to end the display of the virtual image Iv is operated. In a case where the correction process is continued, the processing returns to Step S201 via the reference sign C in FIGS. 24B and 24A.

The correction processing is started again from Step S201, and the processing of Step S202 to 204 is performed. Since the gradient changing flag Fa is already ON, the process proceeds to Yes in the determination of Step S255, and the correction controller 52 sets the held correction amount to an output value (Step S265). Here, a value of the held correction amount is zero.

Next, the processing proceeds via the reference sign B in FIGS. 24A and 24B, and if an absolute value of the variation amount X is larger than the second threshold value b again in the determination of the comparison unit 52d in Step S262 (No in S262), this means that the posture of the vehicle 200 is still varying along with the gradient change of the traveling path. Therefore, the correction controller 52 outputs the held correction amount to the display processing device 30 (S257).

In the determination of the comparison unit 52d in Step S262, if the absolute value of the variation amount X is equal to or less than the second threshold value b with the gradient changing flag Fa being in the ON state (Yes in S262), the correction controller 52 sets the gradient changing flag Fa to OFF and sets the gradient change completion flag Fb to ON as illustrated in FIG. 25(d) (S263). This means that the posture of the vehicle 200 is inclined parallel to the gradient of the traveling path, and the vehicle 200 starts traveling along the gradient of the traveling path. Then, the correction controller 52 releases the holding of the correction amount. In this manner, when the processing from Step S201 is started again, the offset value used when returning to the reference position in Step S260 is performed in the correction amount calculation of Step S203 is used. After the correction amount is released, the gradient change completion flag Fb is set to OFF (S264). Here, the correction controller 52 outputs the correction amount set to the output value to the display processing device 30 (S257).

Note that, instead of resetting the correction amount C to zero in Step S260, the correction amount C may be reduced by a predetermined certain amount. In this case, the value of the held correction amount is other than zero.

As described above, in the present embodiment, "offset value=displacement amount" is set when the variation amount X is larger than the first threshold value a2, so that the correction amount is set to zero. In other words, when the variation amount X is larger than the first threshold value a2, the display position is reset to the reference position P0. Since "correction amount C=−displacement amount+offset value", the "reference position P0+correction amount C" that is the display position when the virtual image Iv is displayed next time (Step S105 in FIG. 6) is equivalent to "reference position P0+offset value−displacement amount".

Figure 25:
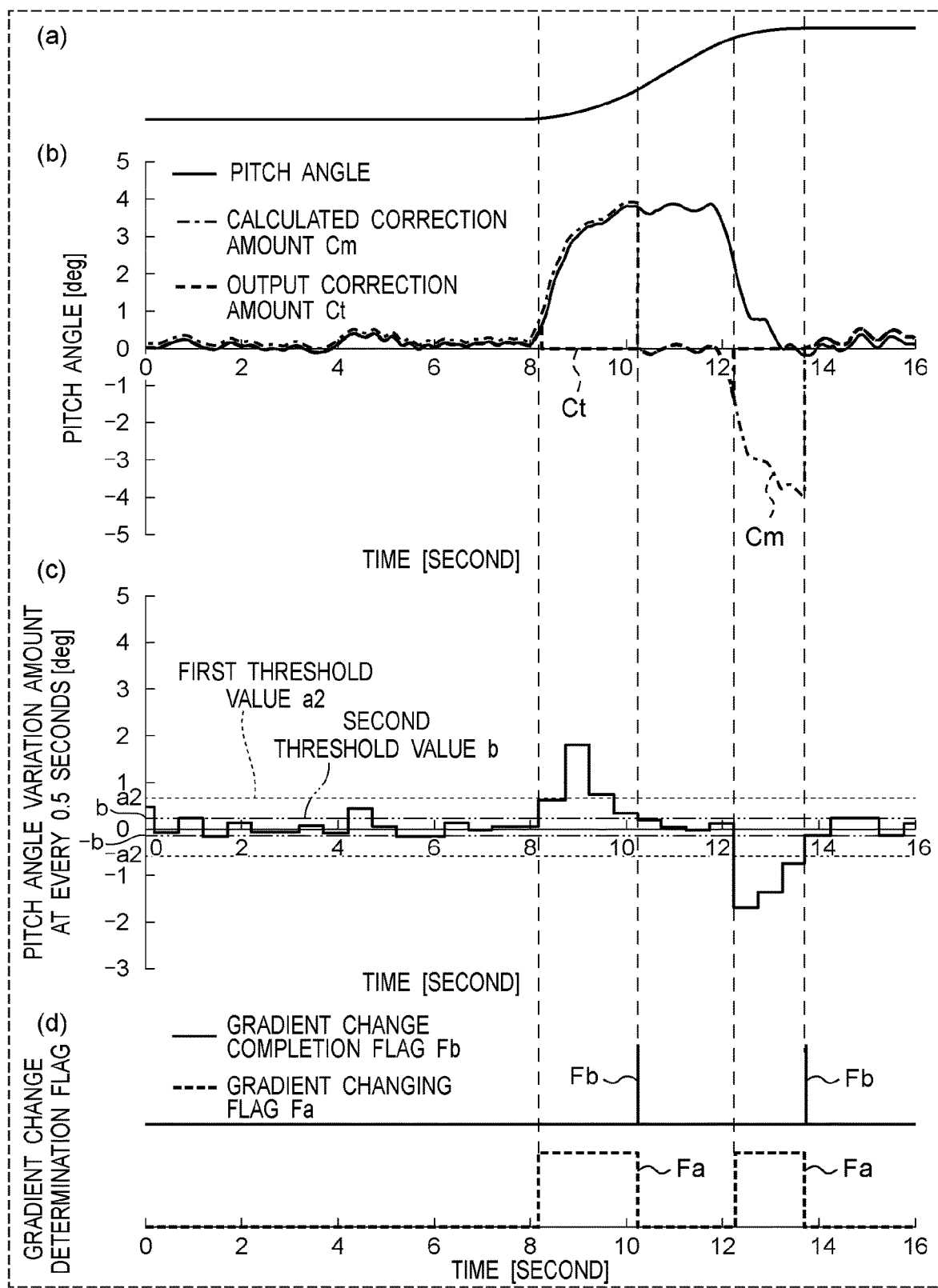
FIG. 25 is a diagram showing a relationship between an inclined traveling path, a variation amount of a pitch angle, a variation amount of a pitch angle per unit time, and a gradient change determination flag.

FIG. 25 is a diagram illustrating a relationship between an inclined traveling path on which the vehicle 200 of the present embodiment travels, a variation amount of a pitch angle of the vehicle 200, a variation amount of the pitch angle per predetermined unit time, and the gradient change determination flag. FIG. 25(a) illustrates an example of a slope on which vehicle 200 climbs. FIG. 25(b) is a graph showing a change in the pitch angle detected by the gyro sensor 41. FIG. 25(c) is a graph showing a variation amount of the pitch angle every 0.5 seconds. FIG. 25(d) is a diagram showing ON and OFF of the gradient change determination flag. As the gradient change determination flag, for example, two types of flags of the gradient changing flag Fa and the gradient change completion flag Fb are used.

The gyro sensor 41 detects vibration (angular velocity) in the pitch angle caused by unevenness of the traveling path. When the vehicle 200 starts to climb a slope, the pitch angle changes significantly because the gradient of the traveling path changes. The variation amount X in the pitch angle is calculated every predetermined unit time T1. Note that, in FIG. 25, the unit time T1 is set to 0.5 seconds. For example, when (time, pitch angle)=(t, p1) and (t+T1, p2), the variation amount X is calculated by $$X=(p2-p1)/(t+T1-t)=(p2-p1)/T1.$$

When an absolute value |X| of the variation amount X is equal to or more than the first threshold value a2 (X≥a2 or X≤−a2), the gradient change detector 52c determines that the gradient of the traveling path has changed and sets the gradient changing flag Fa to ON.

After about eight seconds elapse from the start of traveling, the gradient change detector 52c determines that the gradient of the traveling path has changed due to entry of the vehicle 200 to a slope, and sets the gradient changing flag Fa to ON. On the basis of the determination result, as illustrated in FIG. 25(b), the correction amount of the pitch angle is reset to zero as illustrated in FIG. 25(b), and then is held at zero. Further, after about ten seconds elapse from the start of traveling, the gradient change detector 52c determines that entry to the slope has been completed, and sets the gradient change completion flag Fb to ON. On the basis of the determination result, the correction controller 52 updates the calculated correction amount Cm as a correction value to be output. Note that, when the correction value is updated, the gradient change detector 52c sets the gradient change completion flag Fb to OFF.

Further, after about 12 seconds from the start of traveling, the gradient change detector 52c determines that the gradient of the traveling path has changed due to exit of the vehicle 200 from the slope, and sets the gradient changing flag Fa to ON. On the basis of the determination result, as illustrated in FIG. 25(b), the correction amount of the pitch angle is reset to zero as illustrated in FIG. 25(b), and then is held at zero. After about 14 seconds from the start of traveling, the gradient change detector 52c determines that the exit from the slope is completed, and sets the gradient change completion flag Fb to ON. On the basis of the determination result, the correction controller 52 updates the calculated correction amount Cm as a correction value to be output. Note that, when the correction value is updated, the gradient change detector 52c sets the gradient change completion flag Fb to OFF.

Effect, Supplement, and the Like

The display system 100 of the present disclosure includes the display processing device 30 that controls display of the virtual image Iv, the posture detection device 40 and the displacement amount calculator 52a that detect a pitch angle in a rotation direction around the left-right direction with respect to the traveling direction of the vehicle 200, the correction processing device 50 that includes the correction amount calculator 52b that calculates a correction amount of the display position of the virtual image Iv based on the pitch angle, and the gradient change detector 52c that detects a change in the gradient of the traveling path based on the pitch angle or based on a variation amount in predetermined unit time of the pitch angle. The correction processing device 50 determines whether or not to correct the display position of the virtual image Iv on the basis of a detection result of the gradient change detector 52c.

The correction processing device 50 determines whether or not to correct the display position of the virtual image Iv on the basis of a detection result of the gradient change detector 52c, so that the display position of the virtual image Iv does not need to be corrected in a period in which the posture change of the vehicle 200 due to a gradient change is large. In this manner, it is possible to reduce visual recognition stress of the driver in a section in which a large variation occurs, to suppress erroneous correction caused by a change in a gradient of a traveling path, and to appropriately display the virtual image Iv.

Further, by resetting the correction amount C to zero, it is possible to reduce a displacement amount of the display position by a posture change due to traveling on a slope. Further, in a case where an absolute value of the variation amount X in unit time is larger than the first threshold value a2, that is, in a case where the posture of the vehicle 200 changes continuously for a certain period of time, it is determined that the vehicle 200 is traveling on a slope, and the correction amount is reset. In this manner, it is possible to reduce influence of a posture change of the vehicle 200 due to a gradient change of the traveling path and accurately correct the posture change of the vehicle 200 due to unevenness of the traveling path. Further, when the gradient of the traveling path changes, an absolute value of the variation amount X becomes larger than the first threshold value a2. Since the correction amount is reset every time the above occurs, the correction amount can be reset even in a case where the gradient of the traveling path changes during traveling. Therefore, it is possible to suppress displacement of the display position by a posture change of the vehicle due to a change in the gradient. Further, when the variation amount X is equal to or less than the first threshold value a2 in unit time, it is determined that vibration is vibration of the vehicle 200 according to unevenness of a road surface, and the display position is corrected by the correction amount C based on the vehicle posture. Further, in a state where an absolute value of the variation amount X is larger than the first threshold value a2 and it is determined that the gradient of the traveling path is changing, in a case where the absolute value of the variation amount X becomes equal to or less than the second threshold value b, it is determined that the gradient change is completed, and update of the correction value is resumed. In this manner, when it is determined that the posture of the vehicle 200 is inclined parallel to the gradient of the traveling path and the vehicle starts to travel along the gradient of the traveling path, the correction can be immediately started, and the posture change of the vehicle 200 due to unevenness of the traveling path can be accurately corrected.

Further, the display system 100 of the present embodiment further includes the projection device 10 that projects light representing a virtual image. In the present embodiment, the moving body is a vehicle, and the image is a virtual image displayed in front of the windshield of the vehicle. According to the present embodiment, it is possible to suppress erroneous correction of the display position of the virtual image due to a change in the gradient of the traveling path.

Note that the method of resetting the correction amount to zero in Step S260 is optional. In the present embodiment, "correction amount C=−displacement amount+offset value" is used. However, the correction amount C may be "correction amount C=−displacement amount". In this case, the correction amount C is reset to zero by setting the displacement amount itself to zero. Specifically, in a case where the vehicle posture is calculated based on the output of the gyro sensor 41, the integration amount of the angular velocity calculated by the displacement amount calculator 52a is reset to zero.

Since the posture change of the vehicle 200 is determined using two types of threshold values, the vehicle 200 can accurately detect a start point and a completion point of the posture change due to a change in the gradient. Therefore, it is possible to suppress displacement of the display position by a variation of the vehicle posture due to a change in an inclination angle of the traveling path. Further, since the completion point of the posture change can be detected, the displacement of the display position can be suppressed.

Eleventh Embodiment

In the tenth embodiment, when an absolute value of the variation amount X is larger than the first threshold value a2, the correction amount is reset to zero. In an eleventh embodiment, in a case where the calculated correction amount Cm is equal to or more than a third threshold value d, the calculated correction amount Cm is reduced by a predetermined amount so that an output value is obtained.

Figure 26:
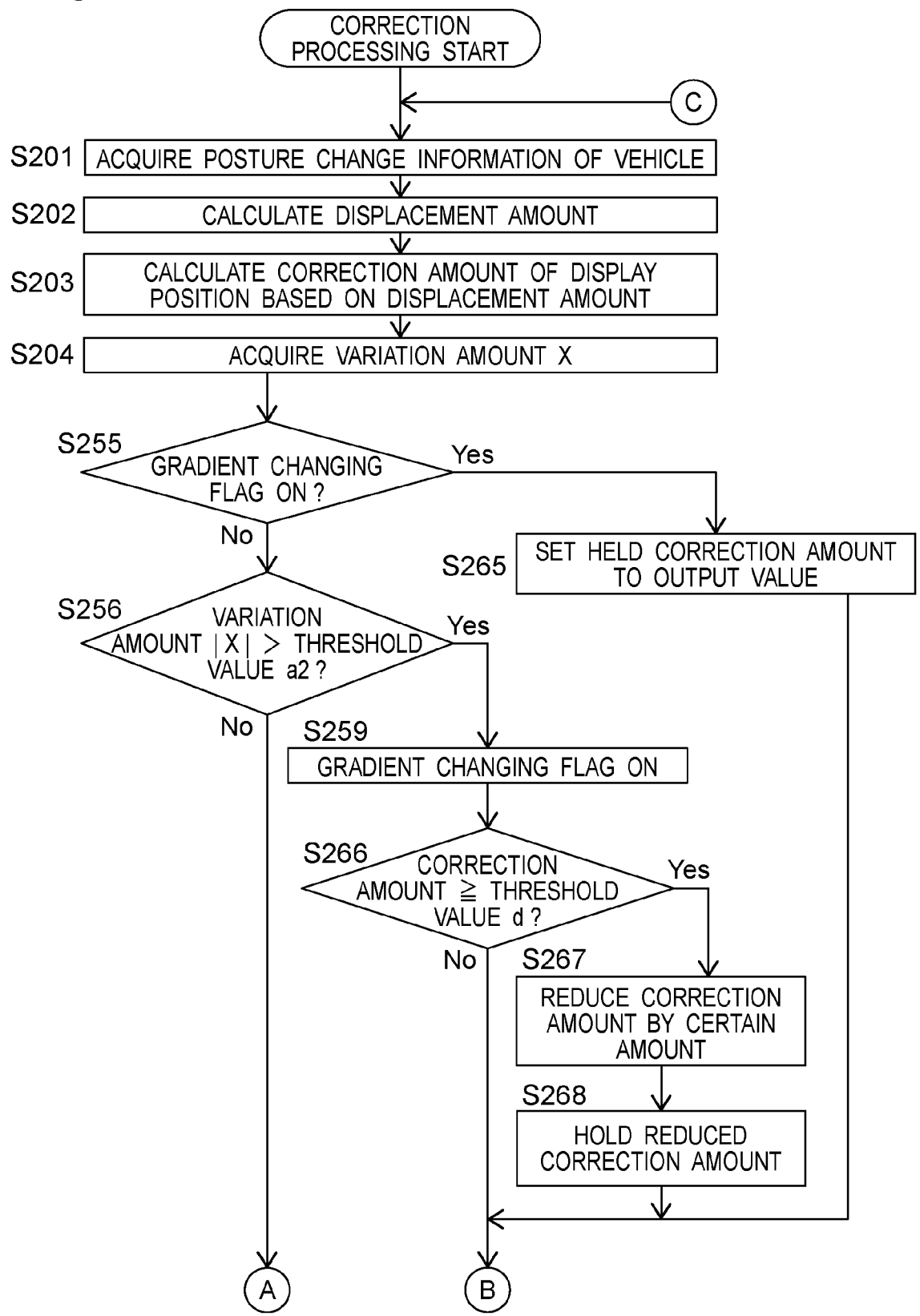
FIG. 26 is a flowchart showing the correction processing in the eleventh embodiment.

An internal configuration of the display system 100A according to the eleventh embodiment is illustrated in a block diagram in FIG. 10. The display system 100A in the eleventh embodiment includes the projection device 10, the information acquisition device 20, the display processing device 30, the correction processing device 50A, and the posture detection device 40. The correction controller 52A of the correction processing device 50A in the eleventh embodiment has a configuration in which the determination unit 52e is added to the correction controller 52 of the correction processing device 50 in the tenth embodiment. FIG. 26 is a flowchart showing the correction processing in the eleventh embodiment. Note that reference signs A, B, and C in FIG. 26 indicate connection to the reference signs A, B, and C in FIG. 24B, respectively. Steps S201 to S204, S255, S256 to S259, and S262 to S265 in the eleventh embodiment are the same as those in the tenth embodiment.

In the eleventh embodiment, in a case where an absolute value of the variation amount X is larger than the first threshold value a2 (Yes in S256), the gradient change detector 52c sets the gradient changing flag Fa to ON (S259). In a state where the gradient changing flag Fa is ON, the determination unit 52e determines whether or not the correction amount Cm calculated in Step S203 is equal to or more than the third threshold value d (S266). If the correction amount Cm is equal to or more than the third threshold value d (Yes in S266), the correction amount is reduced by a predetermined certain amount (a value smaller than the correction amount Cm) in a manner that the size of the correction amount does not become zero as illustrated in FIG. 8B (S267). Specifically, for example, the correction amount calculator 52b sets "offset value=predetermined amount" in "correction amount C=–(displacement amount–offset value)". The predetermined amount may be set according to the display position in the display area 220 of the virtual image Iv. As shown in FIG. 8B, for example, at time t1, the size of the correction amount is reduced by the offset value Fs1 of a certain amount.

If the correction amount Cm is smaller than the third threshold value d (No in S266), the correction controller 52A performs Step S262 and, if necessary, Steps 263 and 264 via the reference sign B in FIGS. 26 and 24B without changing the correction amount, and then, in Step S257, the calculated correction amount Cm or the held correction amount is output.

Further, the correction amount Cm may be reduced stepwise as shown in FIG. 26. For example, the size of the correction amount C may be reduced by the fixed offset value Fs2 at time t1, and, further, may be reduced by the offset value Fs2 again at time t2 after a predetermined period of time elapses. Note that the number of times of reduction may be three or more, and the offset value may be changed depending on the number of times.

As described above, in a case where the calculated correction amount Cm is equal to or more than the third threshold value d, the correction processing device 50 reduces the correction amount by a certain amount, and holds the reduced correction amount. Further, in a case where the correction amount C is smaller than the third threshold value d, the correction processing device 50 outputs the calculated correction amount Cm or the held correction amount. In this manner, the display position can be corrected according to the inclination of the traveling path without causing any visual discomfort.

Further, in a case where an absolute value of the variation amount X is larger than the first threshold value a2, the correction processing device 50 reduces the correction amount by a predetermined certain amount, so that the position of the virtual image Iv approaches the reference position P0. Since the position of the virtual image Iv does not suddenly change significantly, it is possible to prevent the occupant D from feeling uncomfortable with the change in the display position of the virtual image Iv. That is, it is possible to suppress a feeling of uncomfortableness due to the shift of the display position.

Note that, instead of reducing the correction amount C by the predetermined certain amount, the offset value may be set to a value smaller by a certain amount than a displacement amount when an absolute value of the variation amount X is larger than the first threshold value a2.

Twelfth Embodiment

In the tenth embodiment, when an absolute value of the variation amount X is larger than the first threshold value a2, the correction amount C is reset to zero. In the present embodiment, a change amount of the correction amount is changed according to the size of the calculated correction amount Cm. Specifically, in a case where the correction amount Cm is equal to or more than the third threshold value d, the correction amount C is reduced by a predetermined amount in a manner that the size of the correction amount C does not become zero, and in a case where the correction amount C is less than the third threshold value d, the correction amount is reset to zero.

Figure 27:
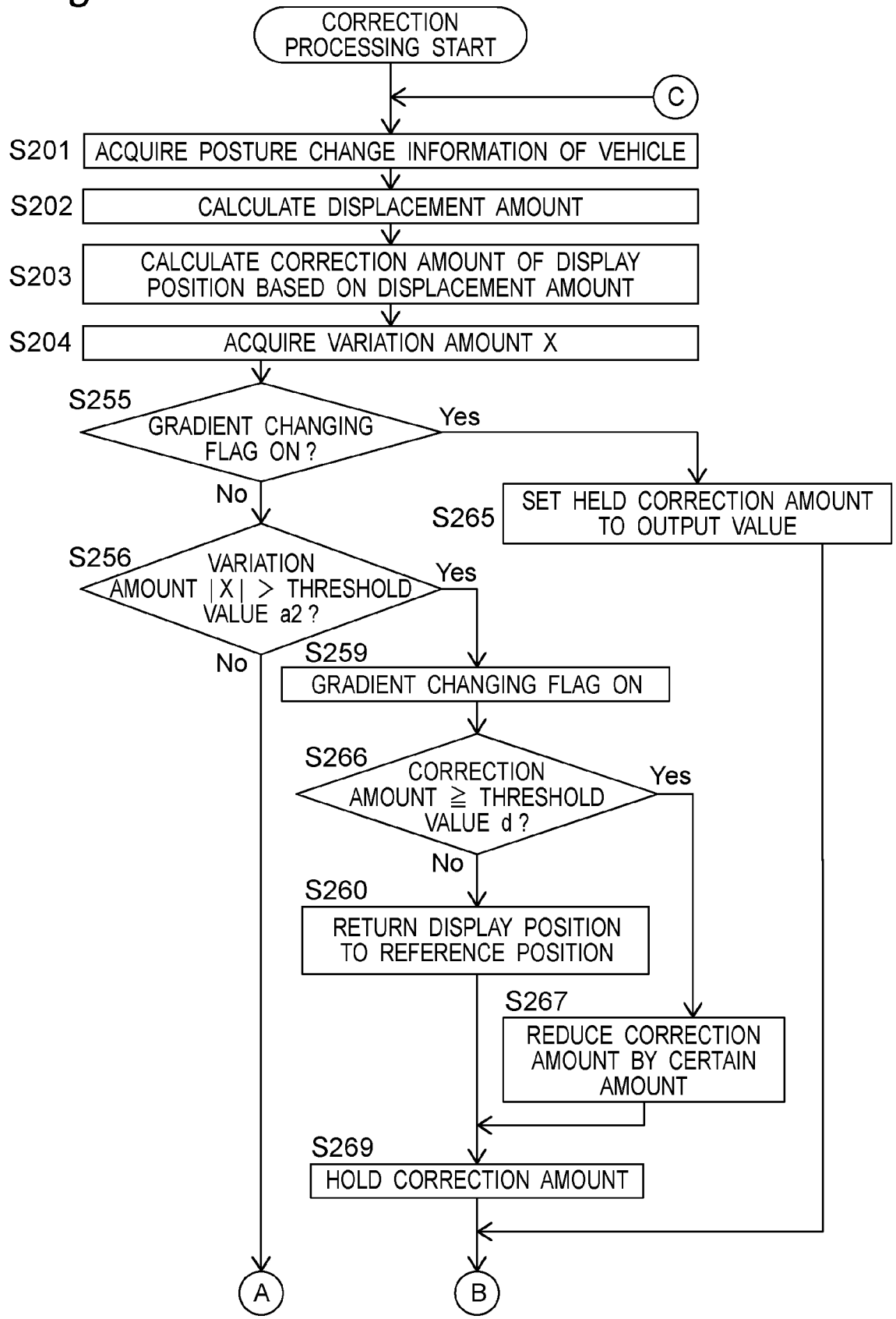
FIG. 27 is a flowchart showing the correction processing in the twelfth embodiment.

FIG. 27 is a flowchart showing the correction processing in a twelfth embodiment. Note that reference signs A, B, and C in FIG. 27 indicate connection to the reference signs A, B, and C in FIG. 24B, respectively. Steps S201 to S204, S255 to S260, and S262 to S265 in the twelfth embodiment are the same as those in the tenth embodiment. Further, Steps S266 and S267 in the twelfth embodiment are the same as those in the eleventh embodiment.

Figure 28A:
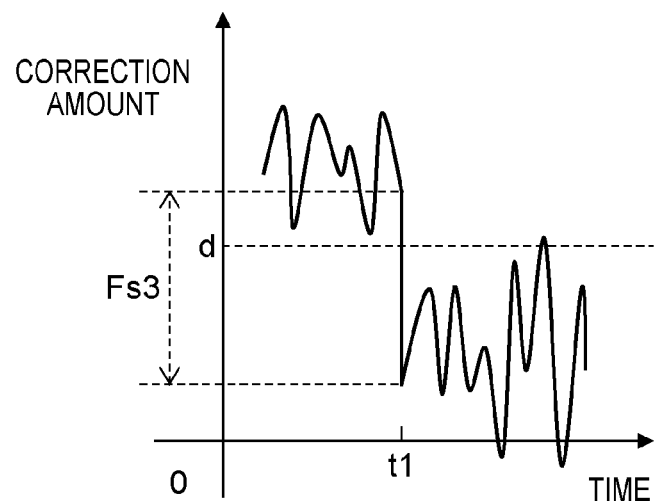
FIG. 28A is an explanatory diagram showing an example of reducing a correction amount by a certain amount.
Figure 28B:
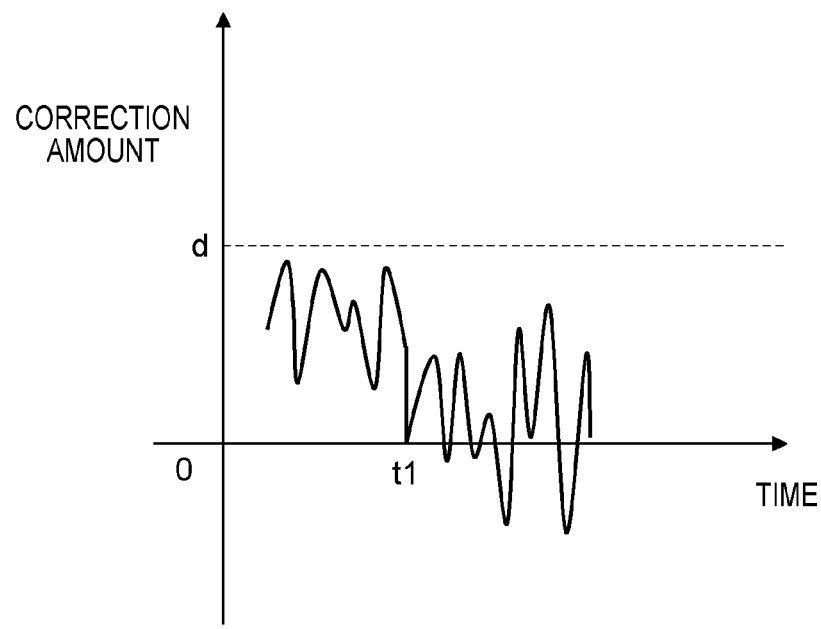
FIG. 28B is an explanatory diagram showing an example of reducing a correction amount by a certain amount.

In the present embodiment, in a case where an absolute value of the variation amount X is larger than the first threshold value a2 (Yes in S256), the gradient change detector 52c sets the gradient changing flag Fa to ON (S259). In a state where the gradient changing flag Fa is ON, the determination unit 52e determines whether or not the correction amount Cm calculated in Step S203 is equal to or more than the third threshold value d (S266). If the calculated correction amount Cm is equal to or more than the third threshold value d (Yes in S266), the correction amount is reduced by a predetermined certain amount Fs3 (a value smaller than the correction amount C) in a manner that the size of the correction amount does not become zero as illustrated in FIG. 28A (S267). Specifically, for example, the correction amount calculator 52b sets "offset value=predetermined amount" in "correction amount C=−(displacement amount−offset value)". If the correction amount is smaller than the third threshold value d (No in S266), as illustrated in FIG. 28B, the display position is returned to the reference position by resetting the correction amount C to zero (S260). Specifically, "offset value=displacement amount" is set. The correction controller 52A holds a correction amount reduced by a predetermined certain amount or a correction amount reset to zero (S269).

As described above, the correction processing device 50A reduces the correction amount by a certain amount in a case where the correction amount C is equal to or more than the third threshold value d, and resets the correction amount to zero in a case where the correction amount C is smaller than the third threshold value d. In this manner, the display position can be corrected according to the inclination of the traveling path without causing any visual discomfort.

Thirteenth Embodiment

In the twelfth embodiment, in a case where the correction amount is not zero, the correction amount is reduced by a certain amount. In a thirteenth embodiment, the correction amount is reduced over time.

Figure 29A:
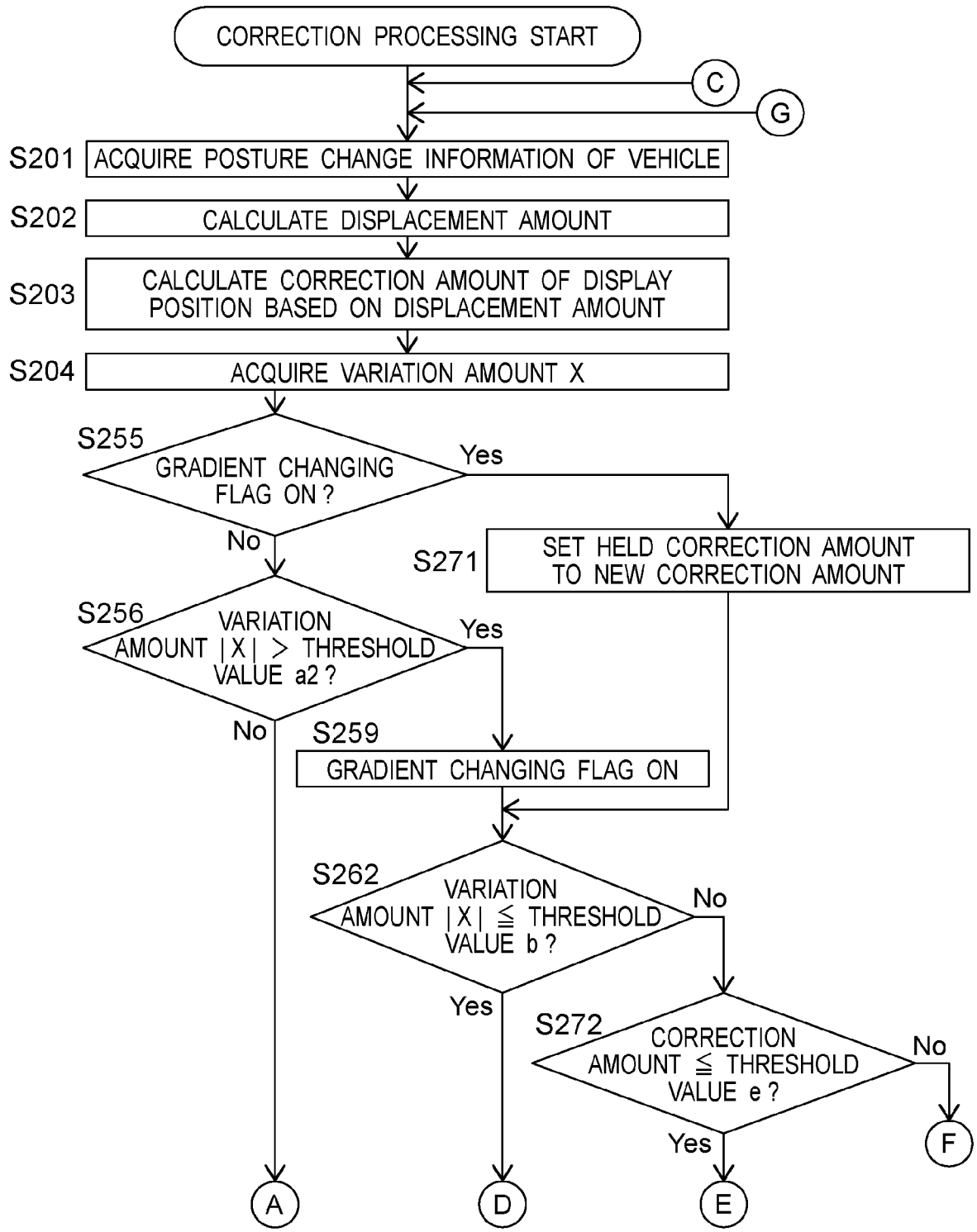
FIG. 29A is a flowchart showing the correction processing in a thirteenth embodiment.
Figure 29B:
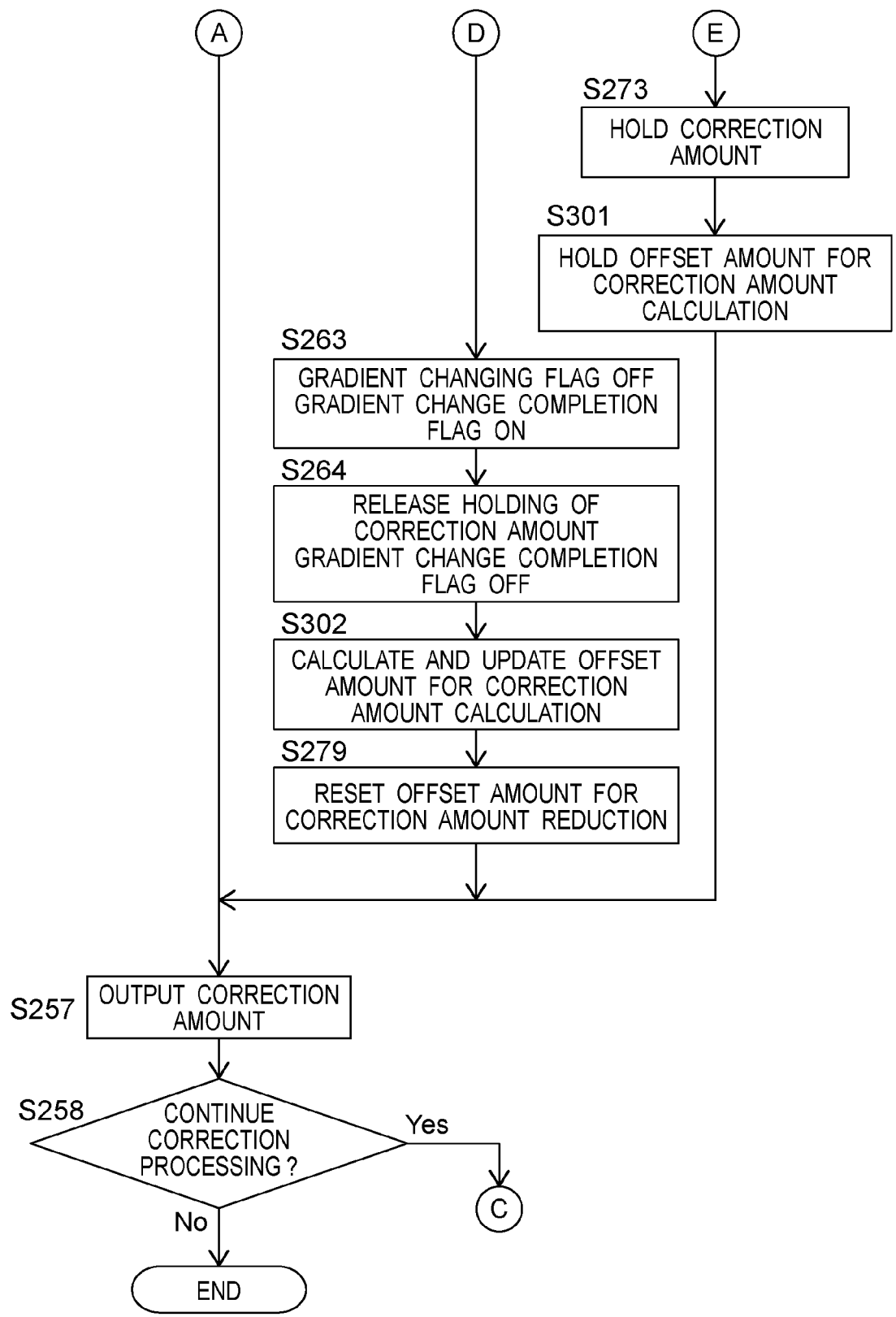
FIG. 29B is a flowchart showing the correction processing in the thirteenth embodiment.
Figure 29C:
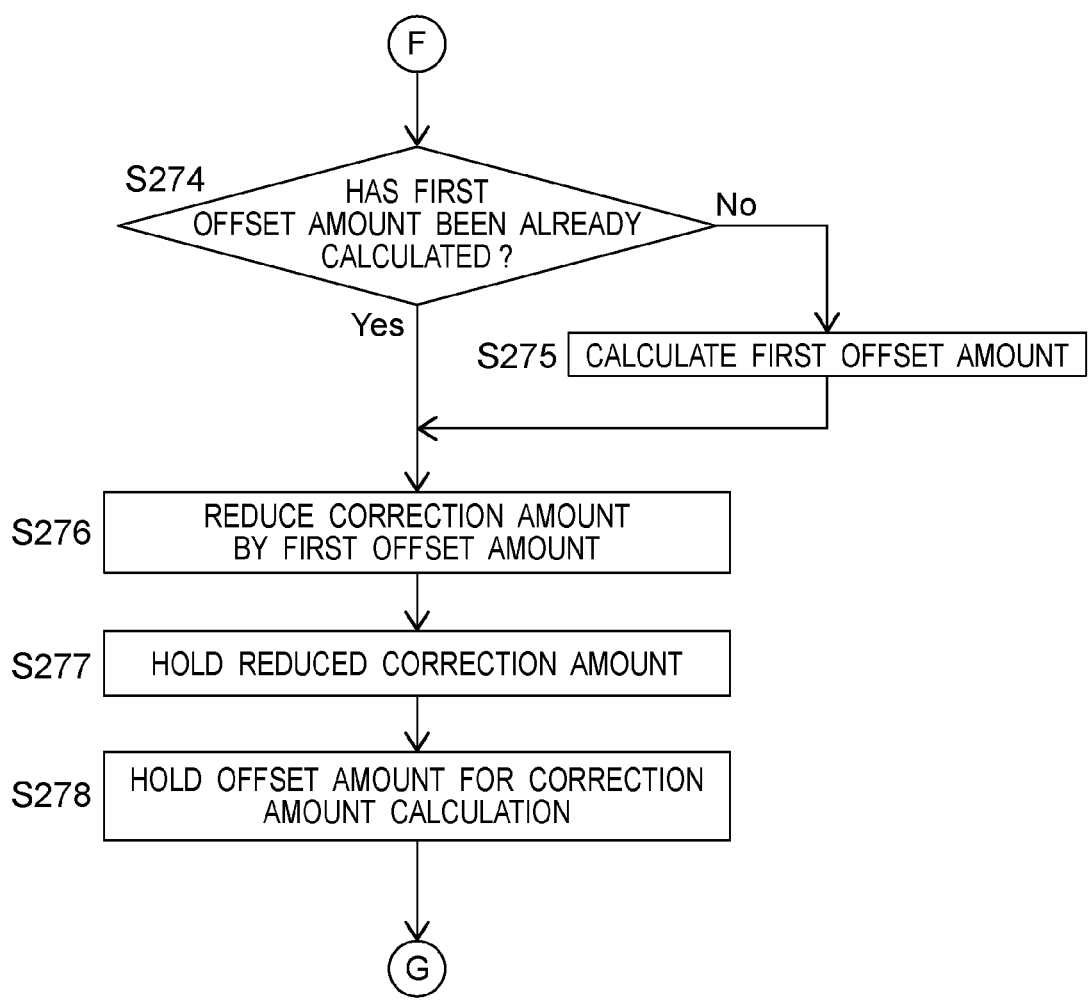
FIG. 29C is a flowchart showing the correction processing in the thirteenth embodiment.

An internal configuration of the display system 100B according to the thirteenth embodiment is illustrated in a block diagram in FIG. 13. The display system 100B according to the thirteenth embodiment has a configuration in which the offset amount calculator 52f is added to the correction controller 52A of the correction processing device 50A in the display system 100A according to the eleventh embodiment. The configuration other than a point described below is the same as the display system 100B in the thirteenth embodiment and the display system 100A in the eleventh embodiment. FIGS. 29A to 29C show the correction processing in the thirteenth embodiment. Note that reference signs A, C, D, and E in FIG. 29A indicate connection to reference signs A, C, D, and E in FIG. 29B, respectively, and reference signs F and G in FIG. 29A indicate connection to reference signs F and G in FIG. 29C, respectively. Steps S201 to S204, S255 to S259, S263, and S264 in the thirteenth embodiment are the same as those in the eleventh embodiment.

In the present embodiment, in a case where the comparison unit 52d determines that the gradient changing flag Fa is OFF (No in S255) and an absolute value of the variation amount X is larger than the first threshold value a2 (Yes in S256), the gradient change detector 52c sets the gradient changing flag Fa to ON (S259). In a state where the gradient changing flag Fa is ON, the comparison unit 52d compares an absolute value of the variation amount X with the second threshold value b (S262). If the gradient changing flag Fa is an ON state and an absolute value of the variation amount X is equal to or more than the second threshold value b (No in S262), the determination unit 52e determines whether or not the calculated correction amount Cm is less than or equal to a fourth threshold value e. If the determination unit 52e determines that the calculated correction amount Cm is equal to or less than the fourth threshold value e, (the processing proceeds to Yes in S272, and proceeds via the reference sign E in FIGS. 29A and 29B), and the correction controller 52B holds the correction amount (S273). Further, the correction controller 52B holds an offset amount for correction amount calculation (S301). An initial value of the offset amount for correction amount calculation is zero. After the above, the correction controller 52 outputs the held correction amount to the display processing device 30 (S257).

If the determination unit 52e determines that the calculated correction amount Cm is larger than the fourth threshold value e in Step S272, (the processing proceeds to No in S272, and proceeds via the reference sign F in FIGS. 29A and 29C), and the correction controller 52B determines whether a first offset amount Df1 has already been calculated by the offset amount calculator 52f (S274). In a case where the first offset amount Df1 has not yet been calculated (No in S274), the offset amount calculator 52f calculates the first offset amount Df1 (S275).

The calculation of the offset amount Df1 in the offset amount calculator 52f will be described with reference to FIG. 15. In FIG. 15, the fourth threshold value e is zero. For example, the gradient changing flag Fa is set to ON at time t1. While the gradient changing flag Fa is set to ON, the correction amount C1 is gradually reduced, and the correction amount C1 becomes equal to or less than the fourth threshold value e, zero in this case, at time t4 that is the reset time Δt1 after time t1. The reset time Δt1 is set in advance, and the first offset amount Df1 in one sampling (one cycle from S201 to S277 in the flowchart) is calculated as Df1=C1×ts/Δt1 from the sampling period is and the correction amount C1 at the start of reset. The correction controller 52B reduces the correction amount C1 by C1×ts/Δt1 (S276). For example, assuming that the sampling period is 1/1000 [sec], the reset time Δt1 is 1 [sec], and the correction amount C1 is 100 pixels, the correction amount is reduced by 0.1 pixels per sampling period.

As described above, the correction controller 52B reduces the calculated correction amount Cm by the first offset amount Df1 (S276). The correction controller 52B holds the correction amount reduced by the first offset amount Df1 (S277). Further, the correction controller 52B holds an offset amount for correction amount calculation. An initial value of the offset amount for correction amount calculation is zero (S278). The processing proceeds via the reference sign G in FIGS. 29C and 29A, the correction processing device 50B again performs the correction processing from Step S201.

Since the processing of Steps S201 to 204 is performed and the gradient changing flag Fa has already been set to ON, the processing proceeds to Yes in the determination of Step S255. The correction controller 52 sets the held correction amount to a new correction amount (S271). When it is determined in Step S262 that an absolute value of the variation amount X is larger than the threshold value b (No in S262), the vehicle is undergoing a posture change accompanying a gradient change. In this state, the determination unit 52e determines whether or not the correction amount set in Step S271 is equal to or less than the fourth threshold value e (S272). If the correction amount is larger than the fourth threshold value e, (the processing proceeds to No in S272, and proceeds via the reference sign F in FIGS. 29A and 29C), since the first offset amount Df1 has already been calculated, the processing proceeds to Yes in Step S274, and the correction controller 52B reduces the correction amount again by the first offset amount Df1 (S276). In this manner, the correction amount is gradually reduced, and when the correction amount becomes equal to or less than the fourth threshold value e, the determination unit 52e determines that the correction amount is equal to or less than the fourth threshold value e (Yes in S272), and holds the correction amount that is equal to or less than the fourth threshold value e until the gradient change completion flag Fb is set to ON.

As described above, in the correction processing device 50B, since the correction amount is gradually reduced while the gradient changing flag Fa is in the ON state, the position of the virtual image Iv gradually approaches the reference position P0. Since the position of the virtual image Iv does not suddenly change significantly, it is possible to prevent the occupant D from feeling uncomfortable with the change in the display position of the virtual image Iv.

If the comparison unit 52d determines that an absolute value of the variation amount X is less than or equal to the second threshold value b in Step S262, (the processing proceeds to Yes in S262, and proceeds via the reference sign D in FIGS. 29A and 29B), which means that the posture change due to the gradient of the vehicle 200 has ended, and the correction controller 52 sets the gradient changing flag Fa to OFF and sets the gradient change completion flag Fb to ON (S263). The correction controller 52 releases the holding of the correction amount. After releasing the holding of the correction amount, the correction controller 52 sets the gradient change completion flag Fb to OFF (S264). After the gradient change completion flag Fb is set to OFF, the correction amount calculator 52b calculates and updates an offset amount for correction amount calculation that is the cumulative sum of the first offset amount Df1 for each sampling (S302). In this manner, it is possible to calculate and update an offset value for correction amount calculation serving as the reference for correction amount calculation used in S203 only when the holding of the correction amount is released and the correction is resumed. The correction controller 52 resets the first offset amount Df1 that is an offset amount for correction amount reduction (S279). The correction controller 52 outputs the updated correction amount to the display processing device 30 (S257).

As described above, the correction processing device 50B gradually decreases the correction amount in a case where the correction amount is larger than the fourth threshold value e, and holds the correction amount equal to or less than the fourth threshold in a case where the correction amount is equal to or less than the fourth threshold value e. In a case where the fourth threshold is zero, the virtual image Iv is displayed at the reference position. In this manner, it is possible to reduce conspicuousness of the display of the virtual image Iv due to shaking according to a variation in the inclination of the traveling path.

Fourteenth Embodiment

In the thirteenth embodiment, in a case where the correction amount is equal to or less than the fourth threshold value e, the correction amount is reduced to the fourth threshold value e or less over time. A fourteenth embodiment is a variation of the thirteenth embodiment, and the correction amount is reduced over time in a case where the correction amount is larger than the third threshold value d, and the correction amount is immediately reset to zero in a case where the correction amount is equal to or less than the third threshold value d.

Figure 30:
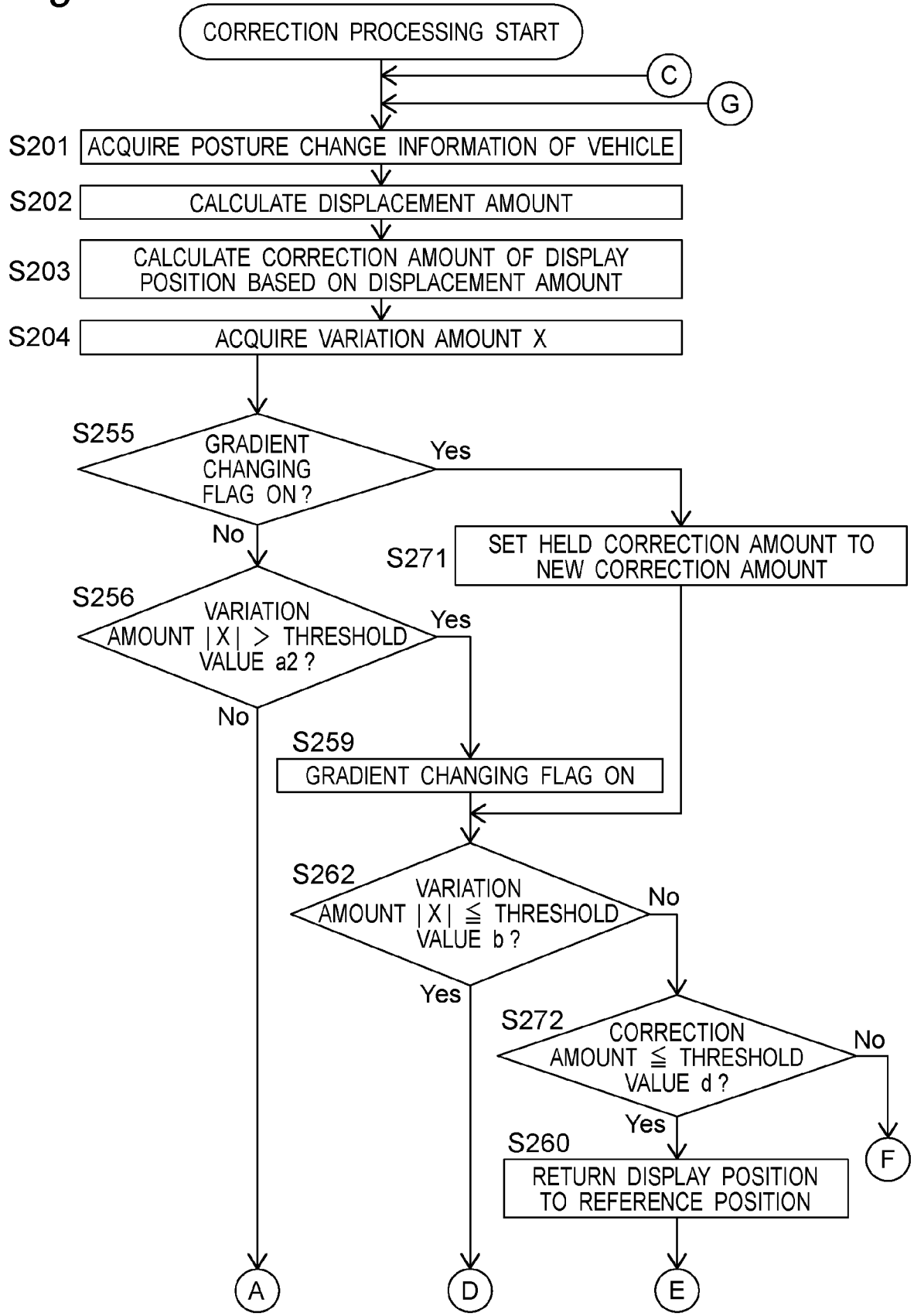
FIG. 30 is a flowchart showing the correction processing in a fourteenth embodiment.

FIG. 30 shows the correction processing in the fourteenth embodiment. Note that reference signs A, C, D, and E in FIG. 30 indicate connection to the reference signs A, C, D, and E in FIG. 29B, respectively, and reference signs F and G in FIG. 30 indicate connection to the reference signs F and G in FIG. 29C, respectively. Steps S201 to S204, S255 to S259, S262 to S264, S273 to S277, S279, S301, and S302 in the fourteenth embodiment are the same as those in the thirteenth embodiment.

In the present embodiment, Steps S201 to S204, S255, and S256 are performed similarly to the thirteenth embodiment, and in a case where an absolute value of the variation amount X is larger than the first threshold value a2 (Yes in S256), the gradient change detector 52c sets the gradient changing flag Fa to ON (S259). In a state where the gradient changing flag Fa is ON, the comparison unit 52d compares an absolute value of the variation amount X with the second threshold value b (S262). If the gradient changing flag Fa is an ON state and an absolute value of the variation amount X is larger than the second threshold value b (No in S262), the determination unit 52e determines whether or not the calculated correction amount Cm is less than or equal to the third threshold value d (S272). When the determination unit 52e determines that the calculated correction amount Cm is less than or equal to the third threshold value d (Yes in S272), the correction amount is reset to zero and the display position of the virtual image Iv is returned to the reference position (S260). Next, the processing proceeds via the reference sign E in FIGS. 30 and 29B, the correction controller 52B holds the correction amount reset to zero (S273). Further, the correction controller 52B holds an offset amount for correction amount calculation (S301). After the above, the correction controller 52B outputs the held correction amount to the display processing device 30 (S257).

If the determination unit 52e determines that the calculated correction amount Cm is larger than the third threshold value d in Step S272, (the processing proceeds to No in S272, and proceeds via the reference sign F in FIGS. 30 and 29C), and the correction controller 52B determines whether the first offset amount Df1 has already been calculated by the offset amount calculator 52f (S274). In a case where the offset amount Df has not yet been calculated (No in S274), the offset amount calculator 52f calculates the offset amount Df (S275). Next, the correction controller 52B reduces the calculated correction amount Cm by the first offset amount Df1 (S276). The correction controller 52B holds the correction amount reduced by the first offset amount Df1 (S277). The processing proceeds via the reference sign G in FIGS. 29C and 30, the correction processing device 50B again performs the correction processing from Step S201.

Since the processing of Steps S201 to 204 is performed and the gradient changing flag Fa has already been set to ON, the processing proceeds to Yes in the determination of Step S255. The correction controller 52 sets the held correction amount to a new correction amount (S271). When it is determined in Step S262 that an absolute value of the variation amount X is larger than the threshold value b (No in S262), the vehicle is undergoing a posture change accompanying a gradient change. In this state, the determination unit 52e determines whether or not the correction amount set in Step S271 is equal to or less than the third threshold value d (S272). If the correction amount is larger than the third threshold value d, (the processing proceeds to No in S272, and proceeds via the reference sign F in FIGS. 30 and 29C), since the first offset amount Df1 has already been calculated, the processing proceeds to Yes in Step S274, and the correction controller 52B reduces the correction amount again by the first offset amount Df1 (S276). In this manner, the correction amount is gradually reduced, and when the correction amount becomes equal to or less than the third threshold value d, the determination unit 52e determines that the correction amount is equal to or less than the third threshold value d (Yes in S272), resets the correction amount to zero, and returns the display position of the virtual image Iv to the reference position (S260).

As described above, in the correction processing device 50B, since the correction amount is gradually reduced while the gradient changing flag Fa is in the ON state, the position of the virtual image Iv gradually returns to the reference position P0. Since the position of the virtual image Iv does not suddenly change significantly, it is possible to prevent the occupant D from feeling uncomfortable with the change in the display position of the virtual image Iv. Further, when the correction amount becomes equal to or less than the third threshold value d, the correction amount is reset to zero, so that time for resetting the correction amount can be shortened inconspicuously.

As illustrated in FIG. 17, for example, the gradient changing flag Fa is set to ON at time t1, and the correction amount is gradually reduced. While the gradient changing flag Fa is set to ON, the correction amount is gradually reduced, and the correction amount becomes equal to or less than the third threshold value d at time t5 that is the reset time Δt2 after time t1. Note that the configuration may be such that the reset time Δt2 is set in advance, an offset amount in one sampling is set to (C1−e)×ts/Δt2 from the sampling period is and the correction amount C1 at the start of resetting, and the correction amount is reduced by (C1−e)×ts/Δt2 at a time. If the correction amount is equal to or less than the third threshold value d, the correction amount is immediately reset to zero.

As described above, in a case where the variation amount X is larger than the first threshold value a2 and larger than the second threshold value b and in a case where the correction amount is larger than the third threshold value d, the correction processing device 50B reduces the correction amount by a predetermined amount at a time, and resets the correction amount to zero in a case where the correction amount is equal to or less than the third threshold value d, at which immediate resetting of the correction amount is inconspicuous. In this manner, the display position can be corrected according to the inclination of the vehicle 200 without causing any visual discomfort.

Fifteenth Embodiment

In the thirteenth embodiment, when the variation amount X becomes equal to or less than the threshold value b after the correction amount reduced stepwise is held and set as a new correction amount, the holding of the correction amount is released and the correction amount is updated to a calculated correction amount even if the correction amount is larger than the threshold value. In a fifteenth embodiment, when the variation amount X becomes equal to or less than the threshold value b after a held correction amount is set as a new correction amount, the holding of the correction amount is released after the correction amount is reduced to a threshold value or less, and the correction amount is updated to a calculated correction amount.

Figure 31A:
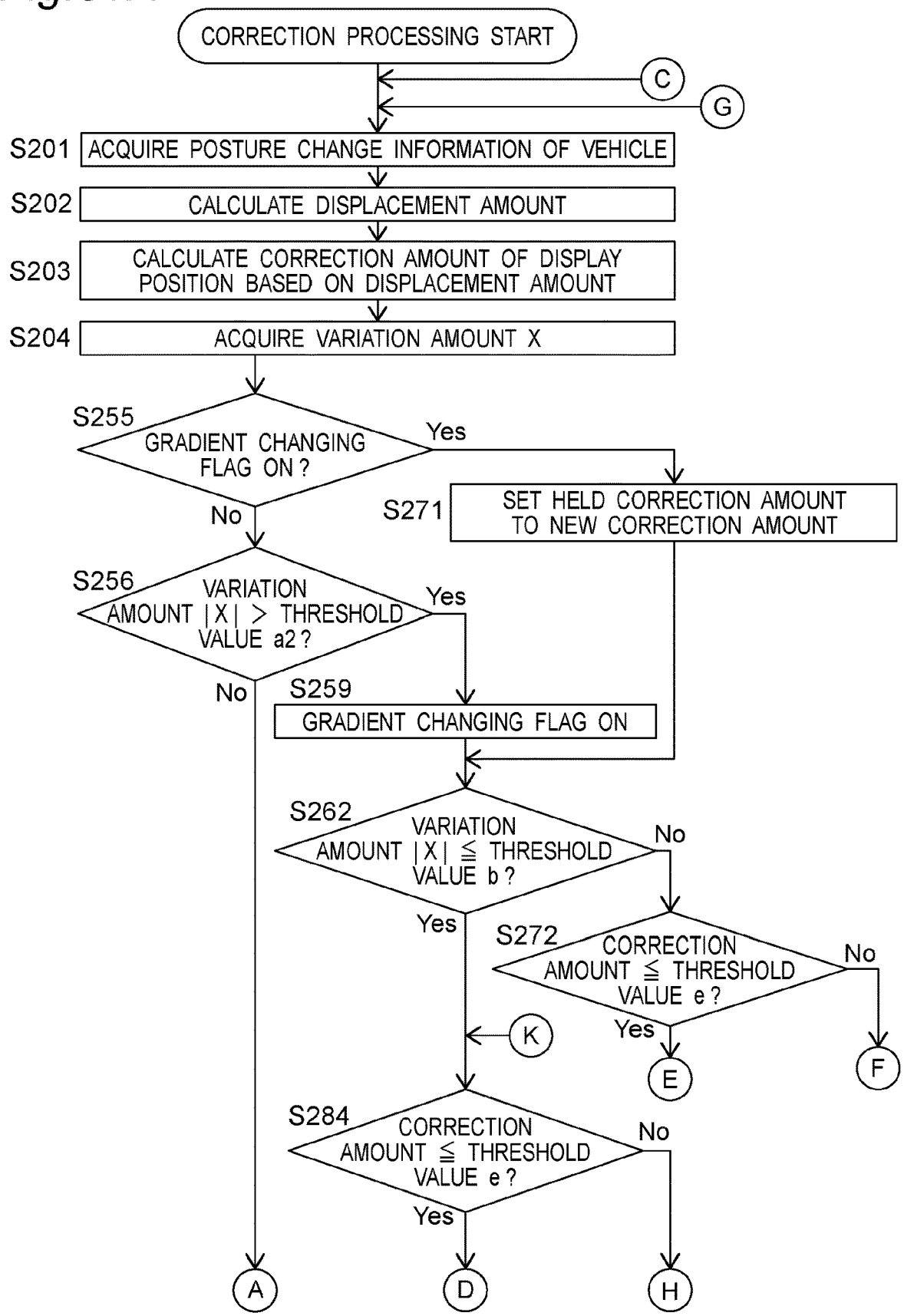
FIG. 31A is a flowchart showing the correction processing in a fifteenth embodiment.
Figure 31B:
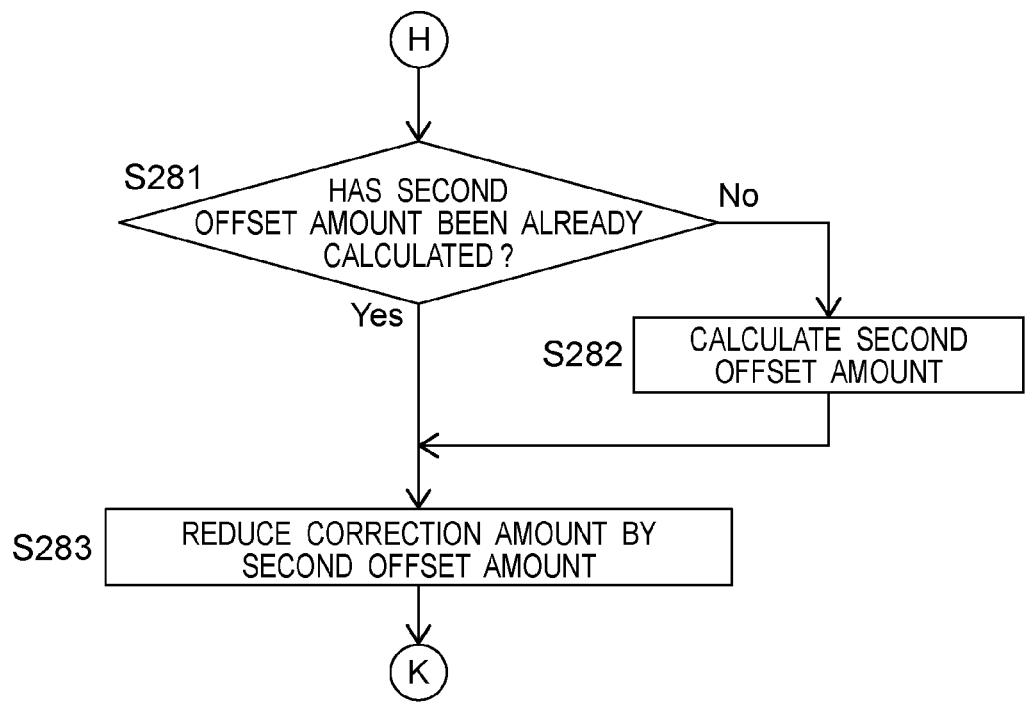
FIG. 31B is a flowchart showing the correction processing in the fifteenth embodiment.

FIGS. 31A to 31B show the correction processing in the fifteenth embodiment. Note that reference signs A, C, D, and E in FIG. 31A indicate connection to the reference signs A, C, D, and E in FIG. 29B, respectively, reference signs F and G in FIG. 31A indicate connection to the reference signs F and G in FIG. 29C, respectively, and reference signs H and K in FIG. 31B indicate connection to reference signs H and K in FIG. 31B, respectively. Steps S201 to S204, S255 to S259, S262 to S264, S257, S279, S301, and S302 in the fifteenth embodiment are the same as those in the thirteenth embodiment.

In a case where the comparison unit 52d determines that the gradient changing flag is OFF (No in S255) and an absolute value of the variation amount X is larger than the first threshold value a2 (Yes in S256), the gradient change detector 52c sets the gradient changing flag Fa to ON (S259). In a state where the gradient changing flag Fa is ON, the comparison unit 52d compares an absolute value of the variation amount X with the second threshold value b (S262). If the gradient changing flag Fa is an ON state and an absolute value of the variation amount X is larger than the second threshold value b (No in S262), the determination unit 52e determines whether or not the calculated correction amount Cm is less than or equal to the fourth threshold value e. If the determination unit 52e determines that the calculated correction amount Cm is equal to or less than the fourth threshold value e, (the processing proceeds to Yes in S272, and proceeds via the reference sign E in FIGS. 31A and 29B), and the correction controller 52B holds the correction amount (S273). Further, the correction controller 52B holds an offset amount for correction amount calculation (S301). After the above, the correction controller 52 outputs the held correction amount to the display processing device 30 (S257).

If the determination unit 52e determines that the calculated correction amount Cm is larger than the fourth threshold value e in Step S272, (the processing proceeds to No in S272, and proceeds via the reference sign F in FIGS. 31A and 29C), and the correction controller 52B determines whether the first offset amount Df1 has already been calculated by the offset amount calculator 52f (S274). In a case where the first offset amount Df1 has not yet been calculated (No in S274), the offset amount calculator 52f calculates the offset amount Df (S275). Next, the correction controller 52B reduces the calculated correction amount Cm by the first offset amount Df1 (S276). The correction controller 52B holds the correction amount reduced by the first offset amount Df1 (S277). The processing proceeds via the reference sign G in FIGS. 29C and 31A, the correction processing device 50B again performs the correction processing from Step S201.

Since the processing of Steps S201 to 204 is performed and the gradient changing flag Fa has already been set to ON, the processing proceeds to Yes in the determination of Step S255. The correction controller 52 sets the held correction amount to a new correction amount. When it is determined in Step S262 that an absolute value of the variation amount X is larger than the threshold value b (No in S262), the vehicle is undergoing a posture change accompanying a gradient change. In this state, the determination unit 52e determines whether or not the correction amount set in Step S271 is equal to or less than the fourth threshold value e (S272). If the correction amount is larger than the fourth threshold value e, (No in S272), since the first offset amount Df1 has already been calculated, the processing proceeds to Yes in Step S274, and the correction controller 52B reduces the correction amount again by the first offset amount Df1 (S276). Then, the reduced correction amount is held (S277). In this manner, the correction amount is gradually reduced.

However, if, before it is determined in Step S272 that the correction amount is equal to or less than the fourth threshold value e, the posture change due to the gradient of the vehicle 200 ends, and it is determined in Step S262 that an absolute value of the variation amount X is equal to or less than the second threshold value b (Yes in S262), the determination unit 52e determines whether or not the set correction amount is equal to or less than the fourth threshold value e (S284).

If it is determined that the set correction amount is larger than the fourth threshold value e, (the processing proceeds to No in S284, and proceeds via the reference sign H in FIGS. 31A and 31B), and it is determined whether a second offset amount Df2 has already been calculated by the offset amount calculator 52f (S281). In a case where the second offset amount Df2 has not yet been calculated (No in S281), the offset amount calculator 52f calculates the second offset amount Df2 (S282). Next, the correction controller 52B reduces the set correction amount by the second offset amount Df2 (S283).

Next, the processing proceeds via a reference sign K in FIGS. 31B and 31A, and the determination unit 52e again determines whether or not the reduced correction amount is equal to or less than the fourth threshold value e. When it is determined that the set correction amount is larger than the fourth threshold value e (No in S284), since the second offset amount Df2 has already been calculated, the processing proceeds to Yes in Step S281, and the correction controller 52B reduces the correction amount again by the second offset amount Df2 (S283). In this manner, the correction amount is gradually reduced, and when the correction amount becomes equal to or less than the fourth threshold value e, the determination unit 52e determines that the correction amount is equal to or less than the fourth threshold value e (Yes in S284). The processing proceeds via the reference sign D in FIGS. 31A and 29B, and the correction controller 52B sets the gradient changing flag Fa to OFF and sets the gradient change completion flag Fb to ON (S263). Furthermore, the correction controller 52 releases the holding of the correction amount. After releasing the holding of the correction amount, the correction controller 52 sets the gradient change completion flag Fb to OFF (S264). After the gradient change completion flag Fb is set to OFF, the correction amount calculator 52b calculates and updates an offset amount for correction amount calculation (S302). Since the holding of the correction amount is released, when the processing from Step S201 is started again, the offset value updated in Step S302 is used in the correction amount calculation in Step S203. The correction controller 52 resets the first offset amount Df1 and the second offset amount Df2 which are offset amounts for correction amount reduction (S279).

As described above, according to the correction processing device 50B of the fifteenth embodiment, even if the posture change due to a gradient change of the vehicle 200 is completed while the correction amount is reduced by the first offset amount Df1 at a time, the holding of the correction amount is released after the correction amount is reduced by the second offset amount at a time, so that the display position can be corrected according to the inclination of the vehicle 200 without causing any visual discomfort.

Sixteenth Embodiment

In the fifteenth embodiment, in a case where the correction amount is equal to or less than the fourth threshold value e, the correction amount is reduced to the fourth threshold value e or less over time. A sixteenth embodiment is a variation of the fifteenth embodiment, and the correction amount is reduced over time in a case where the correction amount is larger than the fourth threshold value e, and the correction amount is immediately reset to zero in a case where the correction amount is equal to or less than the fourth threshold value e.

Figure 32:
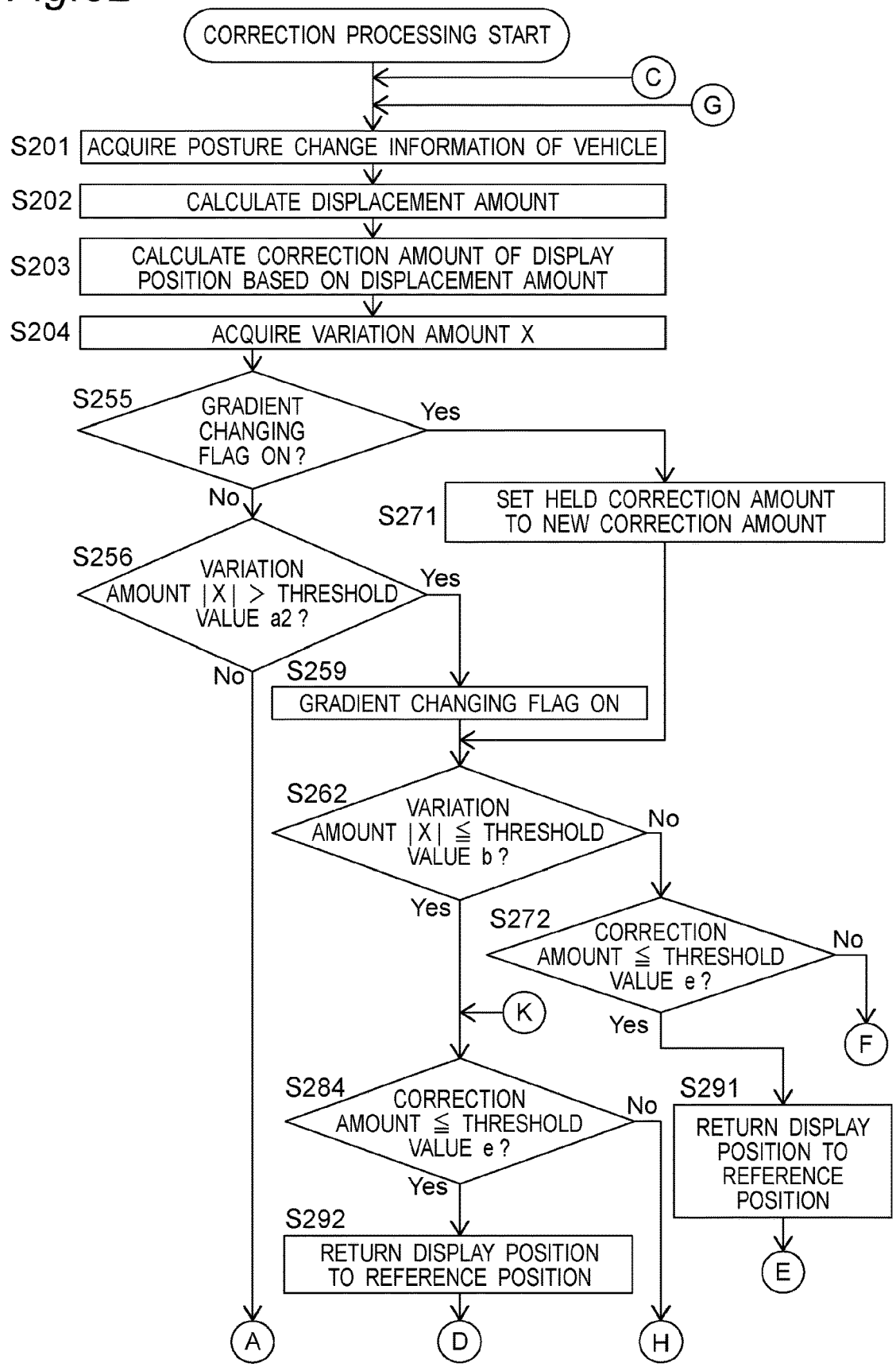
FIG. 32 is a flowchart showing the correction processing in a sixteenth embodiment.

FIG. 32 shows the correction processing in the sixteenth embodiment. Note that reference signs A, C, D, and E in FIG. 32 indicate connection to the reference signs A, C, D, and E in FIG. 29B, respectively, reference signs F and G in FIG. 32 indicate connection to the reference signs F and G in FIG. 29C, respectively, and reference signs H and K in FIG. 32 indicate connection to the reference signs H and K in FIG. 31B, respectively. Steps S201 to S204, S255 to S259, S262 to S264, S271 to S277, S279, S281 to S284, S291, S292, S301, and S302 in the sixteenth embodiment are the same as those in the fifteenth embodiment.

When the determination unit 52e determines that the calculated correction amount is less than or equal to the fourth threshold value e (Yes in S272), the correction amount is reset to zero and the display position of the virtual image Iv is returned to the reference position (S291). Next, the processing proceeds via the reference sign E in FIGS. 32 and 29B, the correction controller 52B holds the correction amount reset to zero (S273). Further, the correction controller 52B holds an offset amount for correction amount calculation (S301).

Further, when the determination unit 52e determines that the correction amount is less than or equal to the fourth threshold value e (Yes in S284), the correction amount is reset to zero and the display position of the virtual image Iv is returned to the reference position (S292).

As described above, in the correction processing device 50B of the sixteenth embodiment, even if the posture change due to a gradient change of the vehicle 200 is completed while the correction amount is reduced by the first offset amount Df1 at a time, the holding of the correction amount is released after the correction amount is reduced by the second offset amount Df2 at a time, so that the display position can be corrected according to the inclination of the vehicle 200 without causing any visual discomfort. Furthermore, when the correction amount is larger than the fourth threshold value e, the correction amount is reduced by a certain amount, and when the correction amount is equal to or less than the fourth threshold value e, the correction amount is reset to zero. In this manner, the display position can be corrected according to the inclination of the traveling path without causing any visual discomfort.

Other Embodiments

As described above, the embodiments have been described as an example of the technique disclosed in the present application. However, the technique in the present disclosure is not limited to this, and is also applicable to an embodiment in which changes, replacements, additions, omissions, and the like are appropriately made. In view of the above, other embodiments will be exemplified below.

The above embodiment illustrates the case where the projection device 10, the information acquisition device 20, the display processing device 30, the posture detection device 40, and the correction processing device 50 are separate devices. However, a plurality of devices may be integrally formed as one device. For example, the display processing device 30 and the correction processing device 50 may be integrally formed as one device. The information acquisition device 20 and the display processing device 30 may be integrally formed as one device. The posture detection device 40 and the correction processing device 50 may be integrally formed as one device. The separately formed devices are connected in a manner communicable with each other by wire or wirelessly. Note that all the projection device 10, the information acquisition device 20, the display processing device 30, the posture detection device 40, and the correction processing device 50 may be formed as one device. In this case, the communicators 31 and 51 may be omitted.

The above embodiment describes the example in which the information acquisition device 20 includes the GPS module 21. However, the information acquisition device 20 may include a distance sensor that measures a distance and a direction from the vehicle 200 to a surrounding object, and may output distance information indicating the measured distance and direction to the display processing device 30. The information acquisition device 20 may include a vehicle speed sensor that detects the speed of the vehicle 200, or may include a navigation system. The information acquisition device 20 may include one or more of the GPS module 21, a distance sensor, a camera, an image processing device, an acceleration sensor, a radar, a sound wave sensor, and a white line detection device of advanced driver-assistance systems (ADAS). In this case, the GPS module 21 having a function as the information acquisition device 20, the distance sensor, the camera, and the like may be built in one device or individually attached to the vehicle 200.

The above embodiment describes the example in which the posture detection device 40 includes the gyro sensor 41. However, the posture detection device 40 may include an acceleration sensor that detects the acceleration of the vehicle 200, and may output the detected acceleration as the posture change information. The posture detection device 40 may include a vehicle height sensor that detects the height from the road surface, and may output the detected height as the posture change information. The posture detection device 40 may include other publicly-known sensors. The posture detection device 40 may include one or more of the gyro sensor 41, the acceleration sensor, the vehicle speed sensor, and the like. In this case, the gyro sensor 41 having the function of the posture detection device 40, the acceleration sensor, the vehicle height sensor, and the like may be built in one device or individually attached to the vehicle 200. Further, the posture detection device 40 may include an arithmetic unit that calculates a pitch angle by integrating the pitch angular velocity detected by the gyro sensor 41 or may include the displacement amount calculator 52a. Further, the gyro sensor 41 of the posture detection device 40 may directly detect the pitch angle.

The above embodiment describes the case where the moving body is the vehicle 200 such as an automobile. However, the moving body is not limited to the vehicle 200. The moving body may be a vehicle that travels on the ground, and may be, for example, a train or a motorcycle. The moving body may be an unmanned moving body that is capable of autonomous driving.

The above embodiment describes the case where the image is displayed in front of the moving body. However, the position where the image is displayed is not limited to the front. For example, the image may be displayed in the side direction or in the rear of the moving body.

The first to ninth embodiments describe the examples in which the display system 100 is an HUD system. However, the display system 100 does not need to be an HUD system. The display system 100 may include a liquid crystal display or an organic EL display instead of the projection device 10. Display system 100 may include a screen and a projector.

(Outline of embodiment)

(1) A gradient change detection system of the present disclosure is a gradient change detection system for a moving body for detecting a change in a gradient of a traveling path. The gradient change detection system includes a posture detection unit that detects a posture change amount in a rotation direction about a left-right direction with respect to a traveling direction of a moving body, and a gradient change detector that detects a change in a gradient of the traveling path based on the posture change amount or a variation amount in predetermined unit time of the posture change amount. In this manner, it is possible to accurately detect a change in the gradient of the traveling path on which the moving body travels.

(2) In the gradient change detection system of (1), the gradient change detector may detect a posture change of the moving body due to a change in a gradient. It is possible to recognize that the posture change of the moving body is caused by a change in the gradient.

(3) In the gradient change detection system of (2), the gradient change detector may detect that a posture change of the moving body due to a change in a gradient is completed.

(4) In the gradient change detection system of (3), the gradient change detector may detect that the moving body is undergoing a posture change due to a gradient change of the traveling path by detecting that an absolute value of the posture change amount or an absolute value of the variation amount is larger than a predetermined first threshold value.

(5) In the gradient change detection system of (4), the gradient change detector may detect that a posture change of the moving body due to a gradient change is completed by detecting that an absolute value of the posture change amount or an absolute value of the variation amount is equal to or less than a predetermined second threshold value during the posture change of the moving body due to the gradient change of the traveling path.

(6) In the gradient change detection system of (5), the second threshold value may be smaller than the first threshold value.

(7) In the gradient change detection system of (1) to (6), the moving body may be a vehicle.

(8) A display system of the present disclosure includes a display processing device that controls display of an image, a posture detection unit that detects a posture change amount in a rotation direction about a left-right direction with respect to a traveling direction of a moving body, a correction processing device including a correction amount calculator that calculates a correction amount of a display position of the image based on the posture change amount, and a gradient change detector that detects a change in a gradient of a traveling path based on the posture change amount or a variation amount in predetermined unit time of the posture change amount. The correction processing device adjusts the correction amount based on a detection result of the gradient change detector.

In this manner, position displacement of an image can be corrected according to a gradient change.

(9) In the display system of (7), the display processing device may display the image based on a reference position and the correction amount, and the correction processing device may reduce the correction amount based on the detection of the change in the gradient by the gradient change detector in a case of determining to correct a display position of the image.

(10) In the display system of (9), the display processing device may return the image to the reference position based on a result of the gradient change detector detecting that the posture change of the moving body is completed.

(11) In the display system of (10), the gradient change detector may detect that a posture change is completed by detecting that an absolute value of the posture change amount or an absolute value of the variation amount is larger than a predetermined third threshold value.

(12) In the display system of (9), the display processing device may display the image at the reference position based on a result of the gradient change detector detecting that the moving body is undergoing a posture change due to a gradient change of the traveling path.

(13) In the display system of (12), the gradient change detector may detect that the moving body is undergoing a posture change due to a gradient change of the traveling path by detecting that an absolute value of the posture change amount or an absolute value of the variation amount is larger than a predetermined first threshold value.

(14) In the display system of (13), the display processing device may return the image to the reference position based on a result of the gradient change detector detecting that the moving body starts a posture change due to a gradient change of the traveling path.

(15) In the display system of (12) to (14), the gradient change detector may detect that a posture change of the moving body is started due to a gradient change of the traveling path by detecting that an absolute value of the posture change amount or an absolute value of the variation amount becomes in a state of being larger than a predetermined first threshold value from a state of being equal to or less than the predetermined first threshold value.

(16) In the display system of (9), the correction processing device may correct a display position of the image based on a result of the gradient change detector detecting that a posture change of the moving body due to a gradient change of the traveling path is completed.

(17) In the display system of (14) to (16), the gradient change detector may detect that a posture change due to a gradient change is completed by detecting that an absolute value of the posture change amount or an absolute value of the variation amount is smaller than a predetermined second threshold value during the posture change due to the gradient change of the traveling path.

In this manner, erroneous correction due to a change in the gradient of the traveling path can be suppressed, and the virtual image Iv can be appropriately displayed.

(18) In the display system of (17), the second threshold value may be smaller than the first threshold value.

(19) In the display system of (10), (11), and (15) to (18), the correction processing device may reduce the correction amount after a posture change starts or after the posture change is completed.

(20) In the display system of (19), the correction processing device may reduce the correction amount and then hold the reduced correction amount.

(21) In the display system of (15) to (20), the correction processing device may reset the correction amount to zero as adjustment of the correction amount.

(22) In the display system of (15) to (21), the correction processing device may reduce the correction amount by a certain amount when the correction amount is equal to or more than a third threshold value, and reset the correction amount to zero when the correction amount is smaller than the third threshold value.

(23) The display systems of (8) to (22) may further include a projection device that projects light representing the image.

(24) In the display system of (8) to (23), the moving body may be a vehicle, and the image may be a virtual image displayed in front of a windshield of a vehicle.

(25) A storage medium stores the program for a moving body of the present disclosure, which is a program for a moving body for an arithmetic device to detect a change in a gradient of a traveling path. The program causes the arithmetic device to execute a gradient change detection step of detecting a change in a gradient of the traveling path based on a posture change amount in a rotation direction about a left-right direction with respect to a traveling direction of the moving body, the posture change amount being input from a posture detection unit, or a variation amount in predetermined unit time of the posture change amount.

(26) In the program for a moving body stored in the storage medium of (25), the gradient change detection step may detect that the moving body is undergoing a posture change due to a gradient change of the traveling path by detecting that an absolute value of the posture change amount or an absolute value of the variation amount is larger than a predetermined first threshold value.

(27) In the program for a moving body stored in the storage medium of (26), the gradient change detection step may detect that a posture change of the moving body due to a gradient change is completed by detecting that an absolute value of the posture change amount or an absolute value of the variation amount is smaller than a predetermined second threshold value during the posture change of the moving body due to the gradient change of the traveling path.

(28) The program for a moving body stored in the storage medium of (25) to (27), causes the arithmetic device to execute further, a display processing step of controlling display of an image, and a correction processing step of setting a correction amount of a display position of the image based on a posture change amount of the moving body. The display processing step displays the image based on a reference position and the correction amount, and the correction processing step adjusts the correction amount based on a detection result of a change in the gradient by the gradient change detection step.

The display system described in the present disclosure is realized by cooperation with hardware resources, for example, a processor, a memory, a program, and the like.

INDUSTRIAL APPLICABILITY

The present disclosure can be applied to a display system that displays a virtual image in front of a windshield.

The invention claimed is:
1. A display system comprising:
a display processing device that controls display of an image based on a reference position and a correction amount;
a gyro sensor that detects an angular velocity in a rotation direction about a left-right direction with respect to a traveling direction of a moving body;
a displacement amount calculator that calculates a posture change amount as an angle amount based on the angular velocity detected by the gyro sensor;
a correction processing device including a correction amount calculator that calculates a correction amount of a display position of the image based on the posture change amount; and
a gradient change detector that detects a change in a gradient of a traveling path based on a variation amount in predetermined unit time of the posture change amount, wherein the gradient change detector detects that the moving body is undergoing a posture change due to a gradient change of the traveling path by detecting that an absolute value of the variation amount is larger than a predetermined first threshold value, the gradient change detector detects that a posture change due to a gradient change of the traveling path is completed by detecting that an absolute value of the variation amount is equal to or less than a predetermined second threshold value during the posture change due to the gradient change of the traveling path, the correction processing device reduces the correction amount based on a result of the gradient change detector detecting that the moving body is undergoing a posture change due to a gradient change of the traveling path, the second threshold value is smaller than the first threshold value.

2. The display system according to claim 1, wherein the display processing device displays the image at the reference position based on a result of the gradient change detector detecting that the moving body is undergoing a posture change due to a gradient change of the traveling path.

3. The display system according to claim 2, wherein the display processing device returns the image to the reference position based on a result of the gradient change detector detecting that the moving body starts a posture change due to a gradient change of the traveling path.

4. The display system according to claim 1, wherein the gradient change detector detects that a posture change of the moving body is started due to a gradient change of the traveling path by detecting that an absolute value of the variation amount becomes in a state of being larger than a predetermined first threshold value from a state of being equal to or less than the predetermined first threshold value.

5. The display system according to claim 4, wherein the correction processing device resets the correction amount to zero as adjustment of the correction amount.

6. The display system according to claim 4, wherein the correction processing device reduces the correction amount by a certain amount when the correction amount is equal to or more than a third threshold value, and resets the correction amount to zero when the correction amount is smaller than the third threshold value.

7. The display system according to claim 1, wherein the correction processing device corrects a display position of the image based on a result of the gradient change detector detecting that a posture change of the moving body due to a gradient change of the traveling path is completed.

8. The display system according to claim 1, wherein the correction processing device reduces the correction amount after a posture change starts or after the posture change is completed.

9. The display system according to claim 8, wherein the correction processing device reduces the correction amount and then holds the reduced correction amount.

10. The display system according to claim 1, further comprising a projection device that projects light representing the image.

11. The display system according to claim 1, wherein the moving body is a vehicle, and the image is a virtual image displayed in front of a windshield of the vehicle.

12. A non-transitory storage medium that stores a program for a moving body for an arithmetic device to detect a state of a posture change of the moving body due to a change in a gradient of a traveling path, the program causing the arithmetic device to execute a gradient change detection step of (i) calculating a posture change amount based on an angular velocity in a rotation direction about a left-right direction with respect to a traveling direction of the moving body, the angular velocity being input from a gyro sensor, and (ii) detecting a change in a gradient of the traveling path based on a variation amount in predetermined unit time of the posture change amount, wherein the gradient change detection step detects that the moving body is undergoing a posture change due to a gradient change of the traveling path by detecting that an absolute value of the variation amount is larger than a predetermined first threshold value, the gradient change detection step detects that a posture change of the moving body due to a gradient change of the traveling path is completed by detecting that an absolute value of the variation amount is equal to or less than a predetermined second threshold value during the posture change of the moving body due to the gradient change of the traveling path, and the second threshold value is smaller than the first threshold value; a correction processing step of setting a correction amount of a display position of the image based on a posture change amount of the moving body; and a display processing step of controlling display of an image based on a reference position and a correction amount, wherein the correction processing step reduces the correction amount based on a detection result that the moving body is undergoing a posture change due to a gradient change of the traveling path by the gradient change detection step.

* * * * *